US009626443B2

(12) United States Patent
Fan et al.

(10) Patent No.: US 9,626,443 B2
(45) Date of Patent: Apr. 18, 2017

(54) SEARCHING AND ACCESSING APPLICATION FUNCTIONALITY

(71) Applicant: Quixey, Inc., Mountain View, CA (US)

(72) Inventors: Cheng-Ruei Fan, Mountain View, CA (US); Tomer Kagan, Sunnyvale, CA (US); Liron Shapira, Mountain View, CA (US); Julia Lipton, Menlo Park, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

(21) Appl. No.: 14/521,526

(22) Filed: Oct. 23, 2014

(65) Prior Publication Data

US 2016/0117388 A1  Apr. 28, 2016

(51) Int. Cl.
| | |
|---|---|
| G06F 9/445 | (2006.01) |
| G06F 17/30 | (2006.01) |
| G06F 3/0482 | (2013.01) |
| G06Q 30/02 | (2012.01) |
| G06F 3/0484 | (2013.01) |

(52) U.S. Cl.
CPC ...... *G06F 17/30864* (2013.01); *G06F 3/0482* (2013.01); *G06F 3/04842* (2013.01); *G06F 8/61* (2013.01); *G06F 17/3053* (2013.01); *G06F 17/30554* (2013.01); *G06F 17/30991* (2013.01); *G06Q 30/0256* (2013.01)

(58) Field of Classification Search
None
See application file for complete search history.

(56) References Cited

U.S. PATENT DOCUMENTS

| | | | | |
|---|---|---|---|---|
| 7,730,012 | B2* | 6/2010 | Arrouye | G06F 17/30067 |
| 8,099,332 | B2 | 1/2012 | Lemay et al. | |
| 8,661,033 | B2 | 2/2014 | Leppert et al. | |
| 8,762,360 | B2* | 6/2014 | Jiang | G06F 17/30867 |
| | | | | 706/14 |
| 2006/0287985 | A1 | 12/2006 | Castro et al. | |
| 2006/0294063 | A1 | 12/2006 | Ali et al. | |

(Continued)

OTHER PUBLICATIONS

Google Testing SERP With Up to 16 Product Listing ADS: http://www.rimmkaufman.com/blog/google-testing-serp-with-16-product-listing-ads/16072013/, accessed on Sep. 2, 2014.

(Continued)

*Primary Examiner* — Daxin Wu
(74) *Attorney, Agent, or Firm* — Harness, Dickey & Pierce

(57) ABSTRACT

A method of performing a search includes receiving, at a computing device, search results transmitted from a search system in communication with the computing device. The search results include a header for an application executable on the computing device and application access mechanisms associated with the header. Each application access mechanism has a reference to the application and indicates one or more performable operations for the application. The method includes displaying, on a display in communication with the computing device, a graphical user interface including the header, an expansion element associated with the header, and user selectable access links grouped with the header. Each access link is associated with an application access mechanism for the application. The expansion element has an expanded state and a collapsed state.

18 Claims, 27 Drawing Sheets

(56) References Cited

U.S. PATENT DOCUMENTS

| | | | |
|---|---|---|---|
| 2007/0220317 A1* | 9/2007 | Gerhart | G06F 8/62 |
| | | | 714/10 |
| 2008/0009268 A1 | 1/2008 | Ramer et al. | |
| 2009/0138445 A1* | 5/2009 | White | G06Q 30/02 |
| 2010/0306191 A1 | 12/2010 | LeBeau et al. | |
| 2011/0072001 A1 | 3/2011 | Basu et al. | |
| 2011/0209143 A1 | 8/2011 | Ierullo | |
| 2011/0307833 A1 | 12/2011 | Dale et al. | |
| 2012/0124062 A1 | 5/2012 | Macbeth et al. | |
| 2012/0284247 A1* | 11/2012 | Jiang | G06F 17/30867 |
| | | | 707/706 |
| 2012/0316955 A1 | 12/2012 | Panguluri et al. | |
| 2012/0323898 A1 | 12/2012 | Kumar et al. | |
| 2013/0132896 A1 | 5/2013 | Lee et al. | |
| 2013/0238609 A1* | 9/2013 | Marantz | G06F 17/30991 |
| | | | 707/723 |
| 2013/0268673 A1 | 10/2013 | Graham-Cumming | |
| 2013/0290321 A1 | 10/2013 | Shapira et al. | |
| 2013/0290344 A1 | 10/2013 | Glover et al. | |
| 2013/0304729 A1 | 11/2013 | Jiang et al. | |
| 2013/0325892 A1 | 12/2013 | Edwards et al. | |
| 2014/0006409 A1 | 1/2014 | Prosnitz et al. | |
| 2014/0019442 A1 | 1/2014 | Mahaniok et al. | |
| 2014/0052683 A1 | 2/2014 | Kirkham et al. | |
| 2014/0067846 A1* | 3/2014 | Edwards | G06F 17/3064 |
| | | | 707/765 |
| 2014/0172840 A1 | 6/2014 | Kumar et al. | |
| 2014/0201179 A1 | 7/2014 | Chang et al. | |
| 2014/0358887 A1 | 12/2014 | Morris et al. | |
| 2014/0359598 A1* | 12/2014 | Oliver | G06F 8/61 |
| | | | 717/174 |
| 2014/0365462 A1 | 12/2014 | Chang | |

OTHER PUBLICATIONS

Secrets of the 7-Result SERP: http://moz.com/blog/secrets-of-the-7-result-serp, accessed on Sep. 2, 2014.
SERPs: A Primer: http://www.goinflow.com/serps-primer/, accessed on Sep. 2, 2014.
Ask.com SERP: http://www.ask.com/web?q=katy+perry, accessed on Sep. 2, 2014.
Bing.com SERP: http://www.bing.com/search?q=katy+perry, accessed on Sep. 2, 2014.
Google.com SERP: https://www.google.com/?#q=katy+perry, accessed on Sep. 2, 2014.
International Search Report and Written Opinion for related WO Application No. PCT/US2015/016866, dated May 26, 2015.
App Indexing: <https://web.archive.org/web/20140225132807/https://developers.google.com/app-indexing/webmasters/>, Dec. 4, 2013.
App Indexing Technical Details: <https://web.archive.org/web/20140210182226/https://developers.google.com/app-indexing/webmasters/details>, Feb. 1, 2014.
Indexing Apps Just Like Websites: <http://googlewebmastercentral.blogspot.com/2013/10/indexing-apps-just-like-websites.html>, Oct. 31, 2013.
Google Search Now Discovers Content Within Android Apps: http://searchengineland.com/google-search-now-discovers-content-within-android-apps-178960, Dec. 4, 2013.
Google's Search Results Can Deep-Link To Your Android Apps: <http://techcrunch.com/2013/10/31/android-4-4-kitkat-app-indexing/>, Oct. 31, 2013.
PCT International Preliminary Report on Patentability dated Sep. 1, 2016 for PCT/US2015/016866, 6 pages.

* cited by examiner

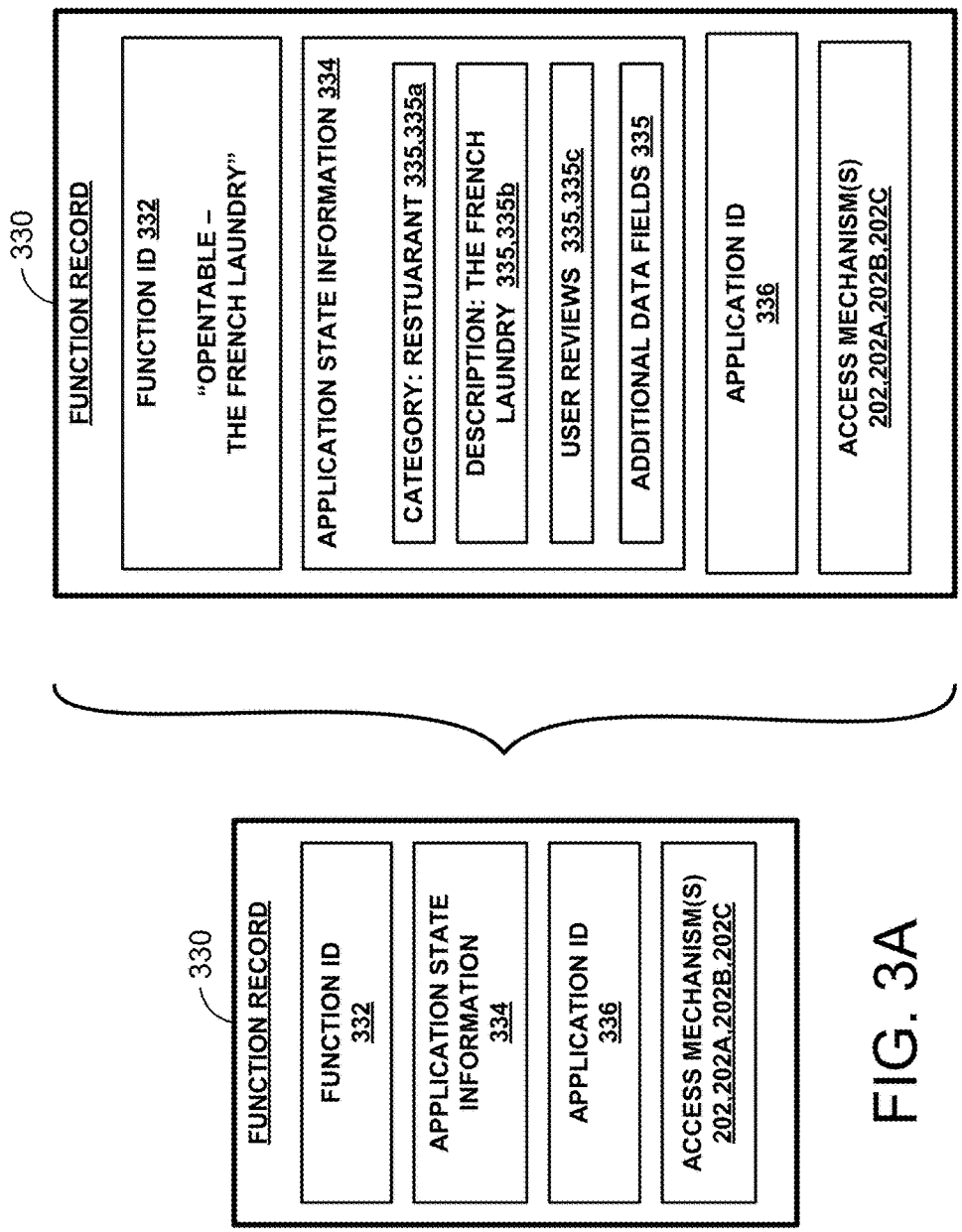

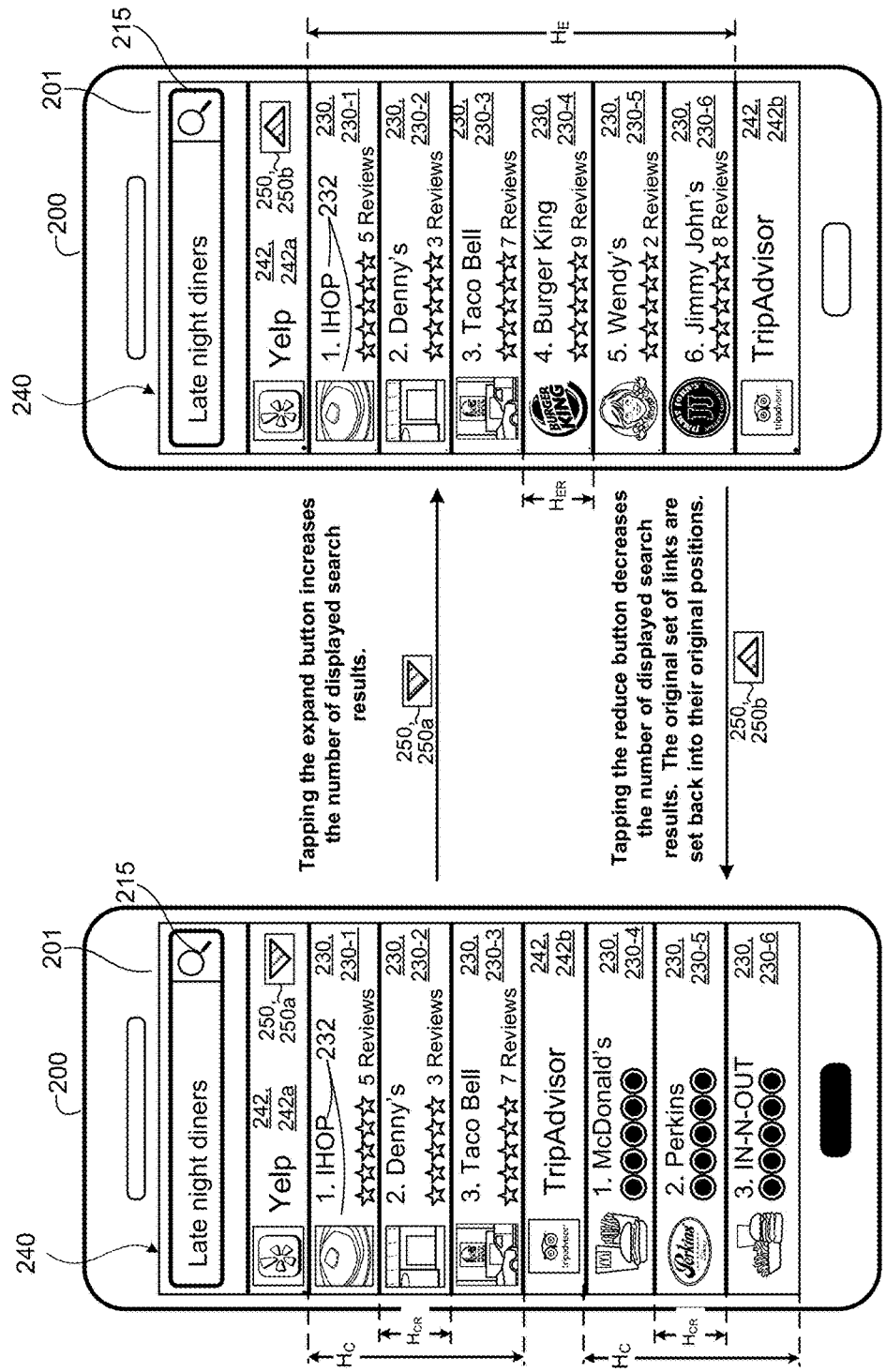

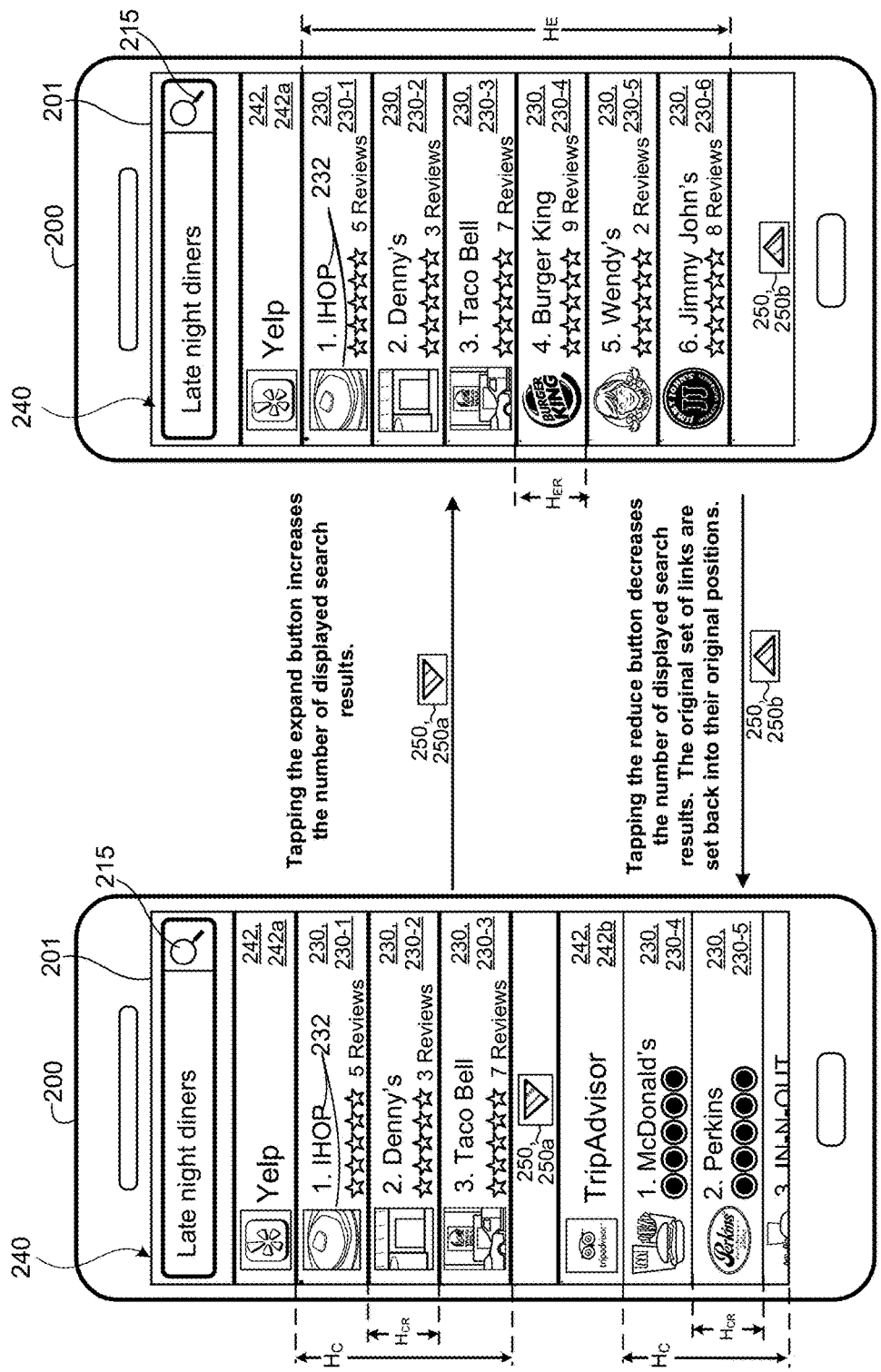

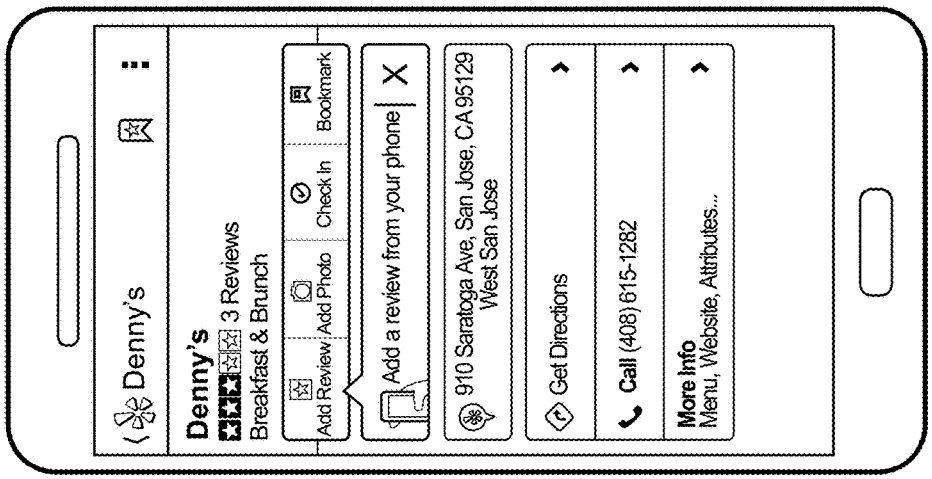
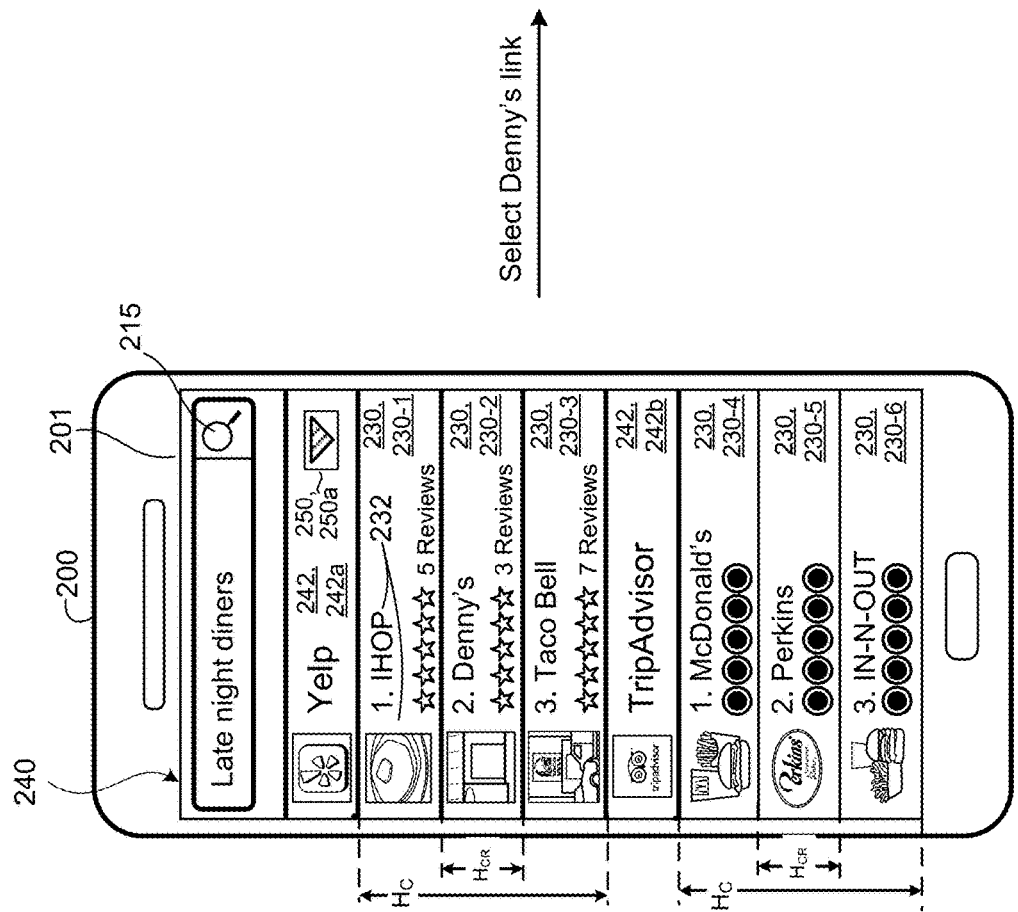
FIG. 8K
FIG. 8J

SEARCHING AND ACCESSING APPLICATION FUNCTIONALITY

TECHNICAL FIELD

This disclosure relates to searching, accessing, and displaying functionality of applications.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

SUMMARY

One aspect of the disclosure provides a method of performing a search. The method includes receiving, at a computing device (e.g., of a user device), search results transmitted from a search system in communication with the computing device. The search results include a header for an application executable on the computing device and application access mechanisms associated with the header. Each application access mechanism has a reference to the application and indicates one or more performable operations for the application. The method further includes displaying, on a display in communication with the computing device, a graphical user interface including the header, an expansion element associated with the header, and user selectable access links grouped with the header. Each access link is associated with an application access mechanism for the application. The expansion element has a collapsed state and an expanded state. When the expansion element is in the expanded state, the method includes displaying on the display all of the user selectable access links grouped with the header. However, when the expansion element is in the expanded state, the method includes displaying on the display a threshold number of the user selectable access links grouped with the header, the threshold number being less than a total number of the user selectable access links grouped with the header. The threshold number may be greater than zero. In some examples, a user device includes a display, a computing device in communication with the display, and non-transitory memory in communication with the computing device. The non-transitory memory stores instructions that when executed on the computing device cause the computing device to perform operations that include the method describe above.

Implementations of the disclosure may include one or more of the following optional features. In some implementations, the search results include an advertisement associated with a header. The GUI displays the advertisement in the header or associated with a user selectable access link grouped with the header. In other implementations, the search results include an advertisement record including one or more of an advertisement name, an advertisement identification, a sponsored link name, a sponsored link identification, advertising content, or advertisement parameters. In some examples, the method includes displaying in the GUI the expansion element in the header.

In some examples, the method includes displaying in the GUI the expansion element among the user selectable access links grouped with the header. In response to receiving a user selection of the expansion element indicating the expanded state, the method may include displaying on the display a list of all of the user selectable access links grouped with the header and displaying on the display the expansion element as a last element in the list. Additionally or alternatively, in response to receiving a user selection of the expansion element indicating the collapsed state, the method may include displaying on the display a list of all of the threshold number of the user selectable access links grouped with the header; and displaying on the display the expansion element as a last element in the list.

In some implementations, the header includes a name of the associated application. The method may include displaying in the graphical user interface a header link in the header indicating an installation state of the associated application as being installed or uninstalled. Moreover, in response to receiving a user selection of the header link, when the installation state of the associated application is installed, the method may include executing the application on the computing device; and when the installation state of the associated application is uninstalled, the method may include downloading the application to non-transitory memory in communication with the computing device and executing the application on the computing device. In some examples, the method includes directing the user device to a digital distribution platform to download the application. Once in communication with the digital distribution platform, the user may choose to install the application on the user device.

In some implementations, the method includes displaying in the graphical user interface an ungrouped access link having an associated application access mechanism for an application different from the application associated with the header. The method may include displaying in the graphical user interface an indicator in the ungrouped access link indicating an installation state of the associated application as being installed or uninstalled. Moreover, in response to receiving a user selection of an ungrouped access link, when the installation state of the associated application is installed, the method may include executing the application on the computing device; and when the installation state of the associated application is uninstalled, the method may include downloading the application to non-transitory memory in communication with the computing device and executing the application on the computing device. In some implementations, when the installation state of the associated application is uninstalled, the method includes directing the user device to a digital distribution platform, where the user may choose to install the application on the user device. In some examples, in response to receiving a user selection of an ungrouped access link, when the installation state of the associated application is uninstalled, the method includes executing a web browser on the computing device and accessing functionality of the associated application through the web browser.

The method may include displaying the access links in an order under the header based on a score associated with the application access mechanism of each access link. In some examples, the method includes receiving, at the computing device, search criteria (i.e., search query) through the graphical user interface, generating, at the computing device, a query wrapper including the search criteria, and transmitting the query wrapper from the computing device to the search system.

Another aspect of the disclosure provides a method of performing a search. The method includes receiving at a computing device, a search criteria from a user device in communication with the computing device and executing, using the computing device, a search of a data store in communication with the computing device using the search criteria. The method includes receiving, at the computing device, function records from the data store in response to the executed search. Each of the function records includes an application identifier, an application access mechanism, and application state information. The application access mechanism has a reference to a native application and indicates one or more performable operations for the native application. The application state information describes a state of the native application when the native application performs the one or more operations indicated in the application access mechanism. The method includes grouping the function records, at the computing device, based on the application identifiers, and transmitting header search results from the computing device to the user device for display on the user device. The header search results include a header for each group of function records and an expansion element associated with each header.

In some implementations, the method also includes receiving, at the computing device, an expansion command from the user device. The expansion command indicative of a user selection of an expansion element. The method also includes transmitting access mechanism search results from the computing device to the user device. The access mechanism search results include the application access mechanisms of the group of function records is associated with the header of the selected expansion element. The access mechanism search results include link data for each application access mechanism. The link data includes at least one of text or an image associated with the state of the application referenced by the corresponding application access mechanism.

In some examples, the method further includes filtering the function records, at the computing device, based on their application identifiers by limiting a number of function records per application identifier. Additionally, the method includes scoring the function records based on a relevancy of the function record to the search criteria, and ordering the function records based on their scores. The scoring is based on the application state information of the function record. In some examples, executing the search includes identifying function records of the data store based on matches between terms of the search criteria and terms of the application state information of the function records.

In some example, at least one of the application access mechanisms includes an application resource identifier referencing a native application, wherein the application resource identifier is in an application-specific format specific for the referenced native application and indicates one or more performable operations for the user device. The application resource identifier includes a domain name and a path to be used by the referenced native application to retrieve and display information. The application access mechanism includes instructions for at least one of a search application, an operating system, or the referenced native application when executed on user device. In some implementations, at least one of the application access mechanisms includes a web address that when executed by the user device causes the user device to execute a web browser and access a web version of the native application referenced in the application access mechanism.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A and 3B are schematic views of example function records.

FIGS. 8A and 8B are schematic views of an example user device displaying a graphical user interface that receives a search query and displays search results.

FIGS. 8F-8I are schematic views of example user device displaying a graphical user interface displaying an expanded state and a collapsed state of search results.

FIGS. 8J and 8K are schematic views of example user device showing information relating to a link of the search results.

Like reference symbols in the various drawings indicate like elements.

DETAILED DESCRIPTION

A search system of the present disclosure implements a search based on a query received from a user device. The search system receives a query from a user device that includes search criteria, generates search results in response to the received query, and transmits the search results to the user device. The search results may include various mechanisms for accessing applications or functionality of applications relevant to the search query of the user. In response to selection of an access mechanism, the user device may launch an application referenced in the application access mechanism and perform the one or more operations indicated in the application access mechanism.

Figure 1A:
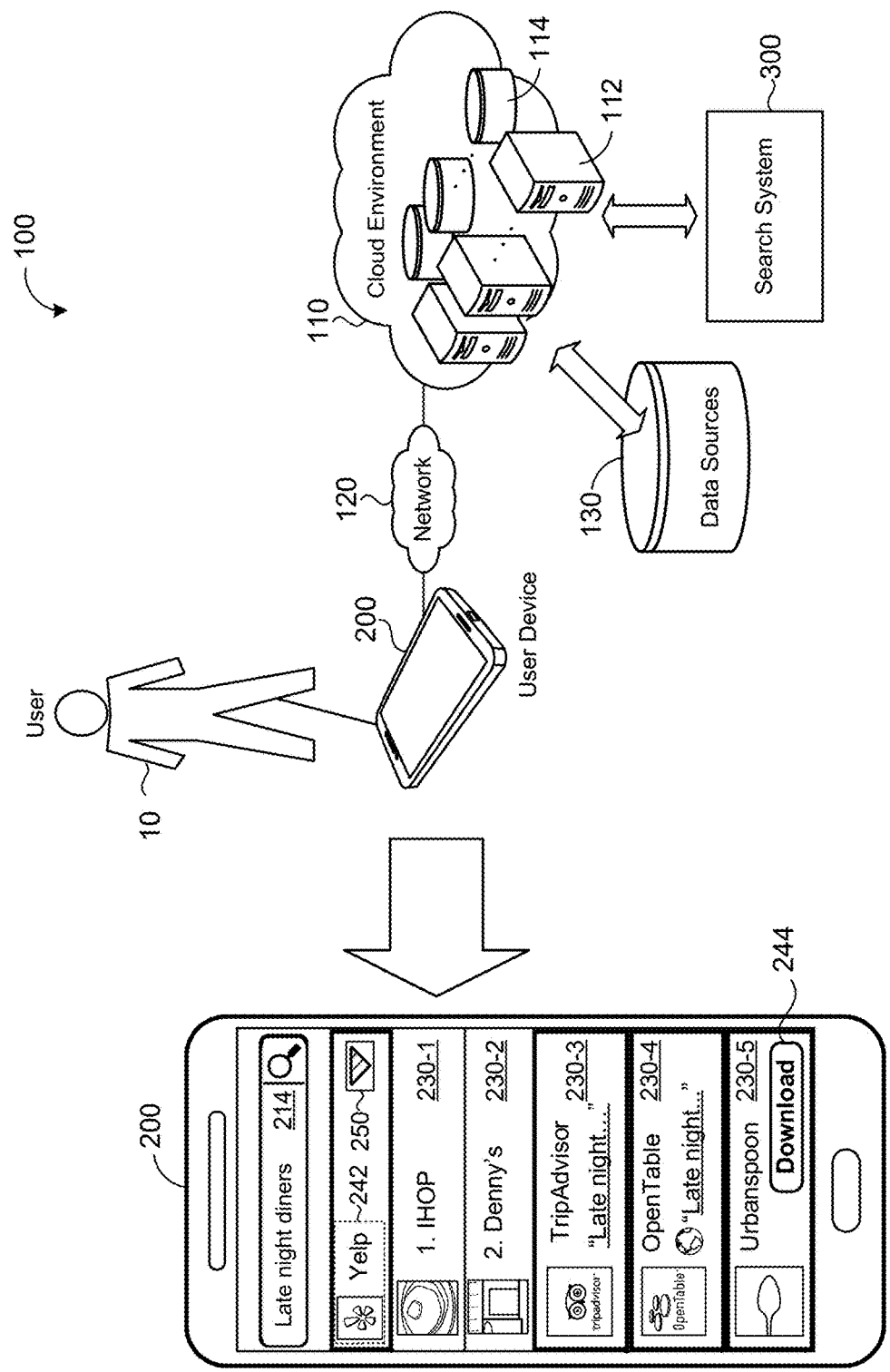
FIG. 1A is a schematic view of an example environment including a user device in communication with a search system.
Figure 1B:
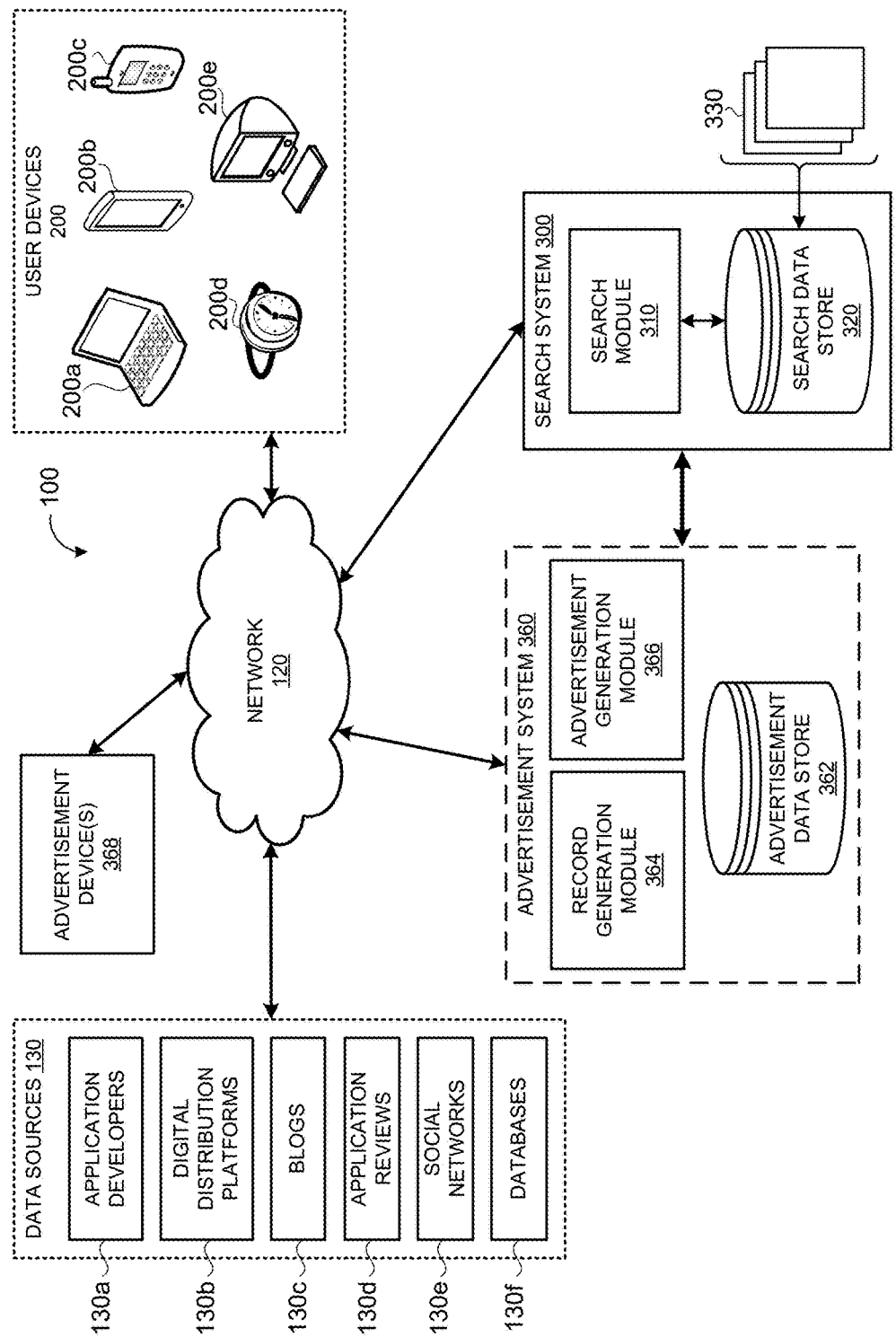
FIG. 1B is a functional block diagram of a search system interacting with user devices and data sources.

FIG. 1A illustrates an example system 100 that includes a user device 200 associated with a user 10 in communication with a remote system 110 via a network 120. FIG. 1B provides a functional block diagram of the system 100. The remote system 110 may be a distributed system (e.g., cloud environment) having scalable/elastic computing resources 112 and/or storage resources 114. The user device 200 and/or the remote system 110 may execute a search system 300 and optionally receive data from one or more data sources 130. In some implementations, the search system 300 communicates with one or more user devices 200 and the data source(s) 130 via the network 120. The network 120 may include various types of networks, such as a local area network (LAN), wide area network (WAN), and/or the Internet.

Figure 2:
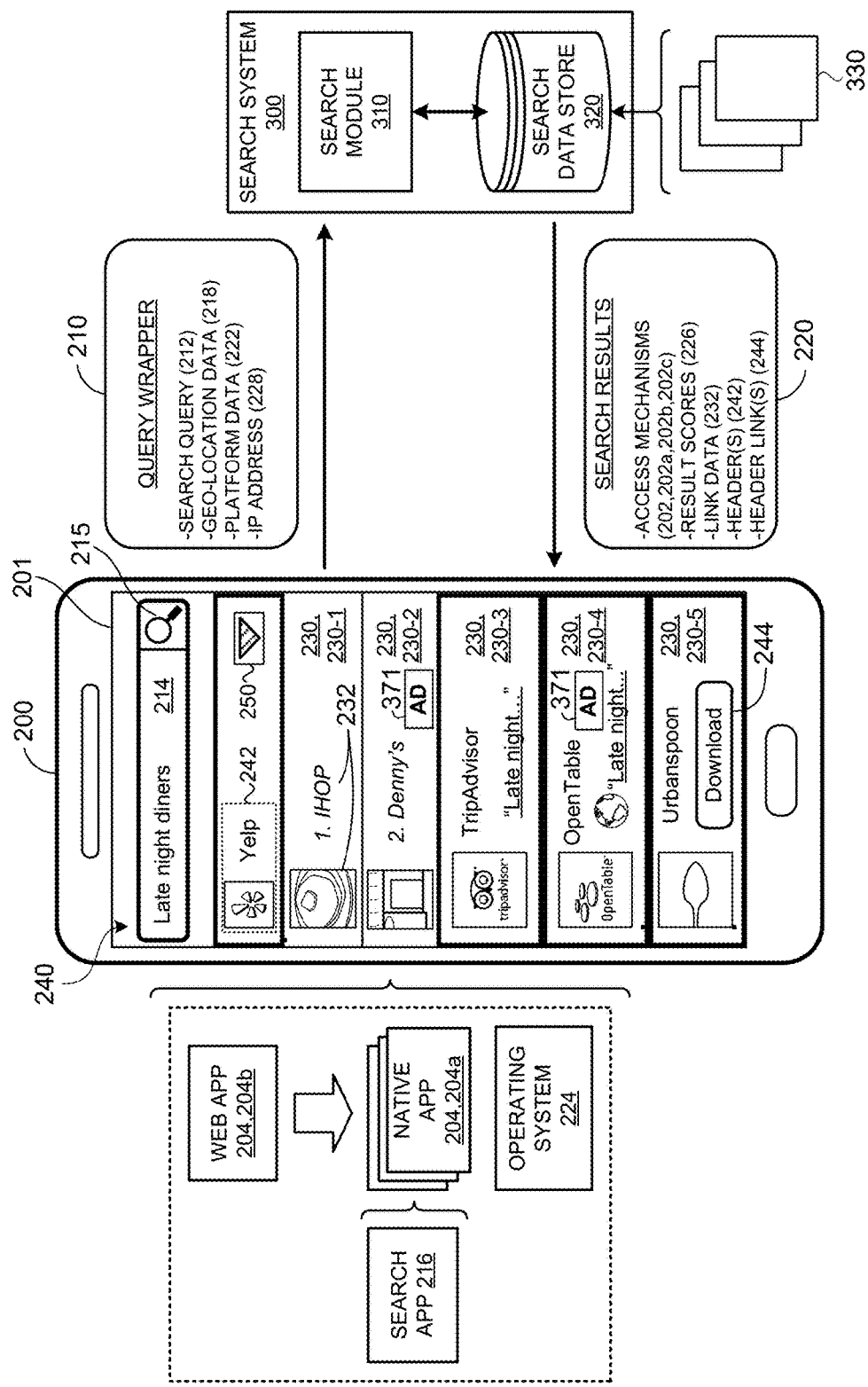
FIG. 2 is a schematic view of an example user device in communication with a search system.

FIG. 2 shows an example user device 200 in communication with the search system 300. User devices 200 can be any computing devices that are capable of providing queries 210, 212 to the search system 300. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 224. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device is a laptop or desktop computing device, the user device may run an operating system including, but not limited to, MICROSOFT WINDOWS® by Microsoft Corporation, MAC OS® by Apple. Inc., or Linux. User devices 200 may also access the search system 300 while running operating systems 224 other than those operating systems 224 described above, whether presently available or developed in the future.

A software application 204 may refer to computer software that, when executed by a computing device, causes the computing device to perform a task. In some examples, a software application 204 may be referred to as an "application", an "app", or a "program". Example software applications 204 include, but are not limited to, word processing applications, spreadsheet applications, messaging applications, media streaming applications, social networking applications, and games.

Applications 204 can be executed on a variety of different user devices 200. In some examples, a native application 204a may be installed on a user device 200 prior to a user 10 purchasing the user device 200. In other examples, the user may 10 download and install native applications 204a on the user device 200.

The functionality of an application 204 may be accessed on the computing device 200 on which the application 204 is installed. Additionally or alternatively, the functionality of an application 204 may be accessed via a remote computing device 112. In some examples, all of an application's functionality is included on the computing device 112, 200 on which the application 204 is installed. These applications 204 may function without communication with other computing devices 112, 200 (e.g., via the Internet). In other examples, an application 204 installed on a computing device 200 may access information from other remote computing devices 112 during operation. For example, a weather application installed on a computing device 200 may access the latest weather information via the Internet and display the accessed weather information to the user 10 through the installed weather application. In still other examples, a web-based application 204b (also referred to herein as a web application) may be partially executed by the user's computing device 200 and partially executed by a remote computing device 112. For example, a web application 204b may be an application 204 that is executed, at least in part, by a web server and accessed by a web browser (e.g., a native application 204a) of the user's computing device 200. Example web applications 204b may include, but are not limited to, web-based email, online auctions, and online retail sites.

In general, the user device 200 may communicate with the search system 300 using any software application 204 that can transmit search queries 212 to the search system 300. In some examples, the user device 200 runs a native application 204a that is dedicated to interfacing with the search system 300, such as a native application 204a dedicated to searches (e.g., a search application 216). In some examples, the user device 200 communicates with the search system 300 using a more general application 204, such as a web-browser application 204b accessed using a web browser native application 204a. Although the user device 200 may communicate with the search system 300 using the native search application 216 and/or a web-browser application 204b, the user device 200 may be described hereinafter as using the native search application 216 to communicate with the search system 300. In some implementations, the functionality attributed to the search application 216 may be included as a searching component of a larger application 204 that has additional functionality. For example, the functionality attributed to the search application 216 may be included as part of a native application 204a or a web application 204b as a feature that provides search capabilities.

Native applications 204a can perform a variety of different functions for a user 10. For example, a restaurant reservation application can make reservations for restaurants. As another example, an internet media player application can stream media (e.g., a song or movie) from the Internet. In some examples, a single native application 204a can perform more than one function. For example, a restaurant reservation application may also allow a user to retrieve information about a restaurant and read user reviews for the restaurant in addition to making reservations. As another example, an internet media player application may also allow a user to perform searches for digital media, purchase digital media, and generate media playlists.

Referring to FIGS. 1A-2, the search system 300 includes a search module 310 in communication with a search data store 320. The search data store 320 may include one or more databases, indices (e.g., inverted indices), tables, files, or other data structures which may be used to implement the techniques of the present disclosure. The search module 310 receives a query wrapper 210 and generates search results 220 based on the data included in the data store 320. In some implementations, the search module 310 receives a query wrapper 210 from the user device 200 and performs a search for function records 330 included in the search data store 320 based on data included in the query wrapper 210, such as a search query 212. The function records 330 include one or more access mechanisms 202 that the user device 200 can use to access different functions for a variety of different applications, such as native applications 204a installed on the user device 200. The search module 310 transmits search results 220 including a list of access mechanisms 202 to the user device 200 that generated the query wrapper 210.

The user device 200 generates user selectable links 230 based on the received search results 220 (e.g., links 230-1, 230-2, . . . , 230-5 of FIG. 2). Each user selectable link 230 displayed to the user 10 may include an access mechanism 202. The user 10 may select a user selectable link 230 on the user device 200 by interacting with the link 230 (e.g., touching or clicking the link). In response to selection of a link 230, the user device 200 may launch a corresponding software application 204 (e.g., a native application 204a or a web-browser application 204b) referenced by the access mechanism 202 and perform one or more operations indicated in the access mechanism 202.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 230 including an access mechanism 202 in order to access functionality of an application 204 indicated in the user selectable link 230. The search module 310 may transmit one or more application access mechanisms 202a, one or more web access mechanisms 202b, and one or more application download mechanisms 202c to the user device 200 in the search results 220.

An application access mechanism 202a may be a string that includes a reference to a native application 204a and indicates one or more operations for the user device 200 to perform. If a user 10 selects a user selectable link 230 including an application access mechanism 202a, the user device 200 may launch the native application 204a referenced in the application access mechanism 202a and perform the one or more operations indicated in the application access mechanism 202a.

An application access mechanism 202a includes data that the user device 200 can use to access functionality provided by a native application 204a. For example, an application access mechanism 202a can include data that causes the user device 200 to launch a native application 204a and perform a function associated with the native application 204a. Performance of a function according to the access mechanism 202 may set the native application 204a into a specified state. Accordingly, the process of launching a native application 204a and performing a function according to an application access mechanism 202a may be referred to herein as launching the native application 204a and setting the native application 204a into a state that is specified by the application access mechanism 202a. In some examples, an application access mechanism 202a for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202a for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms 202a may have various different formats and content. The format and content of an application access mechanism 202a may depend on the native application 204a with which the application access mechanism 202 is associated and the operations that are to be performed by the native application 204a in response to selection of the application access mechanism 202a. For example, an application access mechanism 202a for an internet music player application may differ from an application access mechanism 202a for a shopping application. An application access mechanism 202a for an internet music player application may include references to musical artists, songs, and albums, for example. The application access mechanism 202a for an internet music player application may also reference operations, such as randomizing a list of songs and playing a song or album. An application access mechanism 202a for a shopping application may include references to different products that are for sale. The application access mechanism 202a for the shopping application may also include references to one or more operations, such as adding products to a shopping cart and proceeding to a checkout.

The search system 300 transmits additional data in the search results 220 along with the application access mechanisms 202a. For example, the search system 300 may transmit data (e.g., link data 232, such as text and/or images) which may be used by the user device 200 to generate user selectable links 230 in the search results 220. A link 230 may include text and/or images that the user 10 may select (e.g., touch) via a user interface 240 displayed on a screen 201 (e.g., a display or touch screen) of the user device 200. Each user selectable link 230 may be associated with an application access mechanism 202a such that when the user 10 selects a link 230, the user device 200 launches the native application 204a referenced in the application access mechanism 202a and performs the one or more operations indicated in the application access mechanism 202a. The text and/or images of a link 230 displayed to the user 10 may indicate the operations that will be performed in response to selection of the link 230. For example, if the link 230 is to a song in a music playing application, the text and/or images may identify the music application that will be launched by the user device 200 and the song that will be played by the music playing application when the user 10 selects the link 230.

The user 10 may select a link 230 to cause the user device 200 to launch the native application 204a identified in the link 230 and perform one or more operations according to the application access mechanism 202a associated with the link 230. Put another way, when the user 10 selects a link 230, the user device 200 launches a native application 204a and sets the native application 204a into a state defined by the application access mechanism 202a associated with the link. In general, a state of a native application 204a may refer to the operations and/or the resulting outcome of the native application 204a in response to selection of a link 230. A state of a native application 204a may also be referred to herein as an "application state."

An application state specified by an application access mechanism 202a may depend on the functionality provided by the native application 204a. For example, if a native application 204a is configured to retrieve and display information from the Internet, the native application 204a can be set into a state in which the native application 204a retrieves information from the Internet and displays information to the user 10. In another example, if a native application 204a is configured to play media (e.g., music and/or video) from the Internet, the native application 204a can be set into a state in which the native application 204a is playing a song or a movie from the Internet. In another example, if a native application 204a is configured to make restaurant reservations, the native application 204a can be set into a state in which the native application 204a displays available restaurant reservations to the user 10.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 230 including a web access mechanism 202b, the user device 200 may launch the web browser application 204b and retrieve the web resource indicated in the resource identifier. Put another way, if a user 10 selects a user selectable link 230 including a web access mechanism 202b, the user device 200 may launch a corresponding web-browser application 204b and access a state (e.g., a page) of a web application/website. In some examples, web access mechanisms 202b include URLs for mobile-optimized sites and/or full sites.

The web access mechanism 202b included in a function record 330 may be used by a web browser to access a web resource that includes similar information and/or performs similar functions as would be performed by a native application 204a that receives an application access mechanism 202a of the function record 330. For example, the web access mechanism 202b of a function record 330 may direct the web-browser application 204b of the user device 200 to a web version of the native application 204a referenced in the application access mechanisms 202a of the function record 330. Moreover, if the application access mechanisms 202 included in a function record 330 for a specific Mexican restaurant cause each application edition to retrieve information for the specific Mexican restaurant, the web access mechanism 202b may direct the web-browser application 204b of the user device 200 to a web page entry for the specific Mexican restaurant.

An application download mechanism 202c may indicate a location (e.g., a digital distribution platform 130b) where a native application 204a can be downloaded in the scenario where the native application 204a is not installed on the user device 200. If a user 10 selects a user selectable link 230 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

The search module 310 is configured to receive a query wrapper 210 from the user device 200 via the network 120. A query wrapper 210 may include a search query 212, which may include text, numbers, and/or symbols (e.g., punctuation) entered into the user device 200 by the user. For example, the user 10 may enter the search query 212 into a search field 214 (e.g., a search box) of a graphical user interface (GUI) 240 of a search application 216 running on the user device 200. A user 10 may enter a search query 212 using a touchscreen keypad, a mechanical keypad, a speech-to-text program, or other form of user input. In general, a search query 212 may be a request for information retrieval (e.g., search results) from the search system 300. For example, a search query 212 may be directed to retrieving a list of links 230 to application functionality or application states in examples where the search system 300 is configured to generate a list of access mechanisms 202 as search results 220. A search query 212 directed to retrieving a list of links 230 to application functionality may indicate a user's desire to access functionality of one or more applications described by the search query.

The query wrapper 210 may include additional data along with the search query 212. For example, the query wrapper 210 may include geo-location data 218 that indicates the location of the user device 200, such as latitude and longitude coordinates. The user device 200 may include a global positioning system (GPS) receiver that generates the geo-location data 218 transmitted in the query wrapper 210. The query wrapper 210 may also include an IP address 228, which the search module 310 may use to determine the location of the user device 200. In some examples, the query wrapper 210 may also include additional data, including, but not limited to, platform data 222 (e.g., version of the operating system 224, device type, and web-browser version), an identity of a user of the user device 200 (e.g., a username), partner specific data, and other data.

The search module 310 can use the search query 212 and the additional data included in the query wrapper 210 to generate the search results 220. For example, the search module 310 can determine a geo-location of the user device 200, which the search module 310 can use along with the search query 212 to generate the search results 220. The search module 310 can determine the geo-location of the user device 200 based on the geo-location data 218 or other data (e.g., IP address 228) included in the query wrapper 210. In some implementations, the search module 310 detects a location (e.g., a postal address, street name, city name, etc.) specified in the search query 212 (i.e., a query-specified location). In these implementations, the search module 310 can use the query-specified location along with the search query 212 to generate the search results 220.

The search module 310 performs a search for function records 330 included in the search data store 320 in response to the received query wrapper 210 (e.g., in response to the search query 212 and the geo-location data 218). In some implementations, the search module 310 generates result scores 226 for function records 330 identified during the search. The result score 226 associated with a function record 330 may indicate the relevance of the function record 330 to the search query 212. A higher result score 226 may indicate that the function record 330 is more relevant to the search query 212. The search module 310 may retrieve access mechanisms 202 from the scored function records 330. The search module 310 can transmit a result score 226 along with an access mechanism 202 retrieved from a scored function record 330 in order to indicate the rank of the access mechanism 202 among other transmitted access mechanisms 202.

An application access mechanism 202a included in a function record 330 may be an application resource identifier or a string that includes a reference to a native application 204a and/or indicates one or more operations for execution by the native application 204a on the user device 200. An application resource identifier may be a string having an application specific scheme in some examples. For example, the application resource identifier may include a reference to a native application 204a, a domain name, and a path to be used by the native application 204a to retrieve and display information to the user 10. In some examples, an application resource identifier is an application specific resource identifier that is defined by the developer of the application 204. In this example, the search application 216 receives the application resource identifier and the operating system 224 may send the application resource identifier to the native application 204a referenced in the application resource identifier. The native application 204a referenced in the application resource identifier launches and is set into the state specified by the application resource identifier.

In some examples, the application access mechanism 202a includes operations for the user device 200 to perform in addition to the operation(s) indicated in the application resource identifier. For example, the search application 216, the operating system 224, and/or a native application 204a on the user device 200 may perform the operations included in the application access mechanism 202a. In some examples, a script includes the operations. Examples of operations may include, but are not limited to, launching a native application 204a, creating and sending a search request 212 (via a search wrapper 210) to an application server 112, setting a current geographic location in a native application 204a, making a restaurant reservation, sending a text message, and adding an appointment to a calendar.

In some examples, an application access mechanism 202a may not include an application resource identifier. Instead, the application access mechanism 202a includes one or more operations that reference a native application 204a and indicate one or more operations for execution by the user device 200. The one or more operations may include instructions for at least one of the search application 216, the operating system 224, and/or a native application 204a on the user device 200. In response to selection of the application access mechanism 202a, the user device 200 may perform the operations included in the application access mechanism 202a. In some examples, the operations may be included in a script.

In some examples, an application function may not be accessible using an application resource identifier. For example, a function of the application may not include a corresponding application resource identifier that the application 204 may use to perform the function. As another example, some applications 204 may not be configured to receive application resource identifiers. In these examples, an application access mechanism 202 for the native application 204a can include one or more operations that cause the native application to perform the function that may not otherwise be accessible using an application resource identifier. For example, the search application 216 may receive the one or more operations and execute the one or more operations to set the native application 204a into the desired application state. In some examples, the one or more operations may include launching the native application 204a along with additional operations for the native application 204a to perform. For example, the search application 216 may initially trigger the native application 204a to start and then wait for a period of time for the native application 204a to start. Then the search application 216 may perform additional operations included in the received application access mechanism 202, such as issuing a search instruction to the native application 204a.

In still other examples, a native application 204a may be configured to directly receive the operations transmitted by the search system 100. In these examples, the native application 204a may be launched according to the application access mechanism 202 and then the launched native application 204a may directly perform the operations received from the search system 100.

A single native application 204a can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different application access mechanisms. For example, with respect to the restaurant reservation application, the search data store 320 may include function records 330 having different application access mechanisms 202 for accessing different restaurant reviews and setting up reservations. Similarly, the search data store 320 may include function records 330 having different application access mechanisms 202 for booking hotels, booking flights, and accessing reviews for different travel destinations.

The application access mechanisms 202 for a single native application 204a may vary in complexity. In some examples, the application access mechanisms 202 may cause a native application 204a to launch (e.g., the operating system 224 may be instructed to launch the application 204) and then perform additional operations after launching, as described above. In other examples, application access mechanisms 202 may cause an application 204 to launch into a default state (e.g., a default homepage) without performing any additional operations. A function record 330 including an application access mechanism 202 that causes an application 204 to launch into a default state may be thought of as an access mechanism 202 that is related to the native application 204a, but not any particular state which may be accessed by the application 204.

The search module 310 may transmit additional data to the user device 200 along with the access mechanisms 202 and the result score(s) 226. For example, the search module 310 may transmit data (e.g., link data 232, such as text and/or images) to be included in the user selectable links 230. Data for the user selectable links 230 (e.g., text and/or images) may be referred to herein as "link data" (e.g., link data 232). The user device 200 displays the user selectable links 230 to the user 10 based on received link data 232. Each user selectable link 230 may be associated with an access mechanism 202 included in the search results 220, such that when a user 10 selects a link 230, the user device 200 launches the application 204 referenced in the access mechanism 202 and sets the application 204 into the state specified by the access mechanism 202.

With reference to FIG. 2, the user device 200 may receive a set of search results 220 from the search module 310 in response to transmission of the query wrapper 210 to the search system 300. The GUI 240 of the search application 216 displays (e.g., renders) the search results 220 received from the search module 310. The search application 216 may display the search results 220 to the user in a variety of different ways, depending on what information is transmitted to the user device 200. In examples where the search results 220 include a list of access mechanisms 202 and link data 232 associated with the access mechanisms 202, the search application 216 may display the search results 220 to the user 10 as a list of user selectable links 230 including text and images. The text and images in the links 230 may include application names associated with the access mechanisms 202, text describing the access mechanisms 202, images associated with the application 204 referenced by the access mechanisms 202 (e.g., application icons), and images associated with the application state (e.g., application screen images) defined by the access mechanisms 202.

In some implementations, the search application 216 displays the search results 220 as a list of links 230 arranged under the search field 214 in which the user 10 entered the search query 212. Moreover, the search application 216 may arrange the links 230 in order based on result scores 226 associated with the access mechanisms 202 included in the links 230. In some examples, the search application 216 groups the links 230 together if the links 230 are related to the same application 204 (e.g., a native application 204a).

Each of the links 230 includes link data 232. For example, each of the links 230 includes an image (e.g., an icon) and text (e.g., an application or business name) that may describe an application and a state of an application. Each of the links 230 may include an access mechanism so that if a user selects one of links 230, the user device 200 launches the application and sets the application into a state that is specified by the access mechanism associated with the selected link. In some implementations, the user device 200 may arrange the links 230 based on result scores associated with the access mechanisms included in the links 230. In some implementations, as illustrated in FIG. 2, links 230 for the same application 204 may be combined together in the search results 220 displayed to the user 10.

With respect to FIG. 2, it may be assumed that the native application 204a for YELP® developed by Yelp, Inc., and the native application 204a for TRIPADVISOR® developed by TripAdvisor, Inc., are installed on the user device 200. Links 230-1, 230-2 and link 230-3 reference the YELP® native application and the TRIPADVISOR® native application, respectively. The GUI 240 includes a header 242, including the name "Yelp," under which the links 230-1, 230-2 are arranged. The header 242 may indicate that the links 230-1, 230-2 arranged below the header 242 are associated with the YELP® native application 204a. Selection of link 230-1 may cause the user device 200 to launch the YELP® native application 204a and retrieve an IHOP® restaurant entry of the YELP® native application 204a. Selection of link 230-2 may cause the user device 200 to launch the YELP® native application 204a and retrieve a DENNY'S® restaurant entry of the YELP® native application 204a. Selection of link 230-3 may cause the user device 200 to launch the TRIPADVISOR® native application 204a and retrieve an entry for "Late night diners" in the TRIPADVISOR® native application 204a (e.g., a search for "Late night diners"). The header 242 may include an expansion element 250 for displaying all or some of the links 230 associated with the header 242. The expansion element 250 includes a collapsed state 250a (FIGS. 8F and 8H) and an expanded state 250b (FIGS. 8G and 8I) that are mutually exclusive. As described, the expansion element 250 toggles between the collapsed state 250a and the expanded state 250b. The expansion element 250 may include an expansion button separate from a collapse button. In some examples, the search application 216 groups links 230 together when the links 230 are related to the same application 204. In such a case, the search application 216 only displays the header 242 associated with the application 204 and a user 10 may select the expansion element 250 to view the links 230. In other examples, the search application 216 displays a threshold number of links 230 (e.g., three links 230) and when the user 10 selects the expansion link 250 the remainder of the search results 220, i.e., links 230 associated with the application 204 are displayed.

Link 230-4 includes a web access mechanism 202b (e.g., a URL). Selection of link 230-4 may cause the user device 200 to launch the web-browser application 204b and retrieve an entry for "Late night diners" in the OPENTABLE® web-browser application 204b developed by OpenTable, Inc. Link 230-5 includes an application download mechanism 202c for the URBANSPOON® native application 204a by InterActiveCorp. Selection of link 230-5 may cause the user device 200 to access a digital distribution platform 130b (FIG. 1B) from which the URBANSPOON® native application 204a can be downloaded and/or previewed. The search module 310 can be configured to transmit any combination of application access mechanisms 202a, web access mechanisms 202b, and application download mechanisms 202c in the search results 220.

In some examples, user devices 200 communicate with the search system 300 via a partner computing system (not illustrated). The partner computing system may be a computing system of a third party that may leverage the search functionality of the search system 300. The partner computing system may belong to a company or organization other than that which operates the search system 300. Example third parties which may leverage the functionality of the search system 300 may include, but are not limited to, internet search providers and wireless communications service providers. The user devices 200 may send search queries to the search system 300 and receive search results via the partner computing system. The partner computing system may provide a user interface to the user devices 200 in some examples and/or modify the search experience provided on the user devices 200.

FIG. 1B shows a plurality of data sources 130. The data sources 130 may be sources of data which the search system 300 (e.g., the search module 310) may use to generate and update the data store 320. The data retrieved from the data sources 130 can include any type of data related to application functionality and/or application states. Data retrieved from the data sources 130 may be used to create and/or update one or more databases, indices, tables (e.g., an access table), files, or other data structures included in the data store 320. For example, function records 330 may be created and updated based on data retrieved from the data sources 130. In some examples, some data included in a data source 130 may be manually generated by a human operator. Data included in the function records 330 may be updated over time so that the search system 300 provides up-to-date results.

The data sources 130 may include a variety of different data providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

The search system 300 retrieves data from one or more of the data sources 130. The data retrieved from the data sources 130 can include any type of data related to application functionality and/or application states. The search system 300 generates function records 330 based on the data retrieved from the data sources 130. In some examples, a human operator manually generates some data included in the function records 330. The search system 300 may update data included in the function records 330 over time so that the search system 300 provides up-to-date results 220.

Figure 3D:
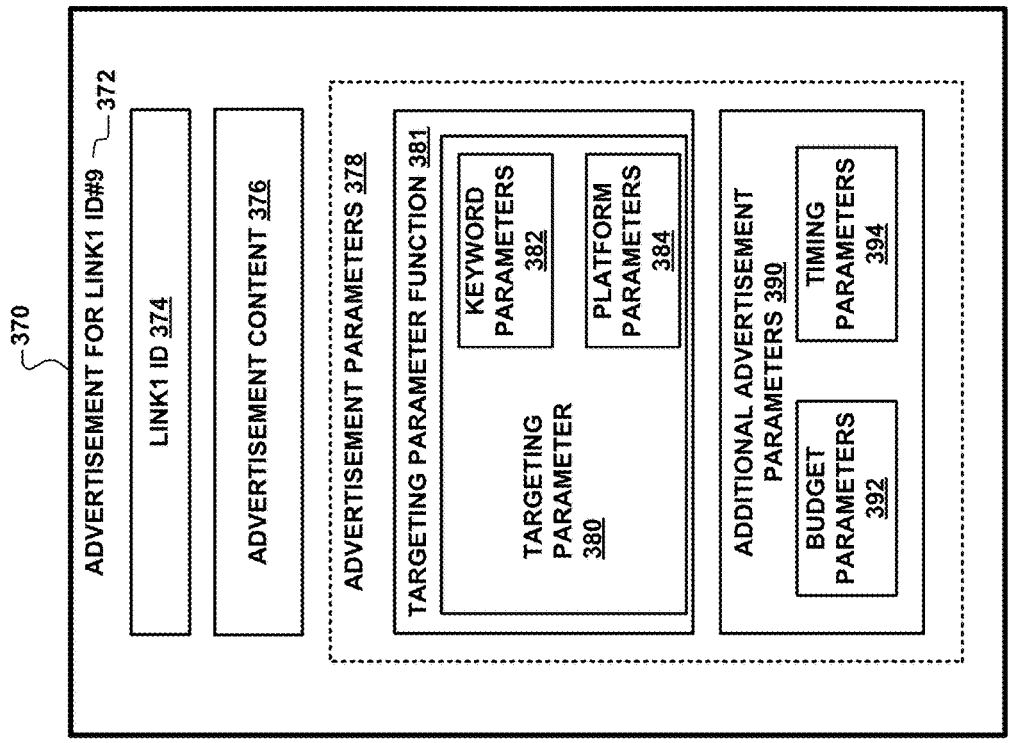
FIGS. 3C and 3D are schematic views of example advertisement records.
Figure 3C:
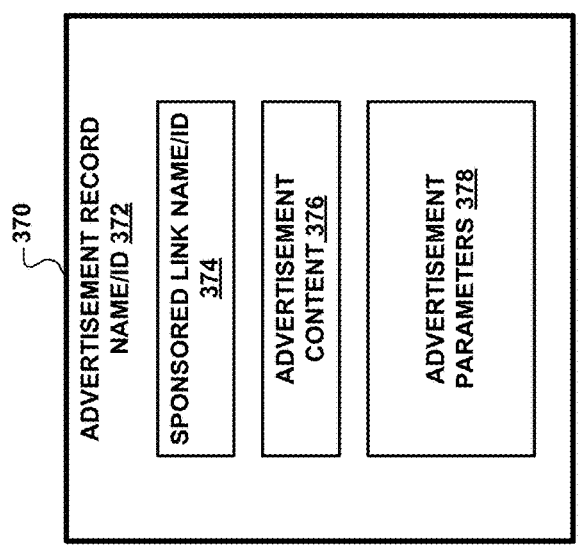

Referring to FIGS. 3A and 3B, the search data store 320 includes a plurality of different function records 330. Each function record 330 may include data related to a function of an application 204 and/or the state of the application 204 resulting from performance of the function. A function record 330 may include a function identifier (ID) 332, application state information 334, an application identifier (ID) 336, and one or more access mechanisms 202, 202a. 202b, 202c used to access functionality provided by an application 204.

The function ID 332 may be used to identify the function record 330 among the other function records 330 included in the search data store 320. The function ID 332 may be a string of alphabetic, numeric, and/or symbolic characters (e.g., punctuation marks) that uniquely identifies the associated function record 330. In some examples, the function ID 332 describes a function and/or an application state in human readable form. For example, the function ID 332 may include the name of the application 204 referenced in the access mechanism(s) 202. In a specific example, a function ID 332 for an internet music player application may include the name of the internet music player application along with the song name that will be played when the internet music player application is set into the state defined by the application access mechanism included in the function record. Additionally or alternatively, the function ID 332 may be a human readable string that describes a function performed according to the access mechanism(s) 202 and/or an application state resulting from performance of the function according to the access mechanism(s) 202. In some examples, the function ID 332 includes a string in the format of a uniform resource locator (URL) of a web access mechanism 202b for the function record 330, which may uniquely identify the function record 330.

In a more specific example, if the function record 330 describes a function of the YELP® native application, the function ID 332 may include the name "Yelp" along with a description of the application state described in the application state information 334. For example, the function ID 332 for a function record 330 that describes the restaurant named "The French Laundry" may be "Yelp—The French Laundry." In an example where the function ID 332 includes a string in the format of a URL, the function ID 332 may include the following string "http://www.yelp.com/biz/the-french-laundry-yountville-2?ob=1" to uniquely identify the function record 330. In additional examples, the function ID 332 may include a URL using a namespace other than "http://," such as "func://," which may indicate that the URL is being used as a function ID in a function record. For example, the function ID 332 may include the following string "func://www.yelp.com/biz/the-french-laundry-yountville-2?ob=1."

The application state information 334 may include data that describes an application state into which an application 204 is set according to the access mechanism(s) 202 in the function record 330. Additionally or alternatively, the application state information 334 may include data that describes the function performed according to the access mechanism (s) 202 included in the function record 330. The application state information 334 can include text, numbers, and symbols that describe the application state. The types of data included in the application state information 334 may depend on the type of information associated with the application state and the functionality specified by the application access mechanism 202a. The application state information 334 may include a variety of different types of data, such as structured, semi-structured, and/or unstructured data. The application state information 334 may be automatically and/or manually generated based on documents retrieved from the data sources 130. Moreover, the application state information 334 may be updated so that up-to-date search results 220 can be provided in response to a search query 212.

In some examples, the application state information 334 includes data that may be presented to the user 10 by an application 204 when the application 204 is set in the application state defined by the access mechanism(s) 202. For example, if one of the access mechanism(s) 202 is an application access mechanism 202a, the application state information 334 may include data that describes a state of the native application 204a after the user device 200 has performed the one or more operations indicated in the application access mechanism 202a. For example, if the function record 330 is associated with a shopping application, the application state information 334 may include data that describes products (e.g., names and prices) that are shown when the shopping application is set to the application state defined by the access mechanism(s) 202. As another example, if the function record 330 is associated with a music player application, the application state information 334 may include data that describes a song (e.g., name and artist) that is played when the music player application is set to the application state defined by the access mechanism(s) 202.

The types of data included in the application state information 334 may depend on the type of information associated with the application state and the functionality defined by the access mechanism(s) 202. For example, if the function record 330 is for an application 204 that provides reviews of restaurants, the application state information 334 may include information (e.g., text and numbers) related to a restaurant, such as a category of the restaurant, reviews of the restaurant, and a menu for the restaurant. In this example, the access mechanism(s) 202 may cause the application 204 (e.g., a native application 204a or a web-browser application 204b) to launch and retrieve information for the restaurant. As another example, if the function record 330 is for an application 204 that plays music, the application state information 334 may include information related to a song, such as the name of the song, the artist, lyrics, and listener reviews. In this example, the access mechanism(s) 202 may cause the application 204 to launch and play the song described in the application state information 334.

The search system 300 may generate application state information 334 included in a function record 330 in a variety of different ways. In some examples, the search system 300 retrieves data to be included in the application state information 334 via partnerships with database owners and developers of native applications 204a. For example, the search system 300 may automatically retrieve the data from online databases 130f that include, but are not limited to, data related to movies, television programs, music, and restaurants. In some examples, a human operator manually generates some data included in the application state information 334. The search system 300 may update data included in the application state information 334 over time so that the search system 300 provides up-to-date results 220.

The application ID 336 may be used to identify a native application 204a associated with the function record 330. The application ID 336 may be a string of alphabetic, numeric, and/or symbolic characters (e.g., punctuation marks) that uniquely identifies the associated native application 204a. In some examples, the application ID 336 the native application 204a in human readable form. For example, the application ID 336 may include the name of the application 204 referenced in the access mechanism(s) 202. In a specific example, the application ID 336 for a restaurant finder application 204 may include the name of the restaurant finder application.

A function record 330 including an application access mechanism 202 that causes an application 204 to launch into a default state may include application state information 334 describing the native application 204a, instead of any particular application state. For example, the application state information 334 may include the name of the developer of the application 204, the publisher of the application 204, a category 335a (e.g., genre) of the application 204, a description 335b of the application 204 (e.g., a developer's description), and the price of the application 204. The application state information 334 may also include security or privacy data about the application 204, battery usage of the application 204, and bandwidth usage of the application 204. The application state information 334 may also include application statistics. Application statistics may refer to numerical data related to a native application 204a. For example, application statistics may include, but are not limited to, a number of downloads, a download rate (e.g., downloads per month), a number of ratings, and a number of reviews.

FIG. 3B shows an example function record 330 associated with the OPENTABLE® application, developed by OpenTable, Inc. The OPENTABLE® application is a restaurant-reservation application that allows users to search for restaurants and make restaurant reservations. The OPENTABLE® application provides information about restaurants including descriptions of restaurants and user reviews of the restaurants. The example function record 330 of FIG. 3B describes an application state of the OPENTABLE® application in which the OPENTABLE® application accesses information for THE FRENCH LAUNDRY® restaurant.

The example function record 330 includes a function ID 332 of "OPENTABLE—THE FRENCH LAUNDRY," which may be used as a unique identifier to identify the function record 330. In other examples, the function ID 332 could include a URL as a unique identifier for the function record 330. For example, the function ID 332 may include the string "http://www.opentable.com/the-french-laundry" as a unique identifier for the function record 330. As described herein, such a function ID may be included in a web access mechanism 202b of a function record 330. As another example, the function ID 332 may have a different namespace than "http://," such as "func://." In yet another example, the function ID 332 could be a string of characters, numbers, and/or symbols that are not in human readable form. Each example is optional and may be combined with other examples.

The example application state information 334 includes data fields 335, such as a category 335a of THE FRENCH LAUNDRY® restaurant, a description 335b of THE FRENCH LAUNDRY® restaurant, user reviews 335c of THE FRENCH LAUNDRY® restaurant, and additional data fields 335. The restaurant category 335a field may include the text "French cuisine" and "contemporary," for example. The description field 335b may include text that describes THE FRENCH LAUNDRY® restaurant. The user reviews field 335c may include text of user reviews for THE FRENCH LAUNDRY® restaurant. The additional data fields 335 may include additional data for THE FRENCH LAUNDRY® restaurant that may not specifically fit within the other defined fields, such as a menu for the restaurant, prices, and operating hours for the restaurant.

The function record 330 includes one or more access mechanism(s) 202. The access mechanism(s) 202 may include a reference to the OPENTABLE® application 204. An example application access mechanism 202a for the function record 330 may include a reference to the OPENTABLE® native application 204a along with one or more operations to be performed by the user device 200. For example, the application access mechanism 202a may include an application resource identifier and/or one or more operations that cause the user device 200 to access the entry for THE FRENCH LAUNDRY® restaurant in the OPENTABLE® native application. An example application resource identifier may be "vnd.opentable.deeplink://opentable.com/restaurantiprofile?rid=1180&refid=1."

In some implementations, a function record 330 includes multiple different application access mechanisms 202, 202a, 202b, 202c that may include a variety of information. The application access mechanism 202 may include edition information that indicates the application edition with which the application access mechanism 202 is compatible. For example, the edition information may indicate the operating system 224 with which the application access mechanism 202 is compatible. Moreover, different application access mechanisms 202 may be associated with different editions of a native application 204a. A native application edition (hereinafter "application edition") refers to a particular implementation or variation of a native application 204a. For example, an application edition may refer to a version of a native application 204a, such as a version 1.0 of a native application 204a or a version 2.0 of a native application 204a. In another example, an application edition may refer to an implementation of a native application 204a for a specific platform, such as a specific operating system 224.

The different application access mechanisms 202 included in a function record 330 may cause the corresponding application editions to launch and perform similar functions. Accordingly, the different application access mechanisms 202 included in a function record 330 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

In some examples, a function record 330 for a native application that retrieves restaurant information may include multiple different application access mechanisms 202 for multiple different application editions. Assuming the function record 330 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the search system 300 can determine whether to transmit the application access mechanism 202 in the search results 220 based on whether the user device 200 can handle the application access mechanism 202.

Referring also to FIG. 2, the search system 300 generates search results 220 including a list of application access mechanisms 202 that are included in selected function records 330. Initially, the search system 300 analyzes the search query 212 received from the user device 200. The search system 300 then identifies a set of function records 330 based on the received search query 212. For example, the search system 300 may identify the set of function records 330 based on matches (e.g., text matches) between terms of the search query 212 and terms of the application state information 334 included in the identified function records 330.

The search system 300 processes (e.g., scores) the identified set of function records 330. For example, the search system 300 may determine how well the function records 330 match the received search query 212. The search system 300 may then select the application access mechanisms 202 from the function records 330 that best match the received search query 212. The search system 300 transmits search results 220 including the selected application access mechanisms 202 to the user device 200 that generated the search query 212. The search system 300 may also transmit additional data along with the application access mechanisms 202. For example, the search system 300 may transmit data (e.g., link data 232, such as text and/or images) to be included in user selectable links 230.

During some searches, the search system 300 may identify one or more function records 330 that include multiple application access mechanisms 202. In these scenarios, the search system 300 may process (e.g., score) the identified set of function records 330 in the manner described above. For each identified function record 330 including multiple application access mechanisms 202, the search system 300 may select which application access mechanisms 202 to transmit to the user device 200. In some examples, the search system 300 transmits each of the application access mechanisms 202 of the identified function record 330 to the user device 200 so that the user device 200 may determine which application access mechanism 202 to use. In other examples, the search system 300 determines which of the multiple application access mechanisms 202 to transmit to the user device 200 based on information included in the query wrapper 210 received from the user device 200. For example, the search system 300 may select and transmit one or more of the application access mechanisms 202 that are likely to be compatible with the user device 200, e.g., based on a version of the operating system 224 of the user device 200.

During some searches, the search system 300 may identify one or more function records 330 that include application access mechanisms 202a and one or more web access mechanisms 202b. In these scenarios, the search system 300 may process (e.g., score) the identified set of function records 330 in the manner described above. For each identified function record 330 including application access mechanisms 202a and a web access mechanism 202b, the search system 300 may determine whether to transmit the web access mechanism 202b and the application access mechanisms 202a. In some examples, the search system may transmit the web access mechanism and each of the multiple application access mechanisms to the user device so that the user device can determine which of the access mechanisms to use. In other examples, the search system may determine whether any of the application access mechanisms should be transmitted to the user device. If the search system determines that none of the application access mechanisms are likely to be compatible with the user device, the search system can refrain from sending the application access mechanisms to the user device. Instead, the search system may transmit the web access mechanism to the user device. As described above, the user device may use a web browser to access the web resource identified in the web access mechanism.

Referring to FIGS. 1B, 2, 3C and 3D, in some implementations, the search results 220 include an advertisement 371. The advertisement icon 371 is indicative of an advertisement from an advertiser. An advertiser may generally refer to any party that advertises on search results 220 displayed on a user screen 201 (e.g., a display or touchscreen) generated by a search system 300, either to advertise its own goods and services or the goods and services of a related party. An advertiser can advertise, for example, a business, products, services, media content, or any other suitable item of commerce referenced in an application 204. The search results 220 displayed on a user screen 201 provide advertisers with a medium to advertise websites or other services. Typically, an advertiser can register one or more keywords and an advertisement with a company that provides the service of the search and/or provides the search result page, such that when a search system 300 user 10 includes the one or more keywords in a search query 212, the search system 300 may also include the advertisements 371 corresponding to the one or more keywords in the search results 220. The search system 300 can sell the keywords according to different advertising schemes, including cost per number of impressions (e.g., number of views), cost per click-through, and cost per action. According to the cost per number of views model, the advertiser agrees to pay a specified amount each time the advertisement is displayed a specified number of times on a result page in response to a relevant search query 212. According to the cost per click-through model, the advertiser agrees to a pay a specified amount each time a user 10 clicks on the advertisement 271 displayed in response to a relevant search query 212. According to the cost per action model, the advertiser agrees to pay a specified amount each time a user 10 performs a specific action in response to the advertisement 271 being displayed. For example, the advertiser can agree to pay the specified amount when a user 10 clicks on a hyperlink in the advertisement 271 and makes a purchase from the website associated with the advertisement 271.

In some implementations, an advertisement system 360 generates one or more advertisements 371 for the user 10. The advertisement system 360 transmits (e.g., serves) the generated advertisement 371 to the computing device 200 of the user 10. The computing device 200 of the user 10 may display on the display 201 of the user computing device 200 the advertisement 371 along with the search results 220. The advertisement 371 may include information indicating that the advertisement 371 is a sponsored result. For example, the advertisement 371 may include text indicating that the sponsored application is a "Sponsored Result" an "Advertisement" or an "AD."

The advertisement system 360 includes an advertisement data store 362 that the advertisement system 360 may use to generate advertisements 371. The advertisement data store 362 includes data associated with a plurality of different advertisements 371. The data associated with an advertisement 371 may be referred to as an "an advertisement record" (e.g., advertisement record 370 of FIG. 3C). The advertisement data store 362 may include a plurality of advertisement records 370 that each include data for a different advertisement 371. The advertisement records 370 may be generated by advertisers (using advertiser devices 368), by advertisement agencies, or by providers of any of the search and advertisement generation functionalities described above (i.e., by providers of one or more of the search system 300 and the advertisement system 360). An advertisement 371 may include an application advertisement or an entity (e.g., business) advertisement.

An advertisement record 370 may include a variety of different types of data related to an advertisement 371. An advertisement record 370 may include data that identifies the advertisement record 370. For example, the advertisement record 370 may include an advertisement name and/or advertisement identifier (i.e., an "advertisement ID") 372 that identifies the advertisement record 370 among the different advertisement records 370 in the advertisement data store 362.

An advertisement record 370 may also include a sponsored application name and/or sponsored application ID that identifies a sponsored application and/or a business associated with the advertisement record 370. A sponsored application 204 may be an application 204 for which an advertiser has paid to have the application 204 displayed to a user 10. For example, an advertiser may pay for a sponsored application 204 to be advertised along with search results generated by the search system 300. The advertisement record 370 includes advertisement content 376 used to generate an advertisement 371 for the sponsored application 204 of the advertisement record 372. For example, advertisement content may include text, images (e.g., icons), animations, and videos associated with the sponsored application 204. The advertisement 371 (e.g., text and images) for a sponsored application 204 may be displayed along with the list of applications 204 included in the search results 220 on a user's computing device 200.

The advertisement record 370 may also include advertisement parameters 378. Advertisement parameters 378 may define budget parameters 392 associated with advertising the sponsored application 204. Advertisement parameters 378 may also define timing parameters 394 associated with advertising the sponsored application 204, such as start and stop dates for advertising the sponsored application 204 and/or time(s) of day during which the sponsored application 204 is to be advertised. Additionally, advertisement parameters 378 may specify user parameters associated with advertising the sponsored application 204, such as, e.g., one or more search query languages for which the sponsored application 204 is to be advertised and/or the number of times a particular advertisement is to be displayed to each user 10. Other parameters are possible as well.

Advertisement parameters 378 may also include a variety of different types of targeting parameters 380. A targeting parameter 380 may refer to a condition that should be satisfied before the advertisement system 360 generates an advertisement 371. The advertisement system 360 may use targeting parameters 380 in an advertisement record 370 to determine whether to generate an advertisement 371 for the sponsored application 204 of the advertisement record 370. For example, the advertisement system 360 may generate an advertisement 371 for the sponsored application 204 listed in an advertisement record 370 when one or more targeting parameters 380 of the advertisement record 370 are satisfied. Example types of targeting parameters 380 may include, but are not limited to, keyword targeting parameters 382 and platform targeting parameters 384.

Additional advertisement (e.g., target) parameters 378 may include, e.g., time-slotting, day-parting, category, geographical, contextual, demographic, behavioral, platform, device, and partner parameters. In other words, in some examples, the advertisement system 360 may generate an advertisement 371 for a sponsored application 204 in one or more of the following instances: 1) during one or more designated time slots; 2) on one or more given days or during one or more specified portions thereof; 3) for one or more particular categories of applications 204 included in the search results 220; 4) for users 10 located in one or more geographic locations or regions; 5) based on context (e.g., for one or more states of the user's computing device 200, the search system 300, and/or the advertisement system 360); 6) for one or more specified user types or groups; 7) when one or more user behaviors are detected (e.g., when the user 10 interacts with the user's computing device 200 in a particular manner); 8) for one or more platform (e.g., operating system) and device types associated with the user's computing device 200 or the applications 204 included in the search results 220; or 9) when one or more specified partner computing systems are used (e.g., when the user's computing device 200 communicates with the search system 300 and/or the advertisement system 360 via a designated partner computing system).

An advertisement record 370 may include a targeting parameter function 381. A targeting parameter function 381 may define which of the targeting parameters 380 of the advertisement record 370 should be satisfied in order to generate an advertisement 371. In some examples, the targeting parameter function 381 includes a single targeting parameter 380. In these examples, the advertisement system 360 may generate an advertisement 371 for a sponsored application 204 based on satisfaction of a single targeting parameter 380, such as a similarity targeting parameter 381 or a keyword targeting parameter 384. In other examples, the targeting parameter function 381 includes multiple different targeting parameters 380. In these examples, the advertisement system 360 may generate an advertisement 371 for a sponsored application 204 based on satisfaction of multiple targeting parameters 380, such as one or more similarity targeting parameters 381, one or more keyword targeting parameters 382, and a platform targeting parameter 384. In scenarios where a targeting parameter function 381 includes multiple targeting parameters 380, the targeting parameter function 381 may include a Boolean function that includes the multiple targeting parameters 380.

Figure 4A:
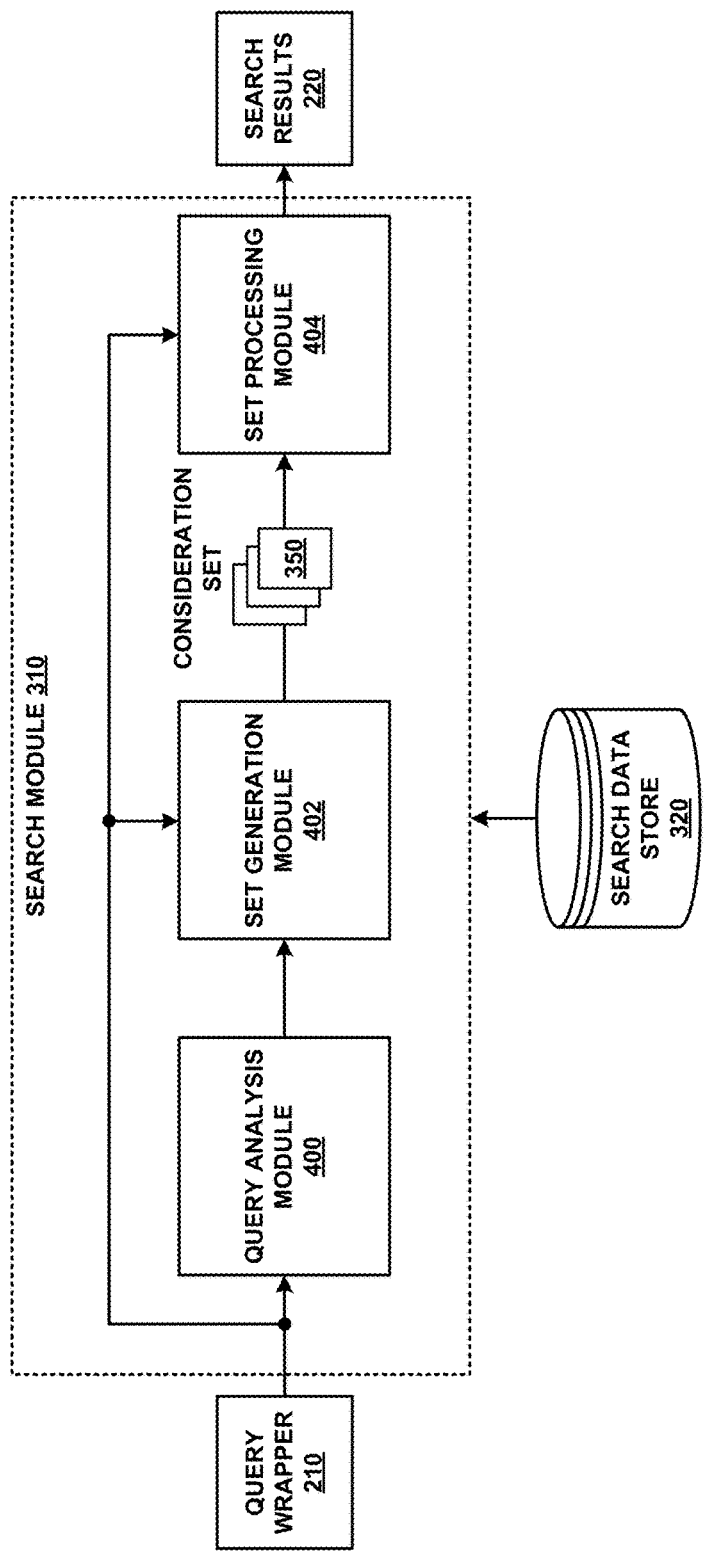
FIG. 4A is a schematic view of an example search module receiving and processing a query wrapper and outputting search results.

FIG. 4A shows an example search module 310 that includes a query analysis module 400, a consideration set generation module 402 (hereinafter "set generation module 402"), and a consideration set processing module 404 (hereinafter "set processing module 404"). The query analysis module 400 receives the query wrapper 210 and analyzes the received search query 212. The query analysis module 400 may perform various analysis operations on the received search query 212, which may include, but are not limited to, tokenization of the search query 212, filtering of the search query 212, stemming, synonymization, and stop word removal. In some implementations, the query analysis module 400 detects a query-specified location included in the search query 212.

The set generation module 402 identifies a plurality of function records 330 based on the received search query 212. In some examples, the set generation module 402 identifies the function records 330 based on matches between terms of the search query 212 and terms in the function records 330. For example, the set generation module 402 may identify the function records 330 based on matches between tokens generated by the query analysis module 400 and words included in the function records 330, such as words included in the function IDs 332 and/or the application state information 334.

The consideration set 350 of function records 330 may refer to the function records 330 that are to be scored by the set processing module 404. The set generation module 402 may determine the geo-location of the user device 200 based on data included in the query wrapper 210. In additional examples, if the query analysis module 400 detects a query-specified location, the set generation module 402 uses the query-specified location as the search location. In some examples, the set generation module 402 uses the geo-location of the user device 200 as the search location (e.g., to filter function records 330 based on location).

The set processing module 404 may score the function records 330 in the consideration set 350 in order to generate a set of search results 220. The scores 226 associated with the function records 330 may be referred to as "result scores." The set processing module 404 may determine a result score 226 for each of the function records 330 in the consideration set 350. The result scores 226 associated with a function record 330 may indicate the relative rank of the function record 330 (e.g., by the access mechanisms 202) among other function records 330. For example, a larger result score 226 may indicate that a function record 330 is more relevant to the received search query 212.

The set processing module 404 selects application access mechanisms 202 from the selected function records 330 (e.g., the highest scoring function records). The set processing module 404 transmits the selected application access mechanisms 202 to the user device 200 that generated the search query 212. The set processing module 404 may also transmit the result scores 226 associated with the selected application access mechanisms 202. For example, an application access mechanism 202 may be associated with the result score 226 of the function record 330 from which the application access mechanism 202 was selected.

The information conveyed by the search results 220 may depend on how the result scores 226 are calculated by the set processing module 404. For example, the result scores 226 may indicate the relevance of an application function or application state to the search query 212, the popularity of an application function or state, or other properties of the application function or state, depending on what parameters the set processing module 404 uses to score the function records 330.

The set processing module 404 may generate result scores 226 for function records 330 in a variety of different ways. In some implementations, the set processing module 404 generates a result score 226 for a function record 330 based on one or more scoring features. The scoring features may be associated with the function record 330 and/or the search query 212. A function record scoring feature (hereinafter "record scoring feature") may be based on any data associated with a function record 330. For example, record scoring features may be based on any data included in the application state information 334 of the function record 330. Example record scoring features may be based on metrics associated with a person, place, or thing described in the function record 330. Example metrics may include the popularity of a place described in the function record 330 and/or ratings (e.g., user ratings) of the place described in the function record 330. For example, if the function record 330 describes a song, a metric may be based on the popularity of the song described in the function record 330 and/or ratings (e.g., user ratings) of the song described in the function record 330. The record scoring features may also be based on measurements associated with the function record 330, such as how often the function record 330 is retrieved during a search and how often access mechanisms 202 of the function record 330 are selected by a user 10. Record scoring features may also be based on whether the function record 330 includes an application access mechanism 202 that leads to a default state or a deeper native application state.

A query scoring feature may include any data associated with the search query 212. For example, query scoring features may include, but are not limited to, a number of words in the search query 212, the popularity of the search query 212, and the expected frequency of the words in the search query 212. A record-query scoring feature may include any data generated based on data associated with both the function record 330 and the search query 212 that resulted in identification of the function record 330 by the set generation module 402. For example, record-query scoring features may include, but are not limited to, parameters that indicate how well the terms of the search query 212 match the terms of the application state information 334 of the identified function record 330. The set processing module 404 may generate a result score 226 for a function record 330 based on at least one of the record scoring features, the query scoring features, and the record-query scoring features.

The set processing module 404 may determine a result score 226 for a function record 330 based on one or more of the scoring features listed herein and/or additional scoring features not explicitly listed. In some examples, the set processing module 404 may include one or more machine learned models (e.g., a supervised learning model) configured to receive one or more scoring features. The one or more machine learned models may generate result scores 226 based on at least one of the record scoring features, the query scoring features, and the record-query scoring features. For example, the set processing module 404 may pair the search query 212 with each function record 330 and calculate a vector of features for each (query, record) pair. The vector of features may include one or more record scoring features, one or more query scoring features, and one or more record-query scoring features. The set processing module 404 may then input the vector of features into a machine-learned regression model to calculate a result score for the function record 330. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores 226 associated with the function records 330 (e.g., access mechanisms 202) may be used in a variety of different ways. The set processing module 404 and/or the user device 200 may rank the access mechanisms 202 based on the result scores 226 associated with the access mechanisms 202. In these examples, a larger result score may indicate that the access mechanism 202 (e.g., the function or application state) is more relevant to a user than an access mechanism 202 having a smaller result score. In examples where the user device 200 displays the search results 220 as a list, the user device 200 may display the links 230 for access mechanisms 202 having larger result scores 226 nearer to the top of the results list (e.g., near to the top of the screen). In these examples, the user device 200 may display the links 230 for access mechanisms 202 having lower result scores 226 farther down the list (e.g., off screen). In some examples, as illustrated in FIG. 2, the user device 200 groups together the links 230 associated with the same native application 204a.

Figure 4B:
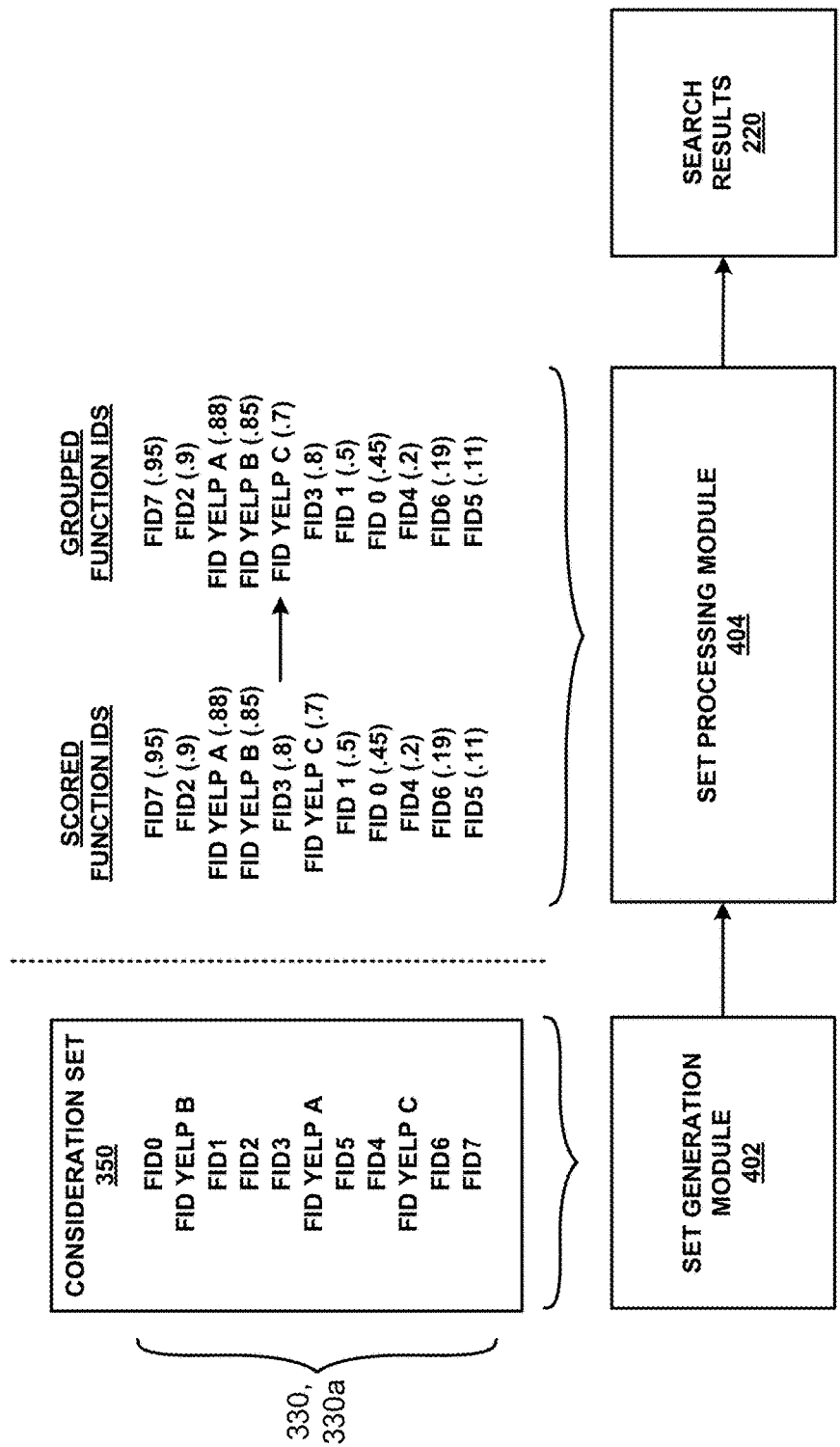
FIG. 4B is a schematic view of an example set generation module generating a consideration set and a set processing module scoring, filtering, and grouping function records of the consideration set.

Referring to FIG. 4B, in some implementations, the set processing module 404 filters the function records 330 based on one or more criteria. The criteria may be based on characteristics of the function records 330 and/or characteristics associated with the user 10. In the example shown, the set processing module 404 filters the function records 330 based on application ID 336. If the set generation module 402 generates a consideration set 350 of function records 330 (or function IDs 332 corresponding to function records 330, as shown) and the consideration set 350 includes a number of function records 330 associated with the same application 204, the set processing module 404 may filter the function records 330 (e.g., based on application ID 336) to reduce the consideration set 350. The set processing module 404 may restrict the number of function records 330 associated with any one application 204 to a maximum number of function records 330 for that application 204. For example, if the consideration set 350 includes five function records 330 for the YELP® native application 204a, but the set processing module 404 has a policy that limits the number of function records 330 for any given application 204 to three function records 330, the set processing module 404 can eliminate two of the five function records 330 from the consideration set 350 (or results 220). The set processing module 404 may eliminate function records 330 based on their result score 226 and/or some other metric, such as location, user preference, etc. The set processing module 404 may implement a policy of limiting function records 330 associated with one or more applications 204 to limit the result set 220 to a manageable number or a number practical for displaying on the user device 200.

In some implementations, the set processing module 404 groups the function records 330. The set processing module 404 may group by application ID 336, access mechanism 202, application state information 334, a result score 226, or some other attribute associated with the function record 330. By grouping the function records 330 by application ID 336, the search application 216 can display the search results 220 in an organized or ordered fashion. By grouping the function records 330 by result score 226, the search application 216 can display the search results 220 in an order based on relevancy to the search query 212. Moreover, the set processing module 404 may group function records 330 by multiple grouping attributes, for example, by result score 226 and application ID 336. Grouping by multiple attributes can result in groups and sub-groups. In the example shown, the consideration set 350 includes three function records 330 for the YELP® native application 204a (i.e., function records 330 have example function IDs 332 of Yelp A, Yelp B, and Yelp C). After scoring the consideration set 350, the set processing module 404 groups the function records 330 by result score 226 and application ID 336. The resulting consideration set 350 (or result set 220) includes a list of function records 330 (or function IDs 332 referencing the function records 330, as shown) with the three function records 330 for the YELP® native application 204a in consecutive order based on their corresponding result score 226. Other methods of grouping are possible as well.

Figure 4C:
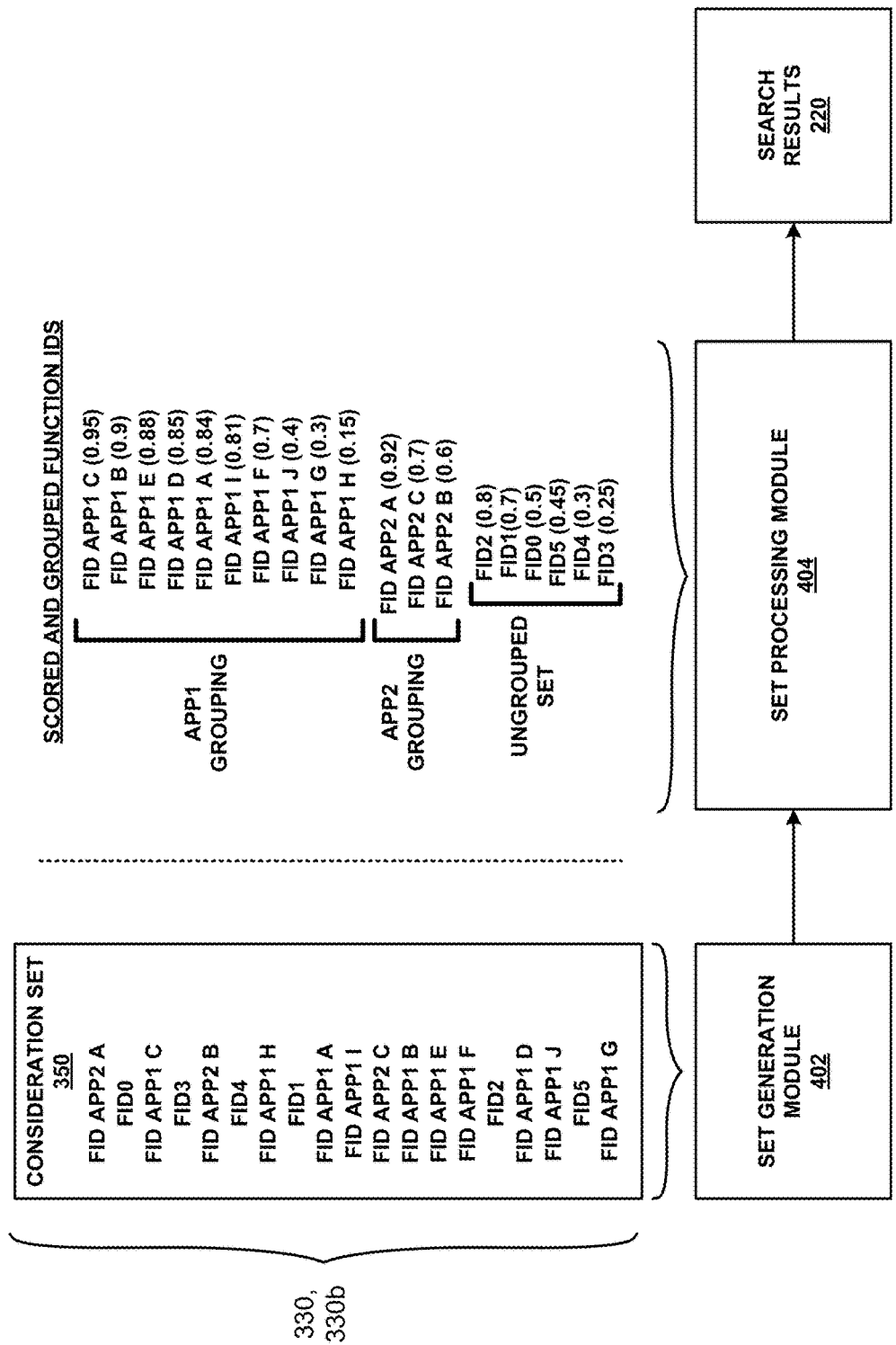
FIG. 4C is a schematic view of an example set generation module generating a consideration set and a set processing module scoring, filtering, and grouping function records of the consideration set.

Referring to FIG. 4C, in some implementations, the processing module 404 filters the function records 330 based on one or more criteria. The criteria may be based on characteristics of the function records 330 and/or characteristics associated with the user 10. In the example shown, the set processing module 404 filters the function records 330 based on the application ID 336. If the set generation module 402 generates a consideration set of function records 330 (or function IDs 332 corresponding to function records 330, as shown) and the consideration set 350 includes a number of function records 330 associated with the same application 204, the set processing module 404 may filter the function records 330 (e.g., based on the application ID 336) to reduce the consideration set 350. In some examples, the set processing module 404 restricts the number of function records 330 associated with any one application 204 to a maximum number of function records 330 for that application 204; however, in other examples, the set processing module 404 does not restrict the number of function records 330. For example, if the consideration set 350 includes ten function records 330 for YELP® native application 204a shown as APP 1 in FIG. 4C, the set processing module 404 may provide all the function records 330 of the consideration set 330 (or result set 220).

In some implementations, the set processing module 404 groups the function records 330 by the application ID 336, access mechanism 202, application state information 334, result score 226, or some other attribute associated with the function records 330, allowing the search application 216 to display the search results 220 in an organized and orderly fashion. Also, by grouping the function records 330 by the result score 226, the search application 216 can display the search results 220 in an order based on the relevancy of the search query 212. Moreover, the set processing module 404 may group function records 330 by multiple grouping attributes resulting in groups and sub-groups, for example, by result score 226 and application ID 336. In the example shown in FIG. 4C, the consideration set 350 includes ten function records 350 for APP 1 e.g., YELP® native application 204a (i.e., function records 330 have example function IDs 332 of APP 1A, APP 1B, APP 1C, APP 1D, APP 1E, APP 1F, APP 1G, APP 1H, APP 1I, and APP 1J). The consideration set 330 also includes three function records 350 for APP 2 (i.e., function records 330 have example function IDs 332 of APP 2A, APP 2B, and APP 2C). After the set processing module 404 scores the consideration set 350, the set processing module 404 groups the function records 330 by result score 226 and application ID 226. The resulting consideration set 350 (or result set 220) includes a list of function records 330 (or function IDs 332 referencing the function records 330, as shown) with all ten function records 330 for APP 1 e.g., YELP® native application 204*a* in consecutive order based on their corresponding result score 226. In some examples, a function record 330 is not available for an application 204, therefore, the consideration set 330 includes the application 204 without any function records 330 associated with the application 204, as shown in the ungrouped set. Other methods of grouping are possible as well.

Figure 4D:
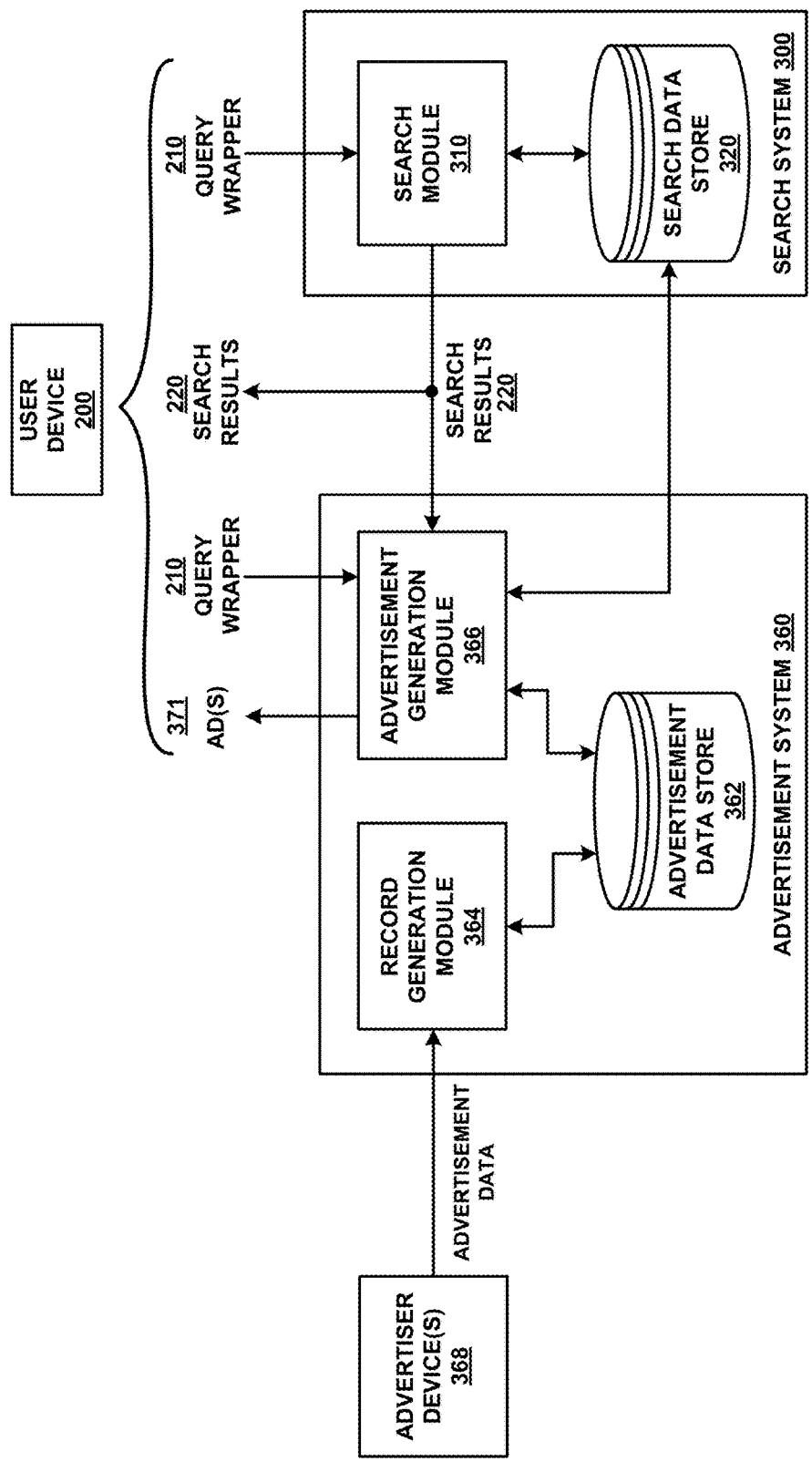
FIG. 4D is a schematic view of an example advertisement module.

Referring to FIG. 4D, in some implementations, an example advertisement system 360 includes an advertisement data store 362, a record generation module 364, and advertisement generation module 366. The advertisement system 360 generates one or more advertisements 371 for a user 10. The advertisement system 360 receives advertisement data from an advertiser device(s) 368 and the record generation module 364. The record generation module 364 generates an advertisement record 370 and stores the advertisement record 370 in the advertisement data store 362. The advertisement data store 362 includes data associated with the plurality of different advertisements 371, i.e., advertisement records 370. The advertisement record 370 may include a variety of different types of data related to an advertisement 371. An advertisement record 370 may include data that identifies the advertisement record 370 (see FIGS. 3C and 3D).

The advertisement system 360 includes an advertisement generation module 366 in communication with the user device 200 and the search system 300. The advertisement generation module 366 receives search results from the search system 300 (e.g., search module 310), the query wrapper 210 from the user device 200, and based on the received search results 220 and the query wrapper 210, the advertisement generation module 366 determines the advertisements 371 to send to the user device 200. The advertisement generation module 366 identifies one or more advertisement records 370 based on the received search results 220 and the received query wrapper 210. In some examples, the advertisement generation module 366 identifies advertisement records 370 based on matches between terms of the search query 212 and terms in the advertisement records 370. For example, the advertisement generation module 366 may identify the advertisement records 370 based on matches between tokens generated by the query analysis module 400 and words included in the advertisement records 370, such as words included in the advertisement ID 372 and/or any other parameter associated with the advertisement record 370.

In some implementations, the advertisement generation module 366 may determine the geo-location of the user device 200 based on data included in the query wrapper 210. The advertisement generation module 366 may filter advertisements 371 associated with the geo-location of the user device 200, and send the selected advertisements 371 based on the geo-location of the user device 200.

The advertisement generation module 366 is in communication with the search data store 320. In some examples, the advertisement generation module 366 associates a different advertisement 371 with one or more search results 220 (e.g., access mechanism 202) displayed on the user display 201.

Figure 5A:
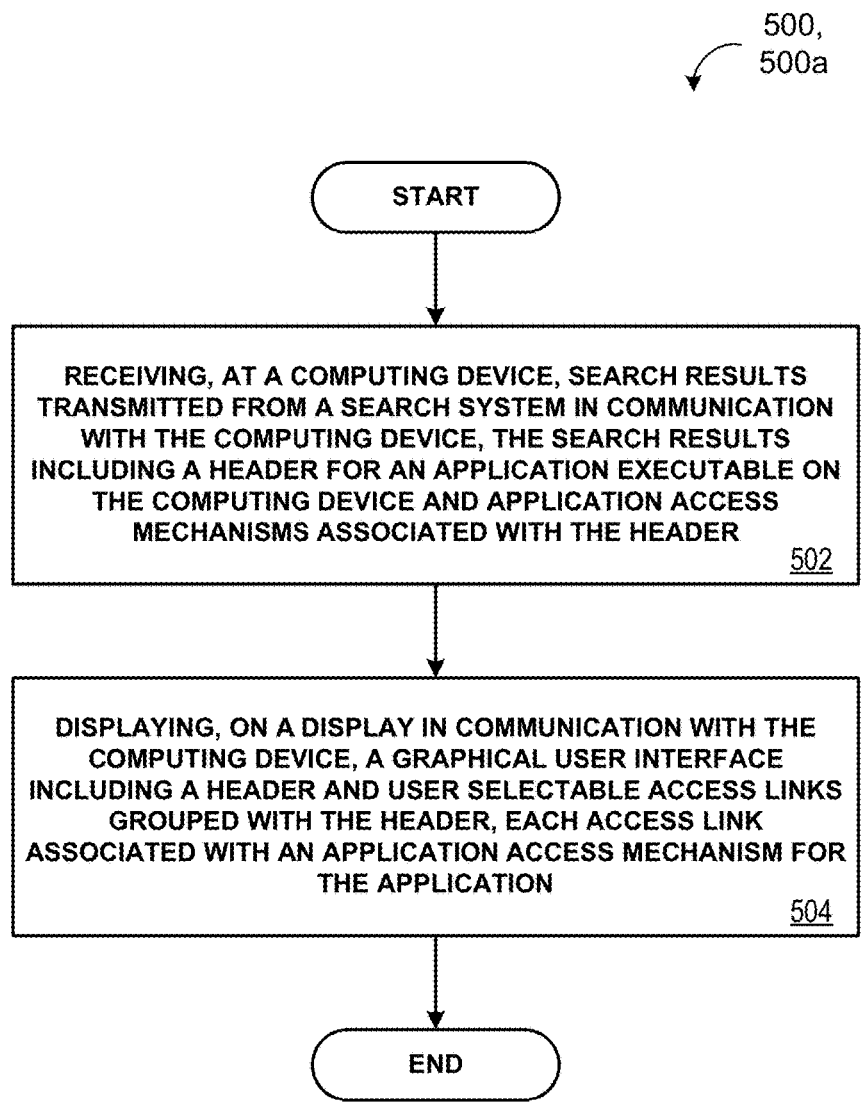
FIGS. 5A-5C is a schematic view of an example arrangement of operations for a method of performing a search on a user device.

FIG. 5A provides an example arrangement of operations for a method 500*a* of performing a search. At block 502, the method 500*a* includes receiving, at a computing device 910 (FIG. 9) of the user device 200, search results 220 transmitted from a search system 300 in communication with the computing device 200. The search results 220 include a header 242 for an application 204 executable on the computing device 910 and application access mechanisms 202 associated with the header 242. Each application access mechanism 202 has a reference to the application 204 and indicates one or more performable operations for the application 204. At block 504, the method 500 further includes displaying, on a display 201, 980 (FIG. 9) in communication with the computing device 910, a graphical user interface 240 including the header 242 and user selectable access links 230 grouped with the header 242. Each access link 230 is associated with an application access mechanism 202 for the application 204.

Figure 5B:
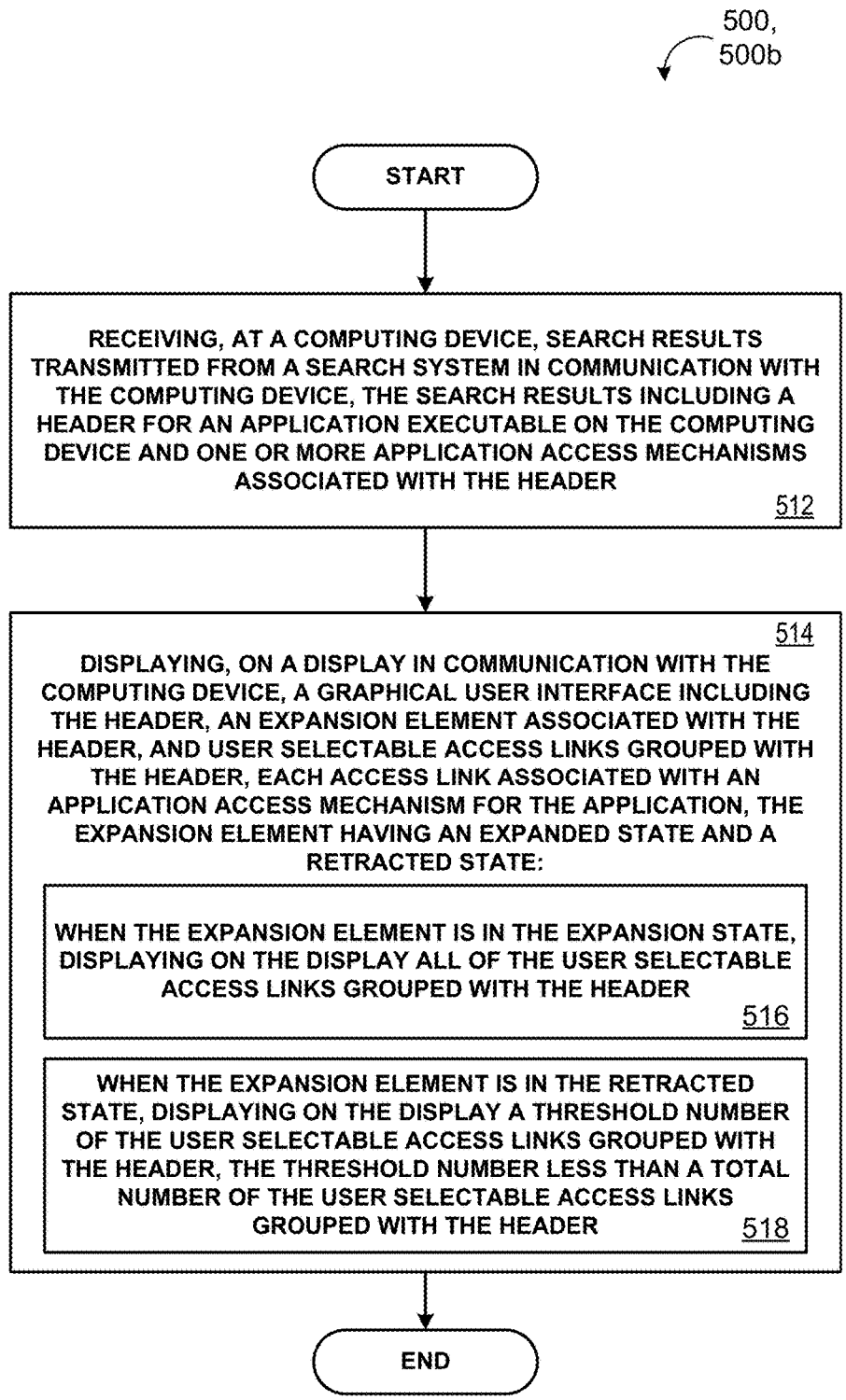

FIG. 5B provides an example arrangement of operations for a method 500*b* of performing a search. At block 512, the method 500 includes receiving, at a computing device 910 (FIG. 9) of the user device 200, search results 220 transmitted from a search system 300 in communication with the computing device 200. The search results 220 include a header 242 for an application 204 executable on the computing device 910 and application access mechanisms 202 associated with the header 242. Each application access mechanism 202 has a reference to the application 204 and indicates one or more performable operations for the application 204. At block 514, the method 500 further includes displaying, on a display 201, 980 (FIG. 9) in communication with the computing device 910, a graphical user interface 240 including the header 242, an expansion element 370 associated with the header 242, and user selectable access links 230 grouped with the header 242. Each access link 230 is associated with an application access mechanism 202 for the application 204. The expansion element 250 has a collapsed state 250*a* and an expanded state 250*b* (see FIG. 8F). At block 516, when the expansion element 250 is in the expanded state, the method 500*b* includes displaying on the display 201 all of the user selectable access links 230 grouped with the header 242. However, at block 518, when the expansion element 250 is in the expanded state 250*b*, the method 500*b* includes displaying on the display 201 a threshold number of the user selectable access links 230 grouped with the header 242, the threshold number being less than a total number of the user selectable access links 230 grouped with the header 242. The threshold number may be greater than zero.

In some implementations, the search results 220 include an advertisement 271 associated with a header 242. The GUI 240 displays the advertisement 271 in the header 242 or associated with a user selectable access link 230 grouped with the header 242. In other examples, the search results 230 include an advertisement record 370 including one or more of an advertisement name 372, an advertisement identification 372, a sponsored link name 374, a sponsored link identification 374, advertising content 376, or advertisement parameters 378. In some examples, the method 700B includes displaying in the GUI 240 the expansion element 250 in the header 242.

In other examples, the method 500*b* includes displaying in the GUI 240 the expansion element 250 among the user selectable access links 230 grouped with the header 242. In response to receiving a user selection of the expansion element indicating the expanded state, the method 500b may include displaying on the display 201 a list of all of the user selectable access links 230 grouped with the header 242 and displaying on the display 201 the expansion element 250 as a last element in the list 230. Additionally or alternatively, in response to receiving a user selection of the expansion element 250 indicating the collapsed state 250a, the method 500b may include displaying on the display 201 a list of all of the threshold number of the user selectable access links 230 grouped with the header 242 and displaying on the display 201 the expansion element as a last element in the list 230.

Referring to FIGS. 5A and 5B, in some implementations, the header 242 includes a name of the associated application 204. The method 500 may include displaying in the graphical user interface 240 a header link 244 in the header 242 indicating an installation state of the associated application 204 as being installed or uninstalled. Moreover, in response to receiving a user selection of the header link 244, when the installation state of the associated application 204 is installed, the method 500 may include executing the application 204 on the computing device 910; and when the installation state of the associated application 204 is uninstalled, the method 500 may include downloading the application 204 to non-transitory memory 920 (FIG. 9) in communication with the computing device 910 and executing the application 204 on the computing device 910. In some examples, the method 500 includes directing the user device 200 to a digital distribution platform 130b to download the application 204. Once in communication with the digital distribution platform 130b, the user 10 may choose to install the application 204 on the user device 200.

In some implementations, the method 500 includes displaying in the graphical user interface 240 (see FIG. 2) an ungrouped access link 230 having an associated application access mechanism 202 for an application 204 different from the application 204 associated with the header 242. The method 500 may include displaying in the graphical user interface 240 an indicator 244, 244a, 244b in the ungrouped access link 230 indicating an installation state of the associated application 204 as being installed or uninstalled. Moreover, in response to receiving a user selection of an ungrouped access link 230, when the installation state of the associated application 204 is installed, the method 500 may include executing the application 204 on the computing device 910; and when the installation state of the associated application 204 is uninstalled, the method 500 may include downloading the application 204 to non-transitory memory 920 in communication with the computing device 910 and executing the application 204 on the computing device 910. In some implementations, when the installation state of the associated application 204 is uninstalled, the method 500 includes directing the user device 200 to a digital distribution platform 130b, where the user 10 may choose to install the application 204 on the user device 200. In some examples, in response to receiving a user selection of an ungrouped access link 230, when the installation state of the associated application 204 is uninstalled, the method 500 includes executing a web browser on the computing device 910 and accessing functionality of the associated application 204 through the web browser.

The method 500 may include displaying the access links 230 in an order under the header 242 based on a score 226 associated with the application access mechanism 202 of each access link 230. In some examples, the method 500 includes receiving, at the computing device 910, search criteria (i.e., search query 212) through the graphical user interface 240, generating, at the computing device 910, a query wrapper 210 including the search criteria 212, and transmitting the query wrapper 210 from the computing device 910 to the search system 300.

Figure 5C:
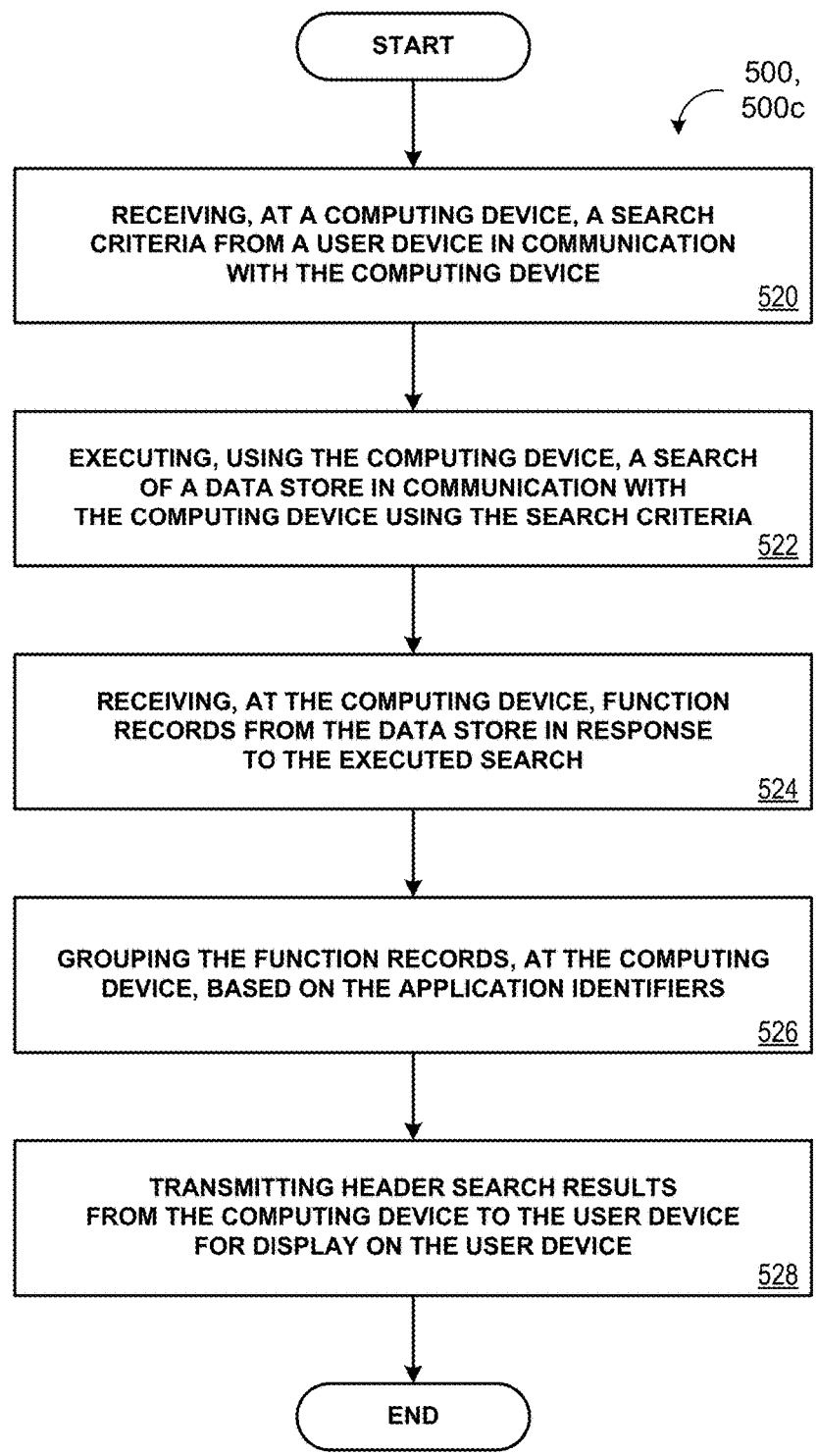

Referring to FIG. 5C provides an arrangement of operations for a method 500c of performing a search. A block 520, the method 500c includes receiving at a computing device 910, search criteria (i.e., search query 212) from a user device 200 in communication with the computing device 910. At block 522 the method includes executing, using the computing device 910, a search of a data store 320 in communication with the computing device 910 using the search criteria (i.e., search query 212). At block 524, the method 500c includes receiving, at the computing device 910, function records 330 from the data store 320 in response to the executed search. Each of the function records 330 includes an application identifier 336, an application access mechanism 202, 202a, 202b, 202, and application state information 334. The application access mechanism 202, 202a, 202b, 202 has a reference to a native application 204a and indicates one or more performable operations for the native application 204a. The application state information 334 describes a state of the native application 204a when the native application 204a performs the one or more operations indicated in the application access mechanism 202, 202a, 202b, 202. At block 526, the method 500c includes grouping the function records 330, at the computing device 910, based on the application identifiers 336. In addition, at block 528, the method includes transmitting header search results 244 from the computing device 910 to the user device 200 for display on the user device 200 (e.g., a display 201). The header search results 244 include a header 242 for each group of function records 330 and an expansion element 250 associated with each header 242.

In some implementations, the method 500c also includes receiving, at the computing device, an expansion command from the user device 200. The expansion command indicative of a user selection of an expansion element 250. The method 500c also includes transmitting access mechanism search results 202, 202a, 202b, 202 from the computing device to the user device 200. The access mechanism search results include the application access mechanisms 202, 202a, 202b, 202 of the group of function records 330 is associated with the header 242 of the selected expansion element 250. The access mechanism search results include link data 232 for each application access mechanism 202, 202a, 202b, 202. The link data 232 includes at least one of text or an image associated with the state of the application referenced by the corresponding application access mechanism 202, 202a, 202b, 202.

In some examples, the method 500c further includes filtering the function records 330, at the computing device, based on their application identifiers 336 by limiting a number of function records 330 per application identifier 336. Additionally, the method 500c includes scoring the function records 330 based on a relevancy of the function record 330 to the search criteria, and ordering the function records 330 based on their scores 226. The scoring is based on the application state information 334 of the function record 330. In some examples, executing the search includes identifying function records 330 of the data store 320 based on matches between terms of the search criteria and terms of the application state information 334 of the function records 330.

In some example, at least one of the application access mechanisms 202, 202a, 202b, 202 includes an application resource identifier referencing a native application 204a, wherein the application resource identifier is in an application-specific format specific for the referenced native application 204a and indicates one or more performable operations for the user device 200. The application resource identifier includes a domain name and a path to be used by the referenced native application 204a to retrieve and display information. The application access mechanism 202, 202a, 202b, 202 includes instructions for at least one of a search application, an operating system, or the referenced native application 204a when executed on user device 200. In some implementations, at least one of the application access mechanisms 202, 202a, 202b, 202 includes a web address that when executed by the user device 200 causes the user device 200 to execute a web browser and access a web version of the native application 204a referenced in the application access mechanism 202, 202a, 202b, 202.

Figure 6A:
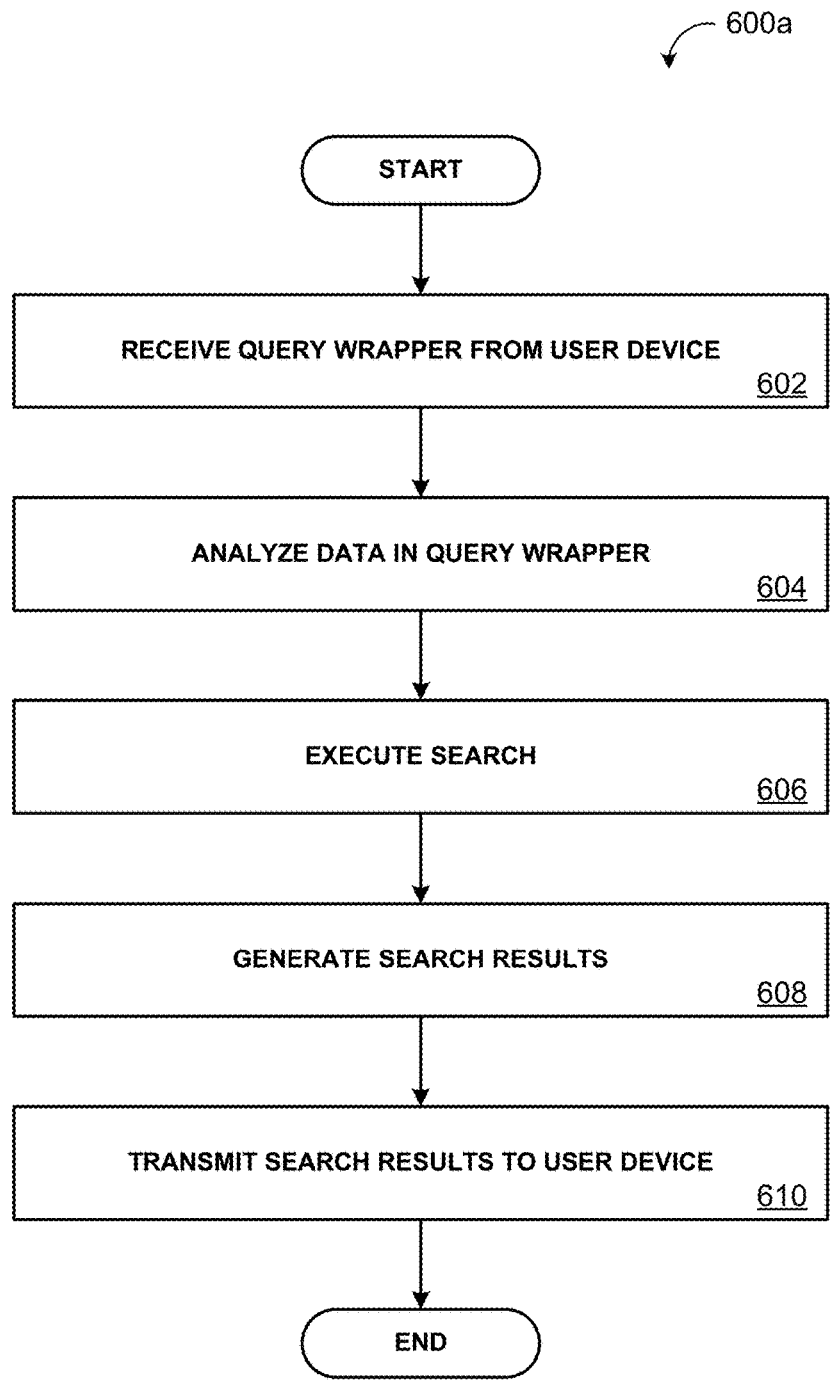
FIG. 6A is a schematic view of an example arrangement of operations for a method of performing a search on a search system.

FIG. 6A provides an example arrangement of operations for a method 600a of performing a search. The method 600a is described with respect to the user device 200, the search system 300, and the search module 310 as illustrated in FIG. 2. In block 602, the search module 310 receives the query wrapper 210. In block 604, the search module 310 analyzes data (e.g., the search query 212) included in the query wrapper 210. For example, the query analysis module 400 analyzes the search query 212 (and/or other data) of the query wrapper 210.

In some examples, the search module 310 may determine the geo-location of the user device 200 in terms of latitude and longitude values that indicate the latitude and longitude of the user device 200. Additionally, or alternatively, the search module 310 may determine the geo-location of the user device 200 in terms of an address, such as a postal address (e.g., a street address, zip code, and/or city name). The geo-location of the user device 200 determined by the search module 310 may be a point location (e.g., a latitude/longitude or a postal address). The user device 200 may generate geo-location data 218 (e.g., latitude and longitude) and the query wrapper 210 including the geo-location data 218. In some examples, the search module 310 determines the geo-location of the user device 200 based on data (e.g., an IP address 228) included in the query wrapper 210. For example, the search module 310 may look up the location of the user device 200 using the IP address 228. The search module 310 may communicate with a remote server 110 that can provide geo-location data for the user device 200 based on the IP address 228.

At block 606, the method 600a includes executing a search, for example, by identifying and selecting function records 330 based on the data of the query wrapper 210 (e.g., the search query 212). At block 608, the method 600a includes generating the search results 220. The search system 300 (e.g., in particular, the search module 310) may generate the search results 220 based on a scoring of considered function records 330. The set processing module 404 generates search results 226 including a list of the selected or all application access mechanisms 202 from selected function records 330 or all the function records 330.

Finally, at block 610, the method 600a includes transmitting the search results 220 to the user device 200. The search module 310 may deliver the search results 220, which can include access mechanisms 202, results scores 226, and/or link data 232. For example, the set processing module 404 transmits the search results 226 to the user device 200 that generated the search query 212.

Figure 6B:
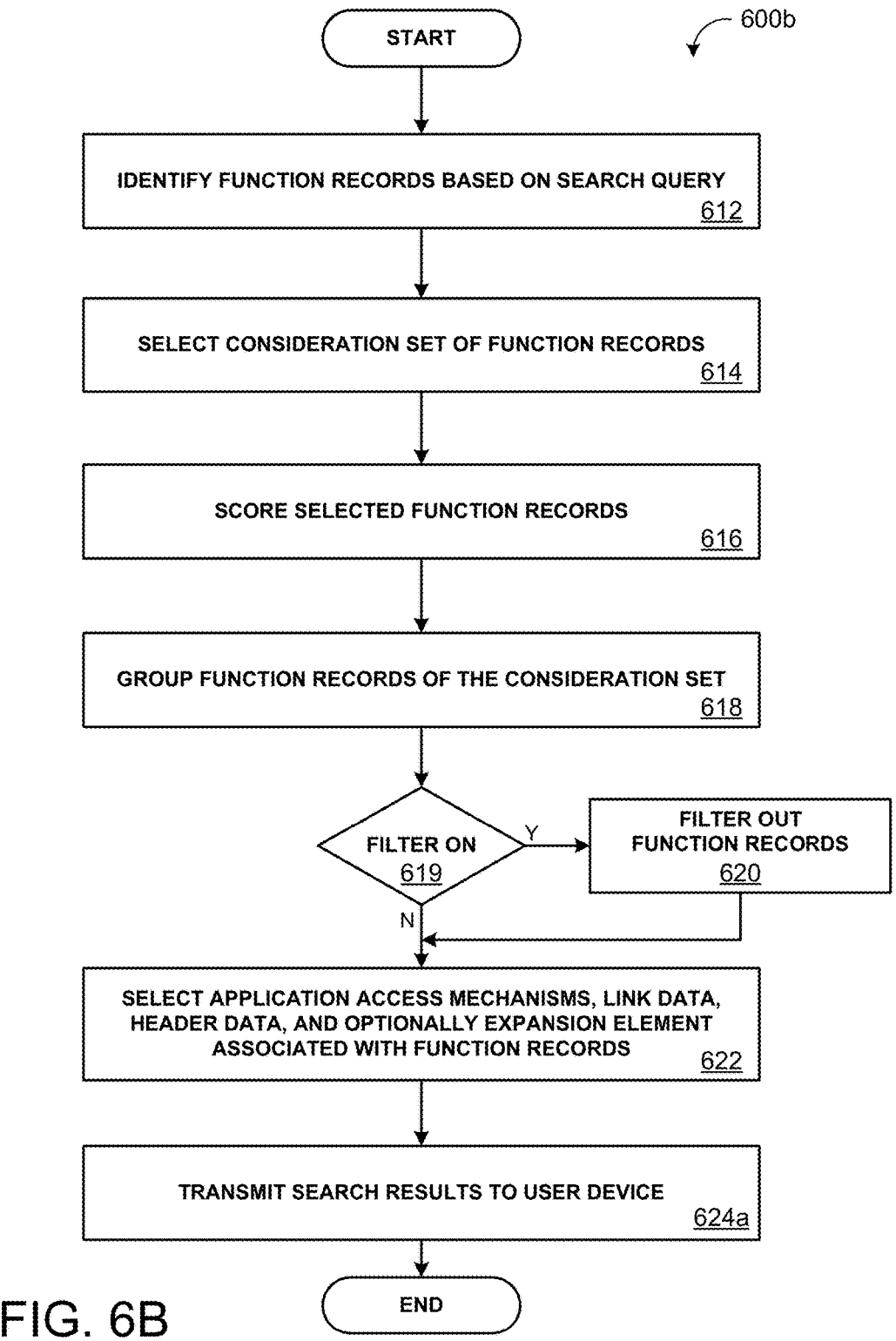
FIGS. 6B and 6C are schematic view of an example arrangement of operations for a method of generating search results.

FIG. 6B provides an example arrangement of operations for a method 600b of executing the search (e.g., at block 606). The method 600b is described with respect to the user device 200, the search module 310, and the data store 320 as illustrated in FIG. 2.

At block 612, the method 600b includes identifying function records 330 based on a search query 212. The search module 310 identifies function records 330 in the search data store 320 based on the search query 212 received in the query wrapper 210. For example, the search module 310 may identify function records 330 in the data store 320 by detecting search term matches between terms (e.g., words) of the search query 212 and terms included in the application state information 334 of the function records 330. In some examples, the set generation module 402 identifies a consideration set 350 of function records 330 based on the search query 212 (e.g., based on output from the query analysis module 400).

At block 614, the method 600b includes selecting a consideration set 350 of function records 330. The search module 310 selects a set 350 of function records 330 from those function records 330 identified at block 612. The selected set 350 of function records 330 may be referred to as a "consideration set" of function records 330 and/or function identifiers 332 of those function records 330. The search module 310 may score the consideration set 350 of function records 330 and include information from the consideration set 350 of function records 330 in the search results 220. The search module 310 may filter the consideration set 350 of function records 330 based on one or more criteria.

At block 616, the method 600b includes scoring the consideration set 350 of function records 330. For example, the search module 310 (e.g., the set processing module 404) may generate a score (e.g., a result score 226) for each of the function records 330 that indicates the relevance of the function record 330 to the search query 212. At block 618, the method 600b includes grouping function records 330 of the consideration set 350. For example, the set processing module 404 may group the function records 330 by application ID 336, access mechanism 202, application state information 334, result score 226, or some other attribute associated with the function record 330. By grouping the function records 330 by application ID 336, the search application 216 can display the search results 220 in an organized or ordered fashion.

At block 619, the method 600b determines if a function records filter is set, and if so, at block 620, the method 600b includes filtering function records 330 of the consideration set 350. In some implementations, the set processing module 404 filters the function records 330 based on one or more criteria. The criteria may be based on characteristics of the function records 330 and/or characteristics associated with the user 10. Moreover, the set processing module 404 may impose a policy that limits or reduces the number of function records 330 in the consideration set 350 and/or the result set 220. For example, the set processing module 404 may filter the function records 330 based on application ID 336 and impose a policy that limits or reduces the number of function records 330 to a maximum number of function records 330 per each application ID 332.

Referring back to block 619 if a function records filter is not set, or after filtering out function records at block 20, then at block 622a, the method 600b includes selecting one or more access mechanisms 202, link data 232, header data 242, and optionally an expansion element 250 associated with function records 330 in the consideration set 350 for transmission in the search results 220. In some examples, the header 242 is a name or nickname of an application 204 having a grouping of function records 330 in the search results 220. The search module 310 may select access mechanisms 202 from the function records 330 associated with the largest result scores 226 determined at block 616. In some implementations, the search module 310 determines which access mechanisms 202 are compatible with the user device 200 based on the platform data 222. In these implementations, the search module 310 may transmit a subset of the access mechanisms 202 from the selected function records 330 which are compatible with the user device 200 (e.g., based on OS version, web browser version, and/or device type). The set processing module 404 may select function records 330 from the consideration set 350 based on the result scores 226 associated with the function records 330 and select access mechanisms 202 from the selected function records 330. For example, the set processing module 404 may select function records 330 having the highest result scores 226 and then select access mechanisms 202 from those function records 330.

Finally, at block 624, the method 600b includes transmitting the search results 220 to the user device 200. The search module 310 may deliver the search results 220, which can include access mechanisms 202, results scores 226, and/or link data 232. For example, the set processing module 404 transmits the search results 226 to the user device 200 that generated the search query 212.

Figure 6C:
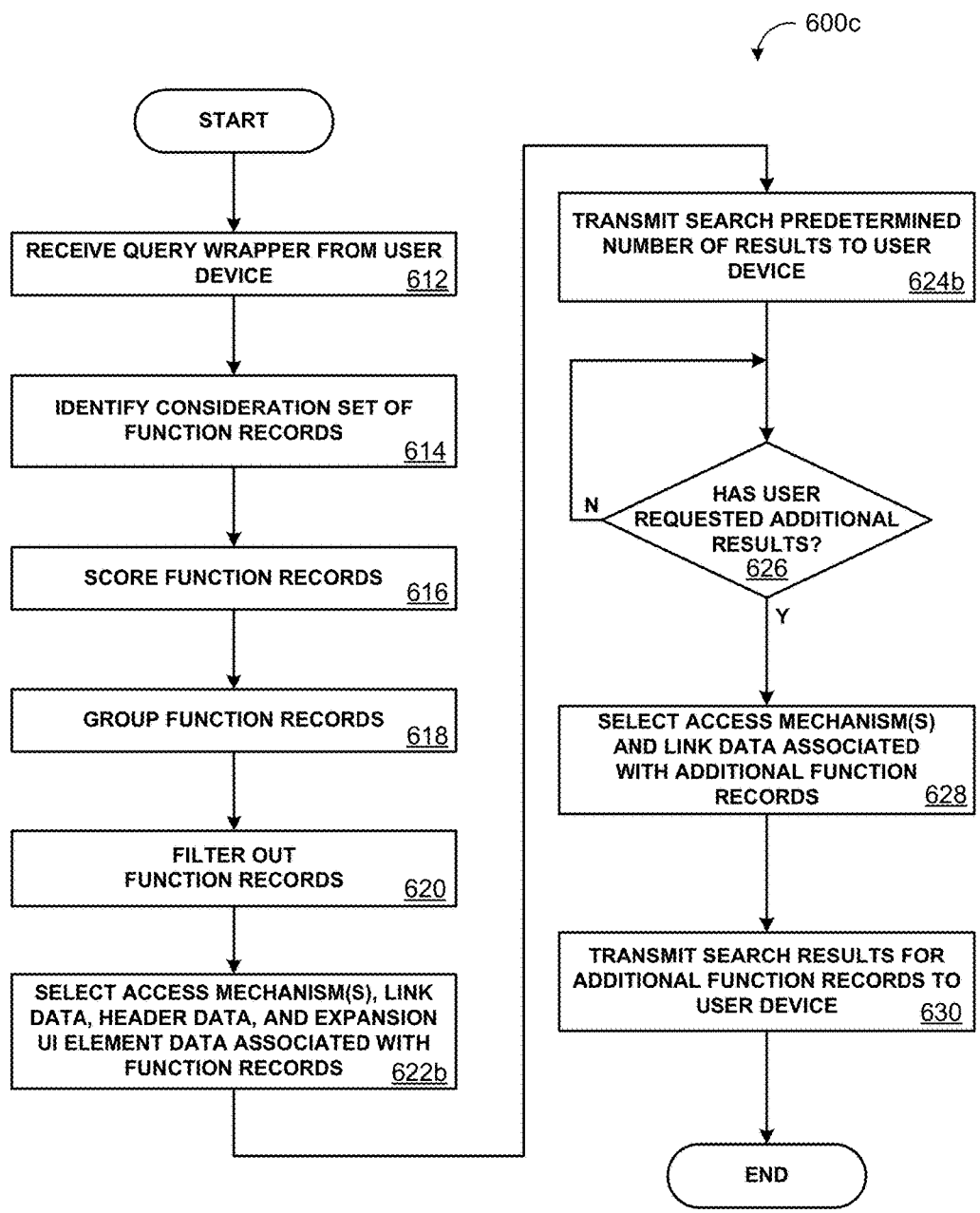

FIG. 6C provides an example arrangement of operations for a method 600c of executing the search (e.g., at block 606). The method 600c is described with respect to the user device 200, the search module 310, and the data store 320 as illustrated in FIG. 2. The method 600c includes the same elements 612-618 of the method 600b in FIG. 6B. However, in this example, at block 620, the method 600c includes filtering function records 330 of the consideration set 350, similar to block 620 in FIG. 6B. At block 622b, the method 600c includes selecting one or more access mechanisms 202, link data 232, header data 242, and an expansion element 250 associated with function records 330 in the consideration set 350 for transmission in the search results 220.

At block 624b, the method 600c includes transmitting to the user device 200, a predetermined number of search results 220. For example, the threshold number of search results may be any number greater or equal to zero. The user 10 may request additional search results 220 by selecting the expansion element 350 on the display 201 of the user device 200.

At bock 626, the method 600c includes waiting for receipt of an additional search result 220 request from the user device 200 by way of the user 10 selecting the expansion element 370 displayed on the display 201 in association with a header 242. For example, the search module 310 ways for receipt of the user additional requests from the user device 200.

At block 628, the method 600c includes selecting one or more access mechanisms 202 and link data 232, associated with function records 330 in the consideration set 350 for transmission in the search results 220 that were not previously transmitted at block 624. The search module 310 may select access mechanisms 202 from the function records 330 associated with the largest result scores 226 determined at block 616. In some implementations, the search module 310 determines which access mechanisms 202 are compatible with the user device 200 based on the platform data 222. In these implementations, the search module 310 may transmit a subset of the access mechanisms 202 from the selected function records 330 that are compatible with the user device 200 (e.g., based on OS version, web browser version, and/or device type). The set processing module 404 may select function records 330 from the consideration set 350 based on the result scores 226 associated with the function records 330 and select access mechanisms 202 from the selected function records 330. For example, the set processing module 404 may select function records 330 having the highest result scores 226 and then select access mechanisms 202 from those function records 330.

Finally, at block 630, the method 600c includes transmitting the search results 220 not previously transmitted at block 624 to the user device 200. The search module 310 may deliver the search results 220, which can include access mechanisms 202, results scores 226, and/or link data 232. For example, the set processing module 404 transmits the search results 226 to the user device 200 that generated the search query 212.

FIGS. 7A-7D provide example arrangements of operations for a method 700 of operating a user device 200. It may be assumed that the user device 200 described according to the method 700 includes a search application 216 (e.g., a native application 204a or web-browser application 204b) configured to communicate with the search system 300.

At block 702, the method 700 includes receiving a search query 212 from a user 10. In some implementations, the search application 216 executing on the user device 200 receives the search query 212 from of the user 10. At block 704, the method includes generating and transmitting query wrapper 210 to the search system 300. In some implementations, the user device 200 generates and transmits the query wrapper 210 to the search system 300. At block 706, the method 700 includes waiting for receipt of the search results 220. For example, the user device 200 waits for receipt of the search results 220 from the search system 300. The search results 220 may include a list of access mechanisms 202 and optionally result scores 226 associated with the access mechanisms 202. Additionally, the search results 220 may optionally include link data 232 (e.g., text and/or images) for the access mechanisms 202. The search application 216 may generate user selectable links 230 in the GUI 240 based on the received link data 232.

At block 708a, the method 700 includes generating user selectable links 230 and a header 242 (e.g., for a group of links 230) based on the search results 220. The search application 216 may generate the user selectable links 230 and the header 242 or receive them from the search module 310. In some implementations, the method 700 includes, at block 708b, generating one or more header links 244 associated with the header 242. The header links 244 may be indicators or icons that indicate an installation state of a corresponding native application 204a (FIG. 8D). For example, a first indicator 244a may indicate that the native application is installed and selecting the first indicator 244a may open the native application 204a. A second indicator 244b may indicate that the native application 204a is not currently installed. In some implementations, selecting the second indicator 244b causes installation of the native application 204a (e.g., via an application download mechanism 202c). In other implementations, selecting the second indicator 244b causes the user device 200 to be directed to the digital distribution platform 130b, where the user 10 may choose to install the application 204 on the user device 200. In yet another example, at block 708c, the method 700 includes generating expansion element 250 in addition to user selectable links 230 and a header 242, based on the search results 220.

Figure 7A:
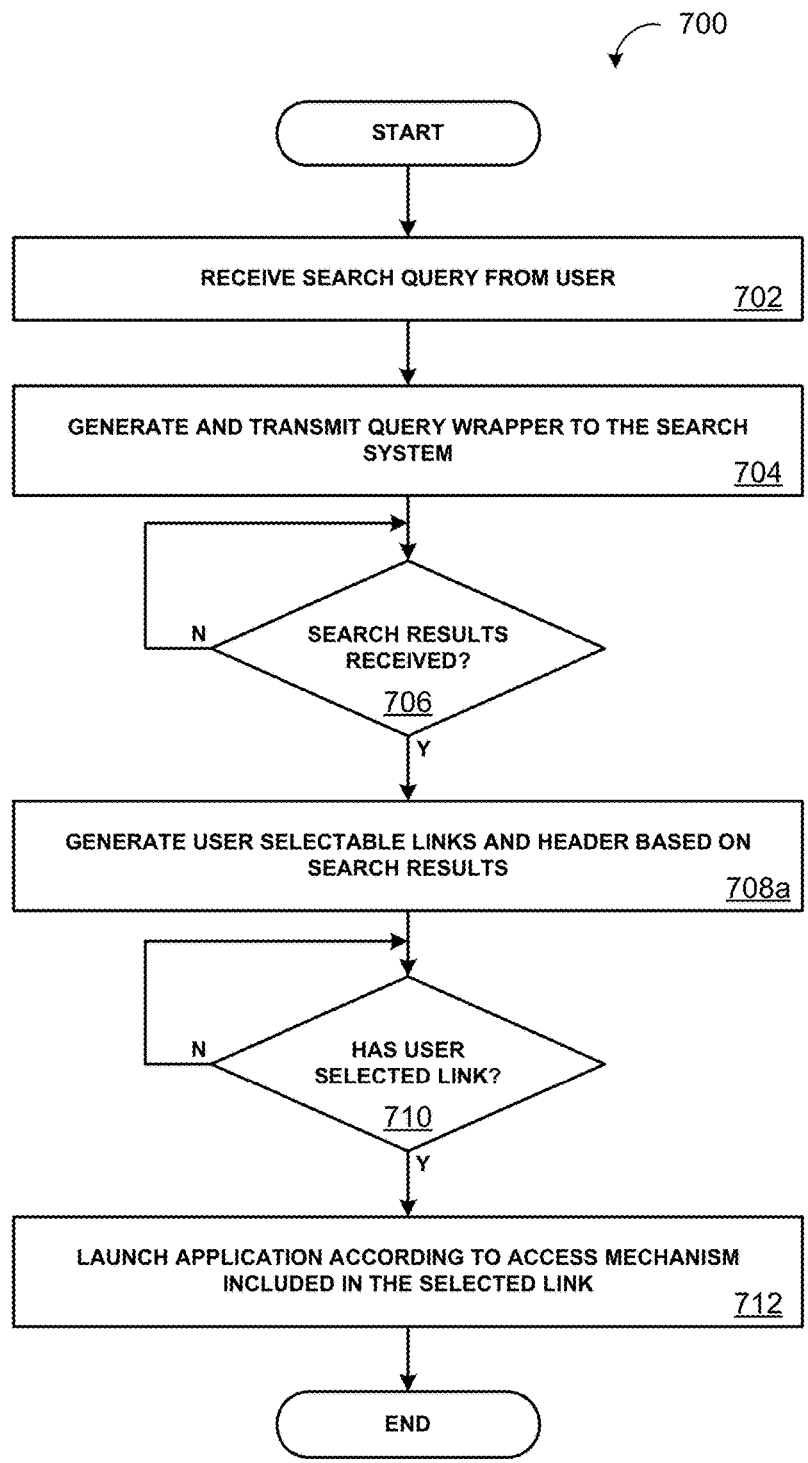
FIGS. 7A-7D are flow diagrams illustrating example methods of operating a user device.
Figure 7B:
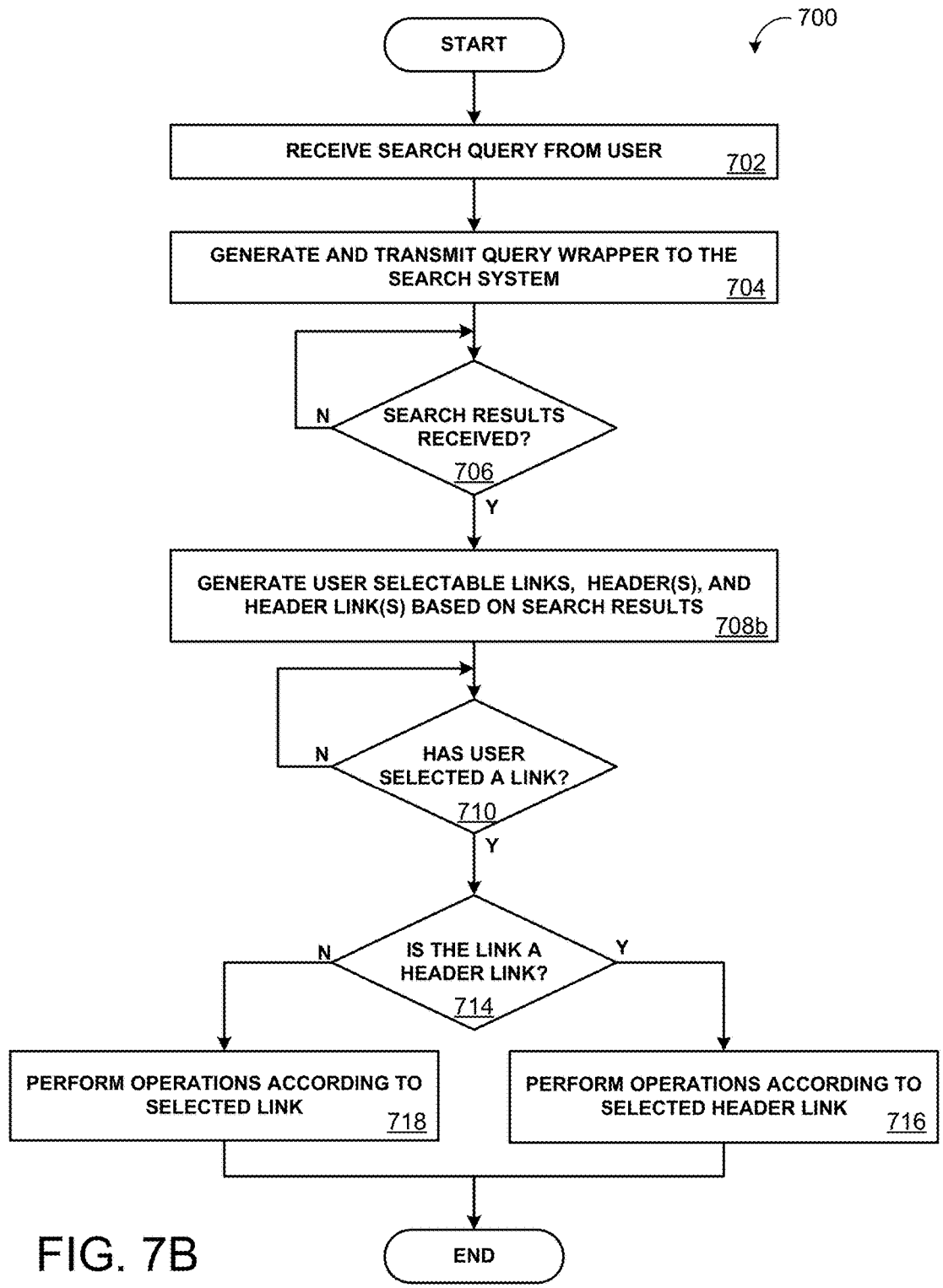

At block 710, the method 700 includes waiting for a user selection of a link 230, 244. For example, the search application 216 may wait for the user 10 to select one of the user selectable links 230 or the header links 244 before operation proceeds to a subsequent block 712, 714. In FIG. 7A, when the user 10 selects (e.g., touches) one of the user selectable links 230, the method 700 includes launching an application 204 associated with the link 230. For example, in response to selection of a link 230 including an access mechanism 202, the user device 200 launches the application 204 referenced in the access mechanism 202 and performs one or more operations indicated in the access mechanism 202 in block 712. In FIG. 7B, if the user 10 selects a link 230, 244, the method 700 includes, at block 712, determining if the selected link is a header link 244, and if so, at block 716, performing operations according the selected header link 244 (e.g., opening an application to a default or particular state, being directed to a digital distribution platform 130*b*, and/or installing a corresponding native application 204*a*). Otherwise, the method 700 includes, at block 718, performing operations according the selected link 230, which may include launching an application 204 associated with the link 230 using an access mechanism 202 of that link 230.

Figure 7C:
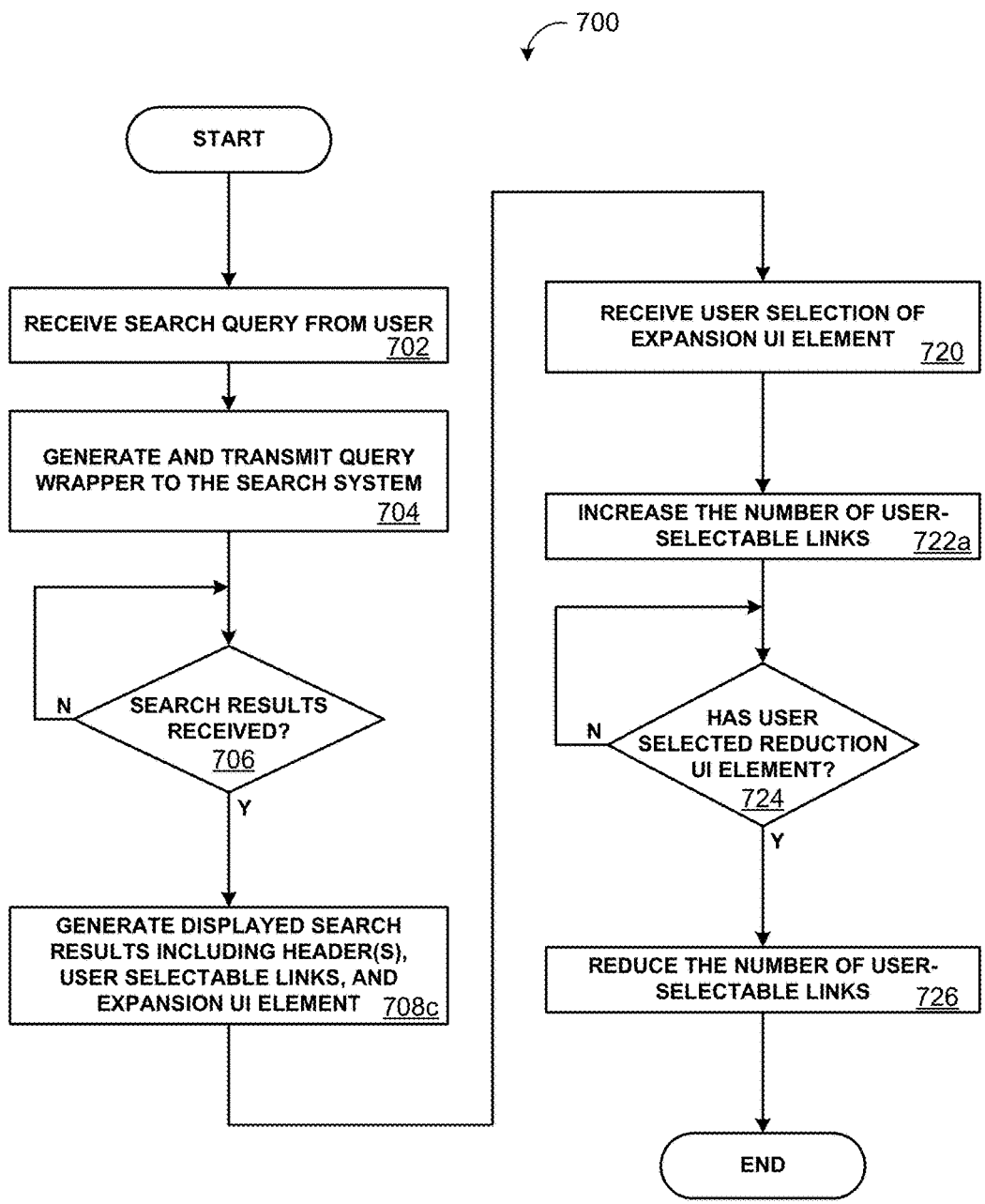
Figure 7D:
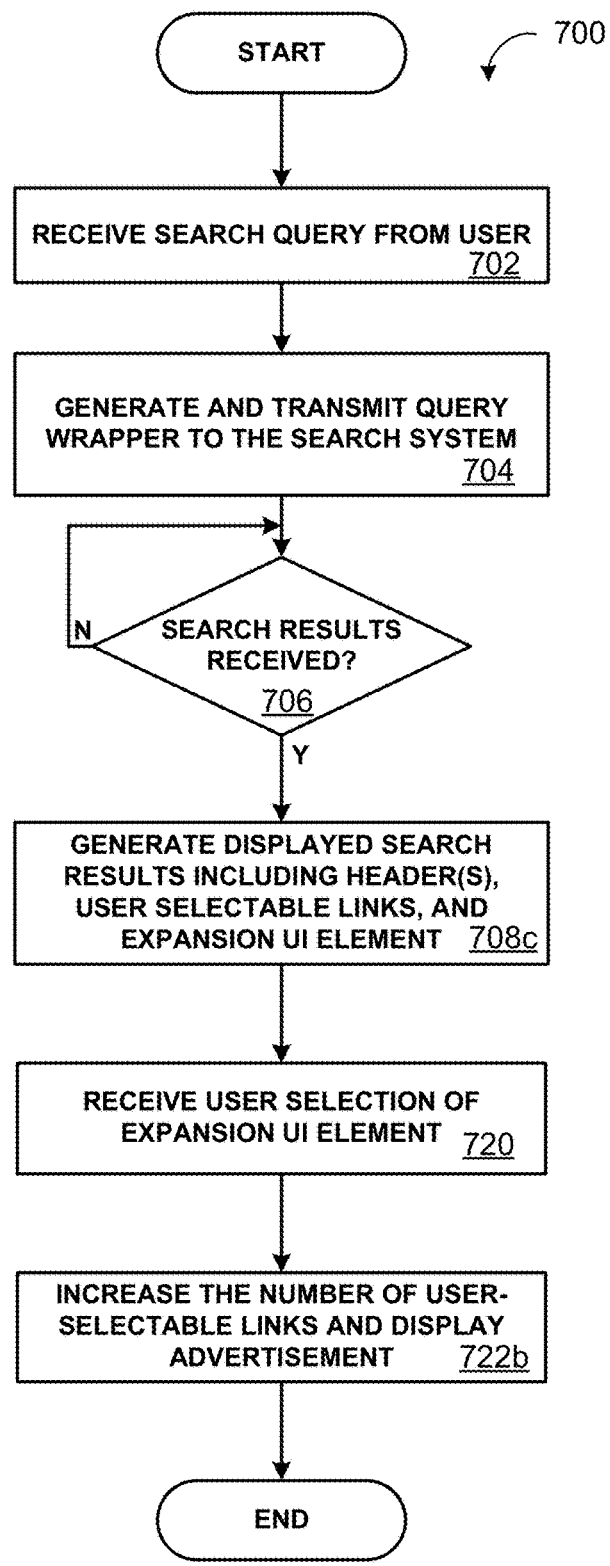

Referring to FIGS. 7C and 7D, at block 720, the method 700 includes receiving a user selection of the expansion element 250 by way of a user 10 selecting the expansion element 250 on the user display 201. In some examples, at block 722*a*, the method 700 includes increasing the number of user selectable links 230 displayed on the display 201 of the user device 200. In other examples, at block 722*b*, the method 700 includes increasing the number of user selectable links 230 and the number of displayed advertisement(s) 271 associated with each header 242.

At block 724, the method 700 includes waiting for a user selection of the expanded state 250*b* of the expansion element 250. For example, the search application 216 may wait for the user 10 to select the expanded state 250*b* of the expansion element 250, since the user 10 has previously selected the collapsed state 250*a* of the expansion element 250. At block 726, the method 700 includes reducing the number of user selectable links 230. For example, the search application 216 receives a user selection of the expanded state 250*b* and reduces the number of user selectable links 230 displayed in the search results 220. In some examples, when the search results 220 include advertisements 271, the method 700 may reduce the number of advertisements 271 when reducing the number of user selectable links 220. The method 700 may only display the advertisements 271 when the expansion element 250 is in an expanded state 250*a*.

Figures 8A, 8B:
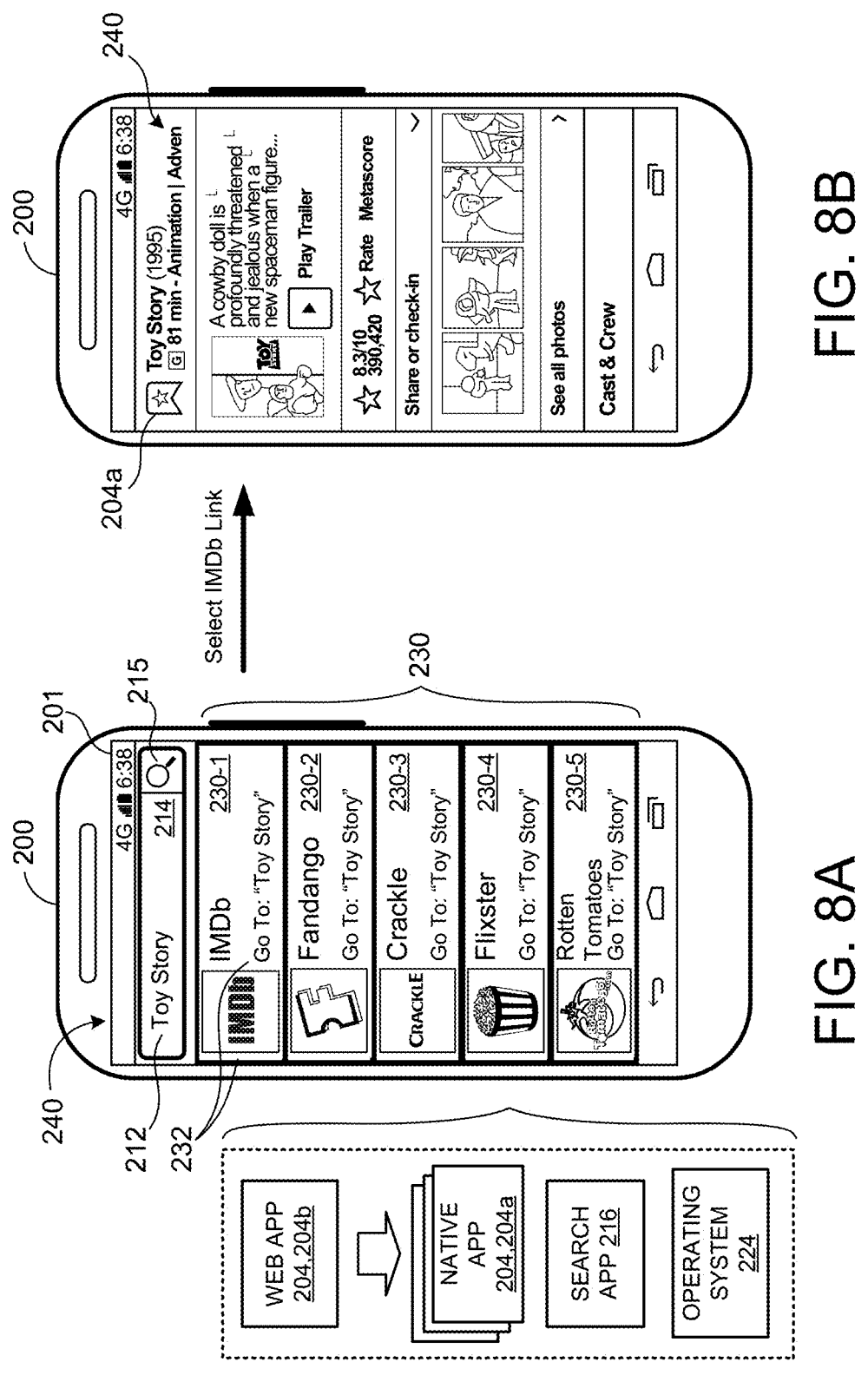
Figure 8C:
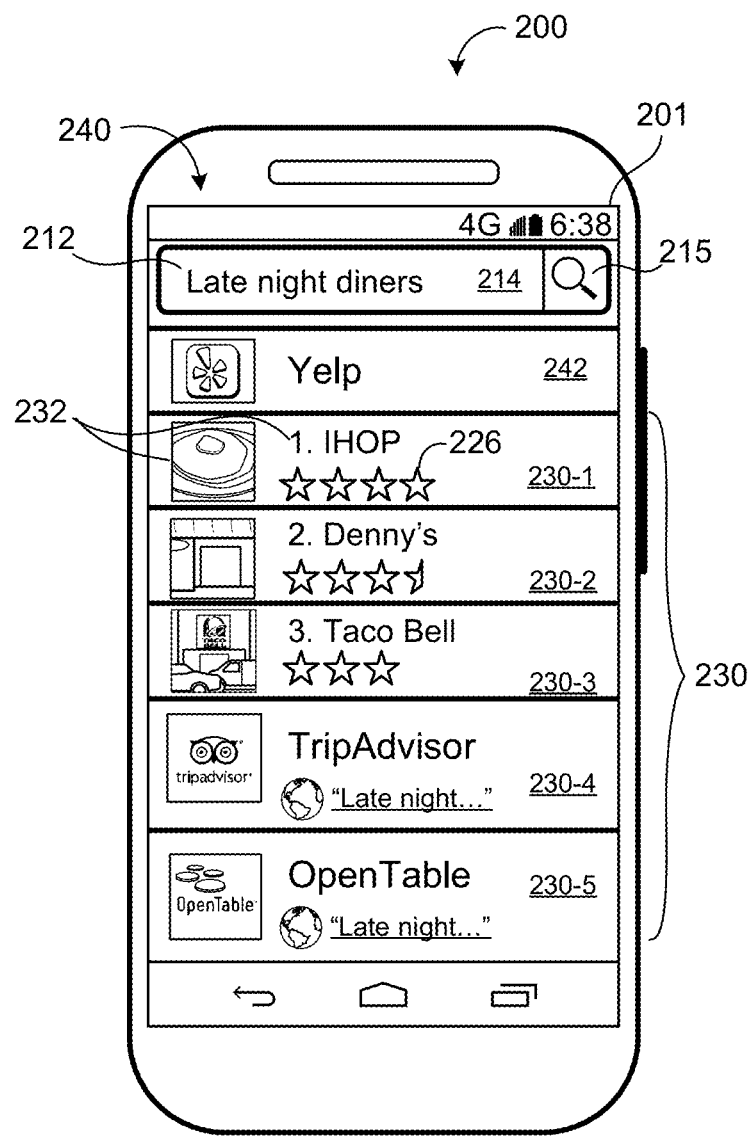
FIG. 8C is a schematic view of an example user device displaying a graphical user interface displaying search results grouped under a bare header (i.e., a header without links).
Figure 8D:
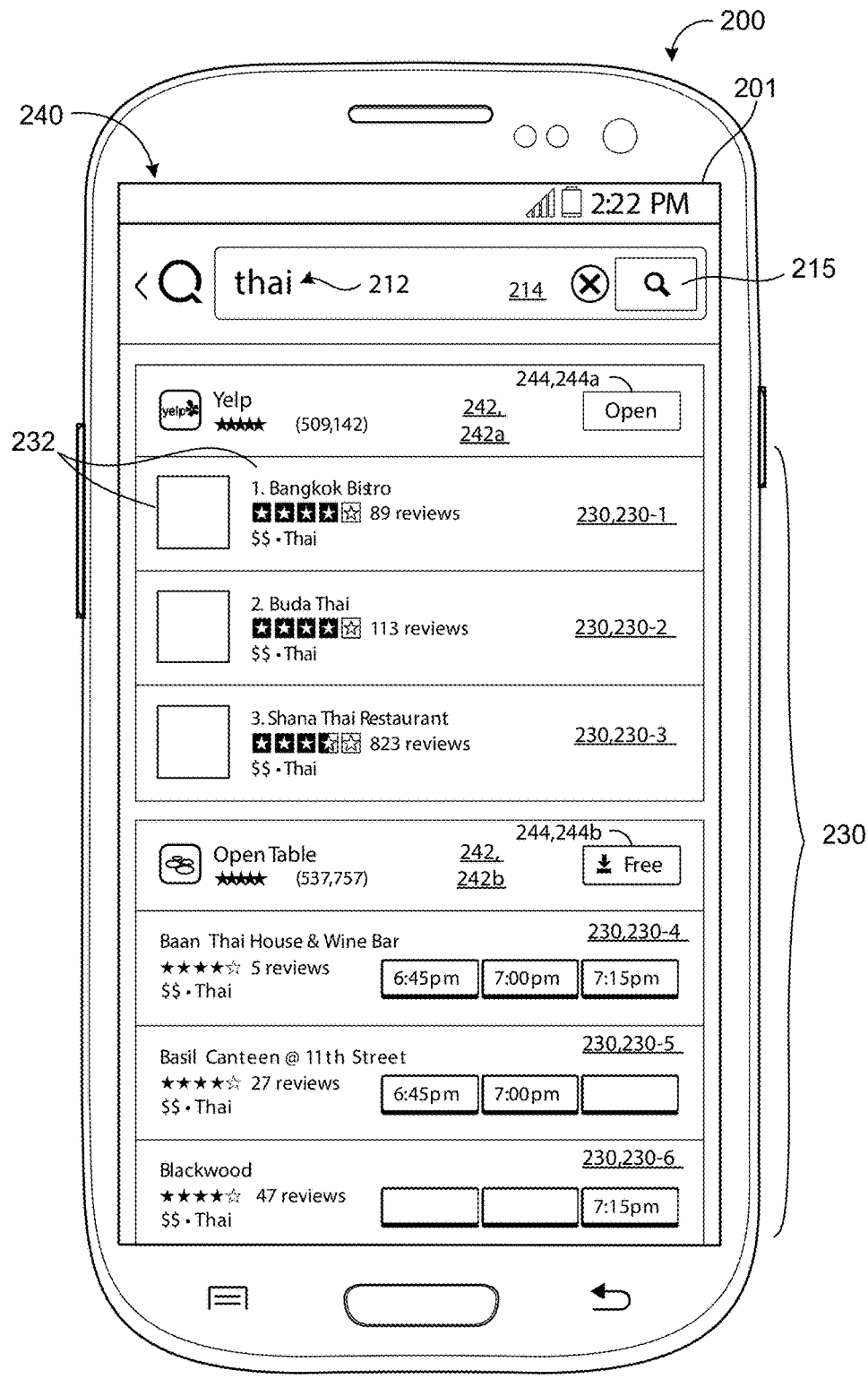
FIG. 8D is a schematic view of an example user device displaying a graphical user interface displaying search results grouped under a header having a header link.

FIGS. 8A-8L illustrate various examples of executing a search on a user device 200 using the search application 216 and displaying search results 220. Referring to FIGS. 2 and 8A, when the user 10 enters a search query 212 into the search field 214 (e.g., a search text box) of the GUI 240 of the search application 216 running on the user device 200 and executes the search, the search application 216 generates a query wrapper 210 that contains the search query 212 and any other relevant information (e.g., query parameters). The search application 216 transmits the query wrapper 210 to the search system 300 (e.g., to the search module 310), which responds with the search results 220. The search application 216 displays the search results 220 in the GUI 240. The search results 220 can indicate one or more links 230 to access resources that are relevant to the search. The links 230 can include application resource identifiers that can be used to launch a third party application 204 and access a specific state within the third party application 204.

FIGS. 2, 8A and 8B illustrate an example of executing a search on a user device 200 using the search application 216 executing on the user device 200. In FIG. 8A, the user 10 entered a search query 212 of "Toy Story" into the search field 214 (e.g., a search box) of the GUI 240 of the search application 216. In response to the search query 212, the search application 216 generates a query wrapper 210 including the search query 212 and transmits the query wrapper 210 to the search system 300, which returns search results 220 based on the search query 212.

The search module 310 transmits the search results 220 including a list of applications 204 and/or access mechanisms 202 to the user device 200. The list of applications 204 (e.g., native or web applications 204*a*, 204*b*) illustrated in FIG. 8A includes IMDb® (a trademark of IMDb.com, Inc.), FANDANGO® (a trademark of Fandango), CRACKLE®, (a trademark of Crackle, Inc.), FLIXSTER® (a trademark of Warner Bros. Entertainment Group), and ROTTEN TOMATOES® (a trademark of Warner Bros. Entertainment Group). The search application 216 displays links 230 to relevant states of the applications 204 indicated in the search results 220. The user 10 may select (e.g., touch or click) one of the links 230 to access the resource indicated in the link 230. For example, the user 10 may select the area of the GUI 240 including the "IMDb" icon to select a first link 230-1 to the "IMDb" application. In response to such a user selection, the user device 200 (e.g., search application 216, operating system 224, and/or the IMDb native application 204) can launch the selected application 204 and access the state of the application 204 indicated in the link 230. In the example of FIG. 7A, each link 230-1, 230-2, 230-3, 230-4, 230-5 may provide access to a "Toy Story" entry in the respective application 204.

In the example of FIG. 8A, the user selects the first link 230-1 for "IMDb." In the case of the IMDb native application, the various states of the native application may correspond to different entries in the IMDb databases. The illustrated first link 230-1 may indicate a state corresponding to an entry "Toy Story." Accordingly, selection of the first link 230-1 may cause the search application 216 to instruct the operating system 216 of the user device 200 to launch the IMDb native application and to access the "Toy Story" entry referenced in the first link 230-1. FIG. 8B illustrates a GUI 240 of the selected native application 204*a* that was launched in response to the selection of the first link 230-1, where the selected native application 204*a* displays an example entry for "Toy Story."

Referring to FIG. 8C, in some implementations, the user device 200 has one or more native applications 204*a* installed on the user device 200. In the example shown, the search application 216 indicates on the GUI 240 that the YELP® native application developed by Yelp, Inc. and the TRIPADVISOR® native application developed by TripAdvisor, Inc. are installed on the user device 200. The search application 216 may display a header 242 and one or more links 230 associated with the header 242. In some examples, the search application 216 displays one or more headers 242 and one or more links 230 below each header 242 in a hierarchical fashion (e.g., a tree structure). Each header 242 may be a parent node for one or more links 230 as children nodes of the parent node. The links 230 may be selected and grouped in a particular order or in random order. If the links 230 are displayed in an order, the order may be based on some metric associated with the access mechanism 202 or the native application 204a associated with the link 230. Moreover, the order may be an alphabetical sorting of names associated with the links 230, based on the results scores 226 (e.g., based on relevancy to the search query 212), a combination thereof, and/or other sorting techniques. The header 242 may or may not include a link 230 itself.

In the example shown, the GUI 240 includes a header 242 having the name "Yelp," under which first, second, and third links 230-1, 230-2, 230-3 are arranged. The header 242 may indicate that the links 230-1, 230-2, 230-3 arranged below the header 242 are associated with the YELP® native application 204a. In this example, the header 242 does not include any links 230 in the header 242 itself. Instead, the links 230 are grouped below the header 242. In other examples, however, the header 242 may include one or more links 230. In the example shown, selection of the first link 230-1 may cause the user device 200 to launch the YELP® native application 204a and retrieve an IHOP® restaurant entry of the YELP® native application 204a. Selection of the second link 230-2 may cause the user device 200 to launch the YELP® native application 204a and retrieve a DENNY'S® restaurant entry of the YELP® native application 204a. Selection of the third link 230-3 may cause the user device 200 to launch the TACO BELL® native application 204a and retrieve a TACO BELL® restaurant entry of the YELP® native application 204a.

In some examples, the search application 216 displays one or more links 230 to native applications 204a without a header 242, such as the example shown in FIG. 8A. In the example shown in FIG. 8C, a fourth link 230-4 references the TRIPADVISOR® native application without a header 242. Selection of the fourth link 230-4 may cause the user device 200 to launch the TRIPADVISOR® native application 204a and retrieve an entry for "Late night diners" in the TRIPADVISOR® native application 204a (e.g., a search for "Late night diners").

Additionally, in the example shown, a fifth link 230-5 includes a web access mechanism 202b (e.g., a URL). Selection of the fifth link 230-5 may cause the user device 200 to launch the web-browser application 204b and retrieve an entry for "Late night diners" in the OPENTABLE® web application 204b developed by OpenTable, Inc.

In FIG. 8D, the user entered a search query 212 of "thai" into the search field 214 of the GUI 240 and executed the search by, for example, selecting a search button 215 of the GUI 240. In response to the search query 212, the search application 216 generates a query wrapper 210 including the search query 212 and transmits the query wrapper 210 to the search module 310. The search module 310 generates search results 220. In the example of FIG. 8D, the search module 310 generated requests for information (e.g., web requests) from data sources 130 based on the search query 212. The search module 310 may have included one or more of the query terms and/or the query parameters contained in the query wrapper 210 in the requests for information. The search module 310 generated links 230 based on the information received from the data sources 130. In the example of FIG. 8D, the search module 310 received information (e.g., available reservation times) relating to the entities "Baan Thai House & Wine Bar," "Basil Canteen @ 11th Street," and "Blackwood" that are associated with the OPENTABLE® application.

As described above, in response the received query wrapper 210, the search module 310 generates search results 220 (e.g., based on the information received from the data sources 130) and transmits search results 220 including a list of applications 204 to the user device 200. The search module 310 may also transmit the information regarding the entities associated with the YELP® application 204a and the OPENTABLE® application 204a (e.g., reservation times). The list of applications 204 illustrated in FIG. 8D includes YELP® and OPENTABLE®. The GUI 240 may include links 230 to the applications 204 in the search results 220. The user 10 may select the links 230 to access the resource indicated in the link 230. For example, the user may select "Bangkok Bistro" to select a link 230 to the "Bangkok Bistro" entry in the YELP® application 204a.

The GUI 240 in FIG. 8D includes first, second, and third links 230-1, 230-2, 230-3 that provide access to entries in the YELP® application 204a having a YELP® header 242a. Therefore, the YELP® header 242a indicates that the first, second, and third links 230-1, 230-2, 230-3 arranged below the header 242a are associated with the YELP® native application 204a. Similarly the OPENTABLE® header 242b indicates that fourth, fifth, and sixth links 230-4, 230-5, 230-6 arranged below the header 242b are associated with the OPEN TABLE® native application 204a. For example, the links 230-1, 230-2, 230-3 may provide access to entries for "Bangkok Bistro," "Buda Thai," and "Shana Thai Restaurant" in the YELP® application. The search module 310 may have identified the entries for "Bangkok Bistro," "Buda Thai," and "Shana Thai Restaurant" in response to receiving the search query 212 of "thai." The entities "Bangkok Bistro," "Buda Thai," and "Shana Thai Restaurant" may be associated with the YELP® application 204a. Accordingly, the search application 216 may group those entities together under the YELP® application search result 220.

The GUI 240 in FIG. 8D includes fourth, fifth, and sixth links 230-4, 230-5, 230-6 that provide access to entries in the OPENTABLE® application 204a. For example, the links 230-4, 230-5, 230-6 may provide access to entries for "Baan Thai House & Wine Bar," "Basil Canteen @ 11th Street," and "Blackwood" in the OPENTABLE® application 204a. The search module 310 may have identified the entries for "Baan Thai House & Wine Bar," "Basil Canteen @ 11th Street," and "Blackwood" in response to receiving the search query "thai." The entities "Baan Thai House & Wine Bar," "Basil Canteen @ 11th Street," and "Blackwood" may be associated with the OPENTABLE® application 204a. Accordingly, the search application 216 may group those entities together under the OPENTABLE® application search result 220.

The links for "Baan Thai House & Wine Bar," "Basil Canteen @ 11th Street." and "Blackwood" also include information relating to available reservation times. The information relating to available reservation times may have been received by the search module 310 in response to a request for information by the search module 310 to a data source 130 for the OPENTABLE® application 204a. The search module 310 may have transmitted the received information to the user device 200 so that the information could be displayed by the search application 216 via the GUI 240.

The GUI 240 of FIG. 8D also includes indicators or icons 244 that indicate whether the native applications 204a for YELP® and OPENTABLE® are currently installed on the user device 200. The indicators or icons 244 may indicate that whether the native application 204a is installed and ready for access by the user 10, or whether the native application 204a is not yet installed, thus inaccessible by the user 10, but can be downloaded to the user device 200. For example, an "Open" icon 244a may indicate that a native application 204a is installed on the user device 200, and the user may select (e.g., touch) an "Open" icon 244a to open the installed native application 204a. Displaying the icon 244a indicating the installation status of the native application 204a in the header 242 is not required for the header 242 to act as a link. In some examples, the header 242 may act as a link that opens the native application 204a even though the header 242 does not include any indicator 244. Moreover, selecting the header 242 can cause more than just opening an application 204. In some examples, the header 242 may be a link to a different state of the corresponding application 204 (e.g., different from the default state). Also, selecting the header 242 may cause the native application 204a (i.e., the one identified in the header 242) to perform a search using one or more terms of the original search query 212.

A "Free" icon 244b may indicate that the native application 204a is not currently installed on the user device 200; however, the user may select the "Free" icon 244b to launch a digital distribution platform 130b, such as an application marketplace, that provides the native application 204a for download or to automatically start downloading the native application 204a to the user device 200. Other indicators or icons 244 are possible as well that show various states of installation and/or accessibility of native applications 204a.

The search application 216 may display links 230 having different types of access mechanisms 202. For example, selecting the first link 230-1 may access an entry of the native application 204a for YELP® for "Bangkok Bistro" using an application access mechanism 202a. Selecting the fourth link 230-4 may access an entry of the web application 204b for OPENTABLE® for "Baan Thai House & Wine Bar" using a web access mechanism 202b. In this example, the native application 204a for OPENTABLE® is not installed on the user device 200. Thus, the search application 216 can instruct a web browser of the user device 200 to access the web application 204b for OPENTABLE® at the state indicate by the fourth link 230-4.

Figure 8E:
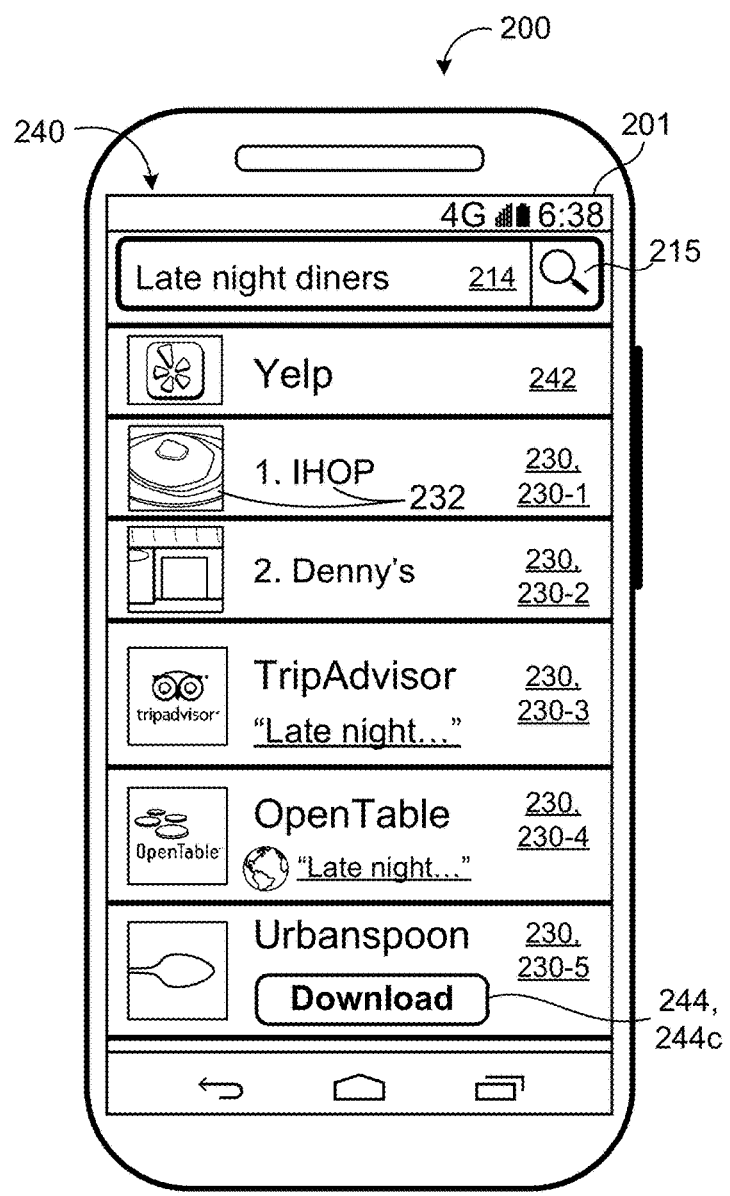
FIG. 8E is a schematic view of an example user device displaying a graphical user interface displaying search results with indicators indicating an installation state of a corresponding application.

FIG. 8E illustrates an example GUI 240 of a search application 216 running on a user device 200. In the example shown, the user 10 has entered a search query 212 ("Late night diners") into the GUI 240 of the search application 216. The user 10 interacted with the GUI 240, causing the search application 216 to generate and transmit a query wrapper 210 including the search query 212 to the search system 300. The search system 300 identified function records 330 and selected application access mechanisms 202a, web access mechanisms 202b, and application download mechanism 202c from the identified function records 330, as described above. In the example shown, the search system 300 identified function records 330 including references to native applications 204a for YELP®, TRIPADVISOR®, OPENTABLE®, and URBANSPOON®. The user device 200 has the native applications 204a for YELP® and TRIPADVISOR® installed, but the native applications 204a for OPENTABLE® and URBANSPOON® are not installed on the user device 200. Links 230, such as the first, second, third, and fourth links 230-1, 230-2, 230-3, 230-4 shown, for accessing the applications 204 (e.g., via access mechanisms 202) may have different functionality and/or purpose. For example, the first and second links 230-1, 230-2 for entries in the native application 204a for YELP® for "IHOP" and "Denny's" include application access mechanisms 202a that open the YELP® native application 204a and retrieve the corresponding entries for "IHOP" and "Denny's."

The third link 230-3 may be associated with an application access mechanism 202a for the TRIPADVISOR® native application 204a. For example, the application access mechanism 202a included in the third link 230-3 may cause the user device 200 to launch the TRIPADVISOR® native application 204a to a default state.

The fourth link 230-4 may include a web access mechanism 202b for the OPENTABLE® web application 204b. For example, the web access mechanism 202b may direct a web browser of the user device 200 to one or more late night diners on a website of OPENTABLE®. Accordingly, in response to selection of the fourth link 230-4, the user device 200 may launch a web browser and retrieve information at a web address included in the web access mechanism 202b. Since the OPENTABLE® native application 204a is not installed on the user device 200, the search application 216 may present the fourth link 230-4 to allow the user 10 to access the desired functionality via the web access mechanism 202b.

A fifth link 230-5 may include an application download mechanism 202c for the URBANSPOON® native application 204a. Since the user device 200 does not have the URBANSPOON® native application 204a installed, the user device 200 displays the fifth link 230-5 that includes the application download mechanism 202c for the URBANSPOON® native application 204a. In response to selection of the fifth link 230-5, the user device 200 may access a data source 130 (e.g., a digital distribution platform 130b) for downloading the URBANSPOON® native application 204a. In some implementations, the search application 216 optionally displays an icon 244 (or other identifier, such as text and/or an image) that indicates that the application 204 is not currently installed on the user device 200, but can be downloaded. In the example shown, the search application displays a "Download" icon 244c on the GUI 240 adjacent the fifth link 230-5 for the URBANSPOON® native application 204a. When the user 10 selects the download icon 244c, the search application 216 uses the application download mechanism 202c of the corresponding link 230 to download the native application 204a to the user device 200.

In some implementations, if the YELP® native application 204a was not installed on the user device 200, the search application 216 may still display the entries for "IHOP" and "Denny's" on the GUI 240, but the user device 200 may include application download mechanisms 202c in the links 230-1, 230-2, so that the user device 200 would be directed to downloading the YELP® native application 204a. In such an example, the links 230-1, 230-2 may also include data (e.g., text and/or images) that indicate to the user 10 that selection of the links 230-1, 230-2 will direct the user 10 to a site for downloading the YELP® native application 204a. For example, the links 230-1, 230-2 may include a download icon 244c, and when the user 10 selects the download icon 244c, the search application 216 uses the application download mechanism 202c of the corresponding link 230 to download the native application 204a to the user device 200.

Referring to FIGS. 8F-8K, in some implementations, the header 242 includes an expansion element 250 that allows the search application 216 to display all or some of the links 230 associates with the header 242. The expansion element 250 includes a collapsed state 250a (FIGS. 8F and 8H) and an expanded state 250b (FIGS. 8G and 8I) that are mutually exclusive. In the example shown, the search application 216 indicates on the GUI 240 that the YELP® native application developed by Yelp, Inc. and the TRIPADVISOR® native application developed by TripAdvisor, Inc. are installed on the user device 200. The search application 216 may display a header 242 and one or more links 230 associated with the header 242. In some implementations, the search application 216 only displays one or more headers 242 and the expansion element 250 associated with each header without displaying any links 230 associated with the header 242. In some examples, the search application 216 displays one or more headers 242 and one or more links 230 below each header 242 in a hierarchical fashion (e.g., a tree structure). Each header 242 may be a parent node for one or more links 230 as children nodes of the parent node. The links 230 may be selected and grouped in a particular order or in random order. If the links 230 are displayed in an order, the order may be based on some metric associated with the access mechanism 202 or the native application 204a associated with the link 230. Moreover, the order may be an alphabetical sorting of names associated with the links 230, based on the results scores 226 (e.g., based on relevancy to the search query 212), a combination thereof, and/or other sorting techniques. The header 242 may or may not include a link 230 itself.

A device independent pixel, also known as, density-independent pixel (dp or dip) is a physical unit of measurement based on a co-ordinate system held by a computer and represents an abstraction of a pixel for use by an application that an underling system then converts to physical pixel. Device independent pixel allows mobile device software, such as native applications 204a, to scale the display of information and user interaction to different screen sizes. Therefore, the abstraction allows the native application 204a to work in pixels as measurement, while the underlying graphics system converts the abstract pixel measurements of the application into real pixel measurements appropriate for the particular user device 200. Therefore, the GUI 240 can adjusts how the information is being displayed on a user device 200 based on the size of the display.

In some implementations, the search application 216 restricts the displayed search results 220 based on a number of device independent pixels. For the collapsed state 250a, the GUI 240 may set a maximum search result height $H_{CR}$ that includes the search results 220 associated with a header 242, where each search result or link 230 has a collapsed search result height $H_{CR}$. The collapsed search result height $H_{CR}$ may be equal for each displayed access link 230, which displays limited information. For example, the maximum search result height $H_C$ equals 344 dp and each link 230 has a collapsed search result height $H_{CR}$ of 75 dp. The GUI 240 may display four access links 230 (4×75 dp=300 dp) that can fit within the maximum search result height $H_C$. The expanded state 250b may have an expanded search result height HE that includes the search results 220 associated with a header 252. If only two search results 220 are available, then the GUI 240 displays only two access links 230 associated with the header 242. The expanded search result height HE includes all of the search results 220 (i.e., access links 230); therefore, the expanded search result height $H_E$ may be as long as the number of access links 230 associated with the header 242 (the user 10 may scroll through the access links 230 to see the ones that are not displayed on a first page). Each access link 230 within the expanded state 240b may have an expanded search result height $H_{ER}$ that is equal to or greater than the collapsed search result height $H_{CR}$. The GUI 240 may display more content and information associated with each link 230. For example, in the collapsed state 250a the GUI 240 may display a restaurant title, picture, and ratings, while in the expanded state 250b the GUI 240 may additionally display a phone number and an address or any relevant information. Thus, the number of access links 230 displayed in either the collapsed state 250a or the expanded state 250b depends on an allocated amount of device independent pixels that the GUI 240 allocates to the access link 230.

Referring to FIGS. 8F and 8H, in some examples, the GUI 240 includes the expansion element 250 located within the header 242. Referring to FIGS. 8I and 8J, the GUI 240 includes the expansion element 250 displayed among the user selectable access links 230 grouped with the header 242.

Referring to FIGS. 8H and 8J, in some examples, the user 10 taps the expansion element 250 on the display 201 when the expansion element 250 is in the collapsed state 250a and the GUI 240 is displaying three links 230-1, 230-2, 230-3. The GUI 240 displays an expanded state 250b of the expansion element 250 as shown in FIGS. 8G and 8I. The expanded state 250b includes a number of links 230 greater than the number of links 230 displayed in the collapsed state 250a. For example, when in the collapsed state 250a zero links 230 are displayed, then in the expanded state 250b, one or more links 230 are displayed. As shown in FIGS. 8G and 8I, six links 230 are displayed when in the expanded state 250b. The user 10 may tap the expansion element 250 on the display when the expansion element is in the expanded state 250b, and the GUI 240 displays less user selectable links 230. As shown, the expansion element 250 toggles between the collapsed state 250a and the expanded state 250b, however, the expansion element 250 may include an expansion button separate from a reduction button. In some examples, where the search application 216 groups the links 230 together if the links 230 are related to the same application 204, the search application 216 only displays the header 242 associated with the application 204 and a user 10 may select the expansion element 250 to view the links 230. In other examples, the search application 216 displays a predetermined number of links 230 (e.g., three links 230) and when the user 10 selects the expansion link 250 the remainder of the search results 220 associated with the application 204 are displayed.

FIGS. 2, 8J, and 8K, illustrate an example, of executing a search on a user device 200 using the search application 216 executing on the user device 200. In FIG. 8J the user 10 entered a search query 212 of "Late night diner" into the search field 214 (e.g., a search box) of the GUI 240 of the search application 216. In response to the search query 212, the search application 216 generates a query wrapper 210 including the search query 212 and transmits the query wrapper 210 to the search system 300, which returns search results 220 based on the search query 212.

The search module 310 transmits the search results 330 including a list of applications 204 and/or access mechanisms 202 to the user device 200. The list of applications, 204 (native or web applications 204a, 204) illustrated in FIG. 8J is similar to the list of applications 204 illustrated and discussed in FIG. 8C. The user 10 may select (e.g., touch or click) one of the links 230 to access resources indicated in the link. For example, the user 10 may select the area of the GUI 240 including the "Denny's" icon to select the second link 230-2 of the YELP® native application 204a. In response to the user selection, the user device 200 (e.g., search application 216, operating system 224, and/or the YELP® native application 204a) can launch the selected application 204a associated with the link 230 and access the state of the application 204 indicated in the link 230. In the example, of FIG. 8I, the selected link 230-2 may provide access to information relating to a "Denny's" restaurant. FIG. 8k illustrates a GUI 240 of the selected native application 204a that was launched in response to the selection of the second link 230-2, where the selected native application 204a displays information relating to a restaurant.

Modules and data stores included in the search system 300 represent features that may be included in the search system 300 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the search system 300 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search system 300 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the search system 300 may be configured to communicate with the network 120. The one or more computing devices of the search system 300 may also be configured to communicate with one another (e.g., via a computer network). In some examples, the one or more computing devices of the search system 300 may include one or more server computing devices configured to communicate with user devices (e.g., receive query wrappers and transmit search results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the search system 300 may be distributed across a number of geographic locations.

Figure 9:
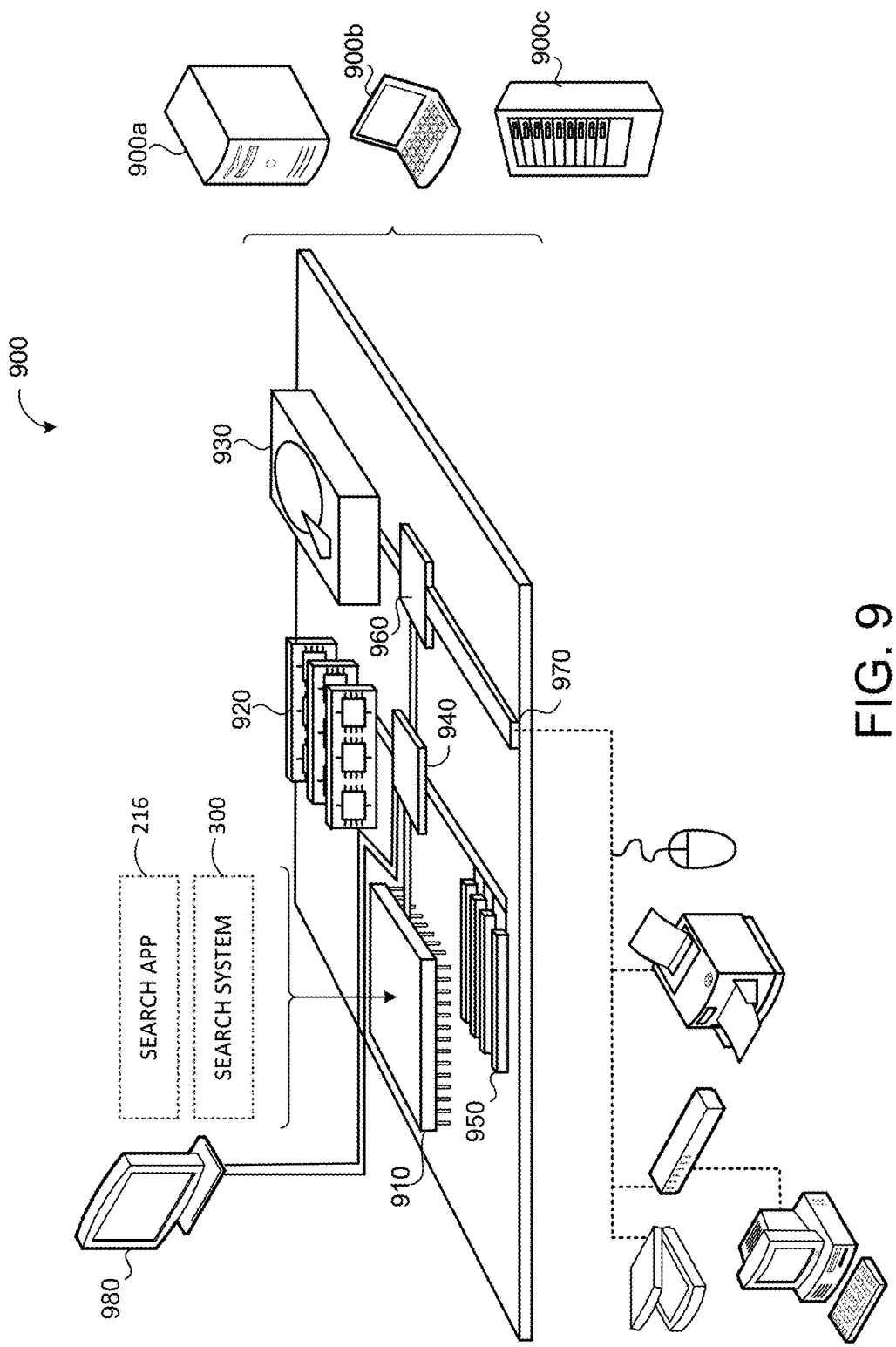
FIG. 9 is a schematic view of an example computing device executing any systems or methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    transmitting, by a computing device of a user device, a search query including one or more query terms to a search system;
    receiving, at the computing device, search results in response to the search query, the search results including one or more grouped sets of search results, each grouped set of search results corresponding to a respective application and including:
        a header including a default access mechanism that includes a reference to the respective application and indicates one or more operations to access a default state of the application; and
        two or more individual search results, each individual search result corresponding to a state of the respective application that is relevant to the search query and including one or more access mechanisms respectively defining one or more operations to access the corresponding state; and
    displaying, on a display in communication with the computing device, the search results in a graphical user interface, including for each grouped set of search results, displaying:
        a header link corresponding to the header that, when selected, causes the computing device to access the default state of the application using the default access mechanism,
        an expansion element associated with the header, the expansion element having an expanded state and a collapsed state,
        an installation state of the respective application in relation to the header link, the installation state indicating whether a native application edition of the respective application is installed on the user device, and
        one or more user selectable links grouped with the header link, each user selectable link corresponding to a respective one of the two or more individual search results, wherein when the user selectable link is selected, the user selectable link causes the computing device to access the state of the respective application corresponding to the user selectable link using one of the one or more access mechanisms in the individual search result, wherein:
            when the expansion element is in the expanded state, a first amount of user selectable links grouped with the header link are displayed in the graphical user interface; and
            when the expansion element is in the collapsed state, a second amount of user selectable links grouped with the header link are displayed in the graphical user interface, the second amount being less than the first amount.

2. The method of claim 1, wherein the second amount is greater than or equal to one.

3. The method of claim 1, wherein one of the one or more grouped sets of search results includes an advertisement associated with the respective application of the grouped set, the graphical user interface displaying the advertisement together with the header link or one of the displayed user selectable links grouped with the header link.

4. The method of claim 1, wherein each header link displays a name of the respective associated application and the default state linked to by the header link is a home page of the respective application.

5. The method of claim 1, wherein, in response to receiving a user selection of the expansion element when the expansion element is in the collapsed state, displaying the first amount of user selectable links includes:
requesting additional individual search results corresponding to the application to which the expansion element corresponds;
generating additional user selectable links based on the additional search results; and
displaying the additional user selectable links in the graphical user interface.

6. The method of claim 1, wherein in response to receiving a user selection of the expansion element when the expansion element is in the expanded state, displaying the second amount of user selectable links includes determining the second amount based on an allocated amount of device independent pixels that the graphical user interface allocates to each user selectable link.

7. The method of claim 1, further comprising, in response to receiving a user selection of the header link:
when the native application edition is installed, executing the native application edition on the computing device; and
when the installation state of the associated application is uninstalled, downloading the native application edition to non-transitory memory in communication with the computing device and executing the native application edition by the computing device.

8. The method of claim 1, further comprising, in response to receiving a user selection of the header link:
when the native application edition is installed, executing the native application edition on the computing device; and
when the native application is not installed, accessing a web application edition of the application using a web resource identifier.

9. The method of claim 1, further comprising displaying in the graphical user interface an ungrouped user selectable link, the ungrouped user selectable link including one or more corresponding access mechanisms and linking to a different state of a different application from the one or more applications corresponding to the one or more grouped sets.

10. A user device comprising:
a hardware display device;
a computing device in communication with the hardware display device; and
a non-transitory memory in communication with the computing device, the non-transitory memory storing instructions that when executed on the computing device cause the computing device to perform operations comprising:
transmitting a search query including one or more query terms to a search system;
receiving search results in response to the search query, the search results including one or more grouped sets of search results, each grouped set of search results corresponding to a respective application and including:
a header including a default access mechanism that includes a reference to the respective application and indicates one or more operations to access a default state of the application; and
two or more individual search results, each individual search result corresponding to a state of the respective application that is relevant to the search query and including one or more access mechanisms respectively defining one or more operations to access the corresponding state; and
displaying, via the hardware display device, the search results in a graphical user interface including, for each grouped set of search results, displaying:
a header link corresponding to the header that, when selected, causes the computing device to access the default state of the application using the default access mechanism,
an expansion element associated with the header, the expansion element having an expanded state and a collapsed state,
an installation state of the respective application in relation to the header link, the installation state indicating whether a native application edition of the respective application is installed on the user device, and
one or more user selectable links grouped with the header link, each user selectable link corresponding to a respective one of the two or more individual search results, wherein when the user selectable link is selected, the user selectable link causes the computing device to access the state of the respective application corresponding to the user selectable link using one of the one or more access mechanisms in the individual search result, wherein:
when the expansion element is in the expanded state, a first amount of user selectable links grouped with the header link are displayed in the graphical user interface; and
when the expansion element is in the collapsed state, a second amount of user selectable links grouped with the header link are displayed in the graphical user interface, the second amount being less than the first amount.

11. The user device of claim 10, wherein the second amount is greater than or equal to one.

12. The user device of claim 10, wherein one of the one or more grouped sets of search results includes an advertisement associated with the respective application of the grouped set, the graphical user interface displaying the advertisement together with the header link or one of the displayed user selectable links grouped with the header link.

13. The user device of claim 10, wherein each header link displays a name of the respective associated application and the default state linked to by the header link is a home page of the respective application.

14. The user device of claim 10, wherein, in response to receiving a user selection of the expansion element when the expansion element is in the collapsed state, displaying the first amount of user selectable links includes:
requesting additional individual search results corresponding to the application to which the expansion element corresponds;
generating additional user selectable links based on the additional search results; and
displaying the additional user selectable links in the graphical user interface.

15. The user device of claim 10, wherein in response to receiving a user selection of the expansion element when the expansion element is in the expanded state, displaying the second amount of user selectable links includes determining the second amount based on an allocated amount of device independent pixels that the graphical user interface allocates to each user selectable link.

16. The user device of claim 10, wherein the operations further comprise, in response to receiving a user selection of the header link:
   when the native application edition is installed, executing the native application edition on the computing device; and
   when the installation state of the associated application is uninstalled, downloading the native application edition to non-transitory memory in communication with the computing device and executing the native application edition by the computing device.

17. The user device of claim 10, wherein the operations further comprise, in response to receiving a user selection of the header link:
   when the native application edition is installed, executing the native application edition on the computing device; and
   when the native application is not installed, accessing a web application edition of the application using a web resource identifier.

18. The user device of claim 10, wherein the operations further comprise displaying in the graphical user interface an ungrouped user selectable link, the ungrouped user selectable link including one or more corresponding access mechanisms and linking to a different application from the one or more applications.

* * * * *